US012621114B2

(12) United States Patent
Zhu et al.

(10) Patent No.: US 12,621,114 B2
(45) Date of Patent: May 5, 2026

(54) MEASUREMENT CONFIGURATIONS FOR REPORTING IN MULTI-TRP COMMUNICATION SYSTEMS

(71) Applicant: Samsung Electronics Co., Ltd., Suwon-si (KR)

(72) Inventors: Dalin Zhu, Allen, TX (US); Emad Nader Farag, Flanders, NJ (US); Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 336 days.

(21) Appl. No.: 18/354,472

(22) Filed: Jul. 18, 2023

(65) Prior Publication Data

US 2024/0056273 A1     Feb. 15, 2024

Related U.S. Application Data

(60) Provisional application No. 63/395,711, filed on Aug. 5, 2022, provisional application No. 63/394,189, filed on Aug. 1, 2022.

(51) Int. Cl.
| | |
|---|---|
| *H04L 5/00* | (2006.01) |
| *H04B 7/06* | (2006.01) |
| *H04W 24/08* | (2009.01) |
| *H04W 24/10* | (2009.01) |
| *H04W 72/0453* | (2023.01) |
| *H04W 72/231* | (2023.01) |
| *H04W 72/232* | (2023.01) |

(52) U.S. Cl.
CPC ......... *H04L 5/0094* (2013.01); *H04B 7/0626* (2013.01); *H04L 5/0048* (2013.01)

(58) Field of Classification Search
None
See application file for complete search history.

(56) References Cited

U.S. PATENT DOCUMENTS

| | | | | |
|---|---|---|---|---|
| 2020/0127722 A1* | 4/2020 | Kang | .................... | H04L 5/0023 |
| 2020/0280357 A1* | 9/2020 | Bae | ....................... | H04L 5/0098 |

(Continued)

OTHER PUBLICATIONS

International Search Report and Written Opinion issued Nov. 14, 2023 regarding International Application No. PCT/KR2023/010986, 7 pages.

(Continued)

*Primary Examiner* — Jenee Holland

(57) ABSTRACT

Methods and apparatuses for measurement configurations for reporting in multi-transmit-receive point (TRP) communication systems. A method for operating a user equipment (UE) includes receiving first information for a first set of frequency subbands for FSBM and receiving second information related to a CSI resource setting. The CSI resource setting includes a first CSI resource set and a second CSI resource set. The method further includes identifying, based on the first and second information, a first subset of frequency subbands from the first set of frequency subbands for the first CSI resource set and a second subset of frequency subbands from the first set of frequency subbands for the second CSI resource set. The method further includes determining, based on the identification, one or more first RS resources from the first CSI resource set and one or more second RS resources from the second CSI resource set for FSBR.

20 Claims, 16 Drawing Sheets

(56)  References Cited

U.S. PATENT DOCUMENTS

| | | |
|---|---|---|
| 2021/0314044 A1 | 10/2021 | Li et al. |
| 2021/0328644 A1* | 10/2021 | Hao ..................... H04B 7/0486 |
| 2022/0029673 A1 | 1/2022 | Chen et al. |
| 2022/0131582 A1 | 4/2022 | Park et al. |
| 2022/0140878 A1 | 5/2022 | Zhu et al. |
| 2022/0225138 A1 | 7/2022 | Li et al. |
| 2024/0072857 A1* | 2/2024 | Hajri ................... H04B 7/0404 |
| 2024/0313835 A1* | 9/2024 | Wernersson ......... H04B 7/0626 |
| 2025/0105895 A1* | 3/2025 | You ....................... H04L 5/0057 |

OTHER PUBLICATIONS

"3rd Generation Partnership Project; Technical Specification Group Radio Access Network; NR; Physical channels and modulation (Release 16)", 3GPP TS 38.211 V16.1.0, Mar. 2020, 130 pages.
"3rd Generation Partnership Project; Technical Specification Group Radio Access Network; NR; Multiplexing and channel coding (Release 16)", 3GPP TS 38.212 V16.1.0, Mar. 2020, 146 pages.
"3rd Generation Partnership Project; Technical Specification Group Radio Access Network; NR; Physical layer procedures for control (Release 16)" 3GPP TS 38.213 V16.1.0, Mar. 2020, 156 pages.
"3rd Generation Partnership Project; Technical Specification Group Radio Access Network; NR; Physical layer procedures for data (Release 16)", 3GPP TS 38.214 V16.1.0, Mar. 2020, 151 pages.
"5G; NR; Medium Access Control (MAC) protocol specification (3GPP TS 38.321 version 16.1.0 Release 16)", ETSI TS 138 321 V16.1.0, Jul. 2020, 153 pages.
"5G; NR; Radio Resource Control (RRC); Protocol specification (3GPP TS 38.331 version 16.1.0 Release 16)", ETSI TS 138 331 V16.1.0, Jul. 2020, 886 pages.

* cited by examiner

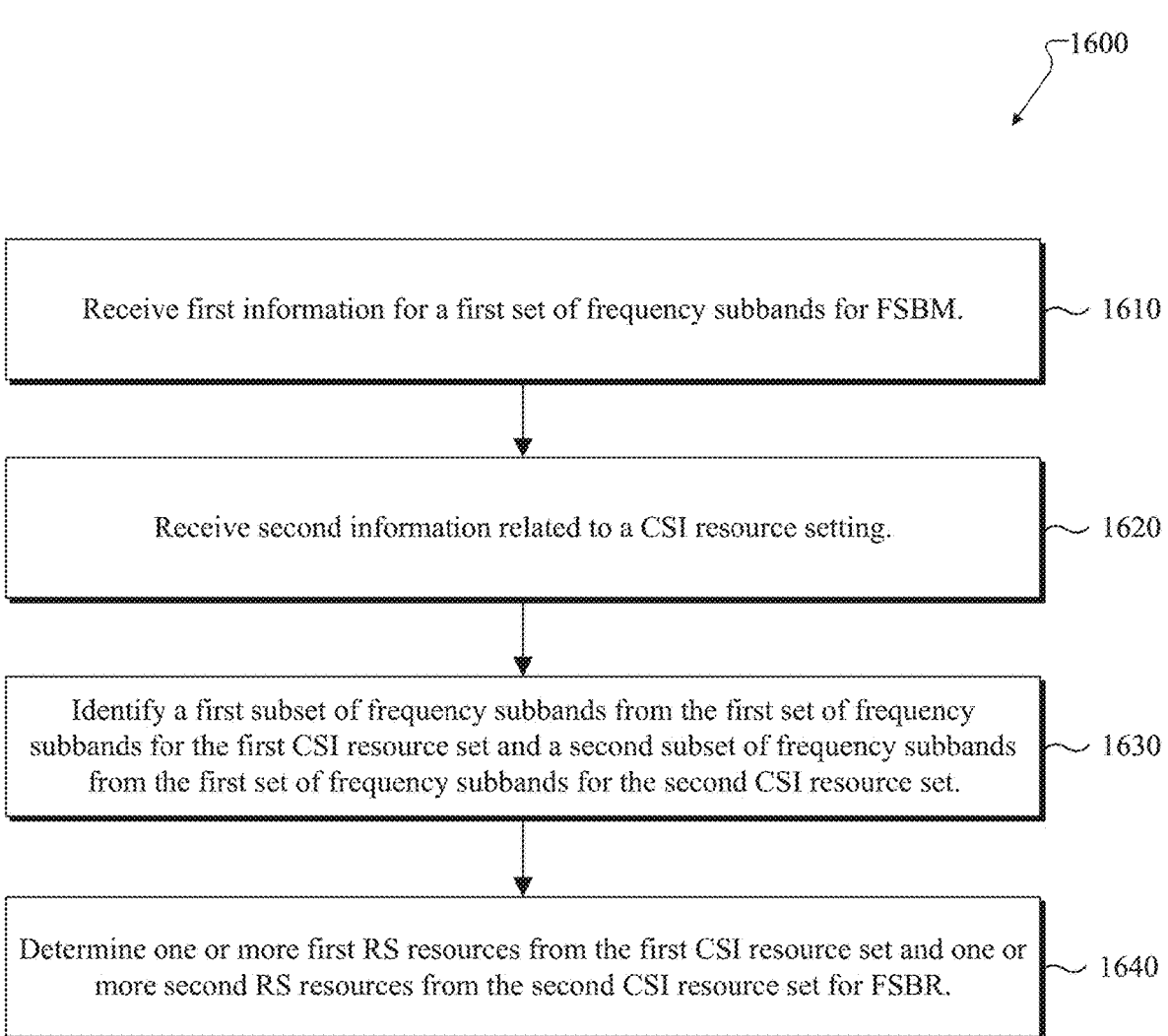

1600

Receive first information for a first set of frequency subbands for FSBM. ～ 1610

Receive second information related to a CSI resource setting. ～ 1620

Identify a first subset of frequency subbands from the first set of frequency subbands for the first CSI resource set and a second subset of frequency subbands from the first set of frequency subbands for the second CSI resource set. ～ 1630

Determine one or more first RS resources from the first CSI resource set and one or more second RS resources from the second CSI resource set for FSBR. ～ 1640

FIG. 16

MEASUREMENT CONFIGURATIONS FOR REPORTING IN MULTI-TRP COMMUNICATION SYSTEMS

CROSS-REFERENCE TO RELATED AND CLAIM OF PRIORITY

The present application claims priority under 35 U.S.C. § 119(e) to U.S. Provisional Patent Application No. 63/394,189 filed on Aug. 1, 2022, and U.S. Provisional Patent Application No. 63/395,711 filed on Aug. 5, 2022, which is hereby incorporated by reference in their entirety.

TECHNICAL FIELD

The present disclosure relates generally to wireless communication systems and, more specifically, the present disclosure relates to methods and apparatuses for measurement configurations for reporting in multiple transmit-receive points (TRPs) communication systems.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance. To meet the demand for wireless data traffic having increased since deployment of 4G communication systems, and to enable various vertical applications, 5G communication systems have been developed and are currently being deployed.

SUMMARY

The present disclosure relates to measurement configurations for reporting in multi-TRP communication systems.

In one embodiment, a user equipment (UE) is provided. The UE includes a transceiver configured to receive first information for a first set of frequency subbands for frequency selective beam management (FSBM) and to receive second information related to a channel state information (CSI) resource setting. The CSI resource setting includes a first CSI resource set and a second CSI resource set. The first and second CSI resource sets include one or more reference signal (RS) resources. The UE further includes a processor operably coupled to the transceiver. The processor is configured to identify, based on the first and second information, a first subset of frequency subbands from the first set of frequency subbands for the first CSI resource set and a second subset of frequency subbands from the first set of frequency subbands for the second CSI resource set. The processor is further configured to determine, based on the identification, one or more first RS resources from the first CSI resource set and one or more second RS resources from the second CSI resource set for frequency selective beam reporting (FSBR). A RS resource from the one or more RS resources corresponds to a synchronization signal block (SSB) resource or a non-zero-power (NZP) CSI-RS resource.

In another embodiment, a base station (BS) is provided. The BS includes a transceiver configured to transmit first information for a first set of frequency subbands for FSBM and transmit second information related to a CSI resource setting. The CSI resource setting includes a first CSI resource set and a second CSI resource set. The first and second CSI resource sets include one or more RS resources. The first and second information indicate a first subset of frequency subbands from the first set of frequency subbands for the first CSI resource set and a second subset of frequency subbands from the first set of frequency subbands for the second CSI resource set. The first and second information indicate one or more first RS resources from the first CSI resource set and one or more second RS resources from the second CSI resource set for FSBR. A RS resource from the one or more RS resources corresponds to a SSB resource or NZP CSI-RS resource.

In yet another embodiment, a method for operating a UE is provided. The method includes receiving first information for a first set of frequency subbands for FSBM and receiving second information related to a CSI resource setting. The CSI resource setting includes a first CSI resource set and a second CSI resource set. The first and second CSI resource sets include one or more RS resources. The method further includes identifying, based on the first and second information, a first subset of frequency subbands from the first set of frequency subbands for the first CSI resource set and a second subset of frequency subbands from the first set of frequency subbands for the second CSI resource set. The method further includes determining, based on the identification, one or more first RS resources from the first CSI resource set and one or more second RS resources from the second CSI resource set for FSBR. A RS resource from the one or more RS resources corresponds to a SSB resource or a NZP CSI-RS resource.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 16 illustrates an example method performed by a UE in a wireless communication system according to embodiments of the present disclosure.

DETAILED DESCRIPTION

FIGS. 1-16, discussed below, and the various, non-limiting embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems, and to enable various vertical applications, 5G/NR communication systems have been developed and are currently being deployed. The 5G/NR communication system is implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G, or even later releases which may use terahertz (THz) bands.

The following documents and standards descriptions are hereby incorporated by reference into the present disclosure as if fully set forth herein: [1] 3GPP TS 38.211 v16.1.0, "NR; Physical channels and modulation;" [2] 3GPP TS 38.212 v16.1.0, "NR; Multiplexing and Channel coding;" [3] 3GPP TS 38.213 v16.1.0, "NR; Physical Layer Procedures for Control;" [4] 3GPP TS 38.214 v16.1.0, "NR; Physical Layer Procedures for Data;" [5] 3GPP TS 38.321 v16.1.0, "NR; Medium Access Control (MAC) protocol specification;" and [6] 3GPP TS 38.331 v16.1.0, "NR; Radio Resource Control (RRC) Protocol Specification."

Figure 1:
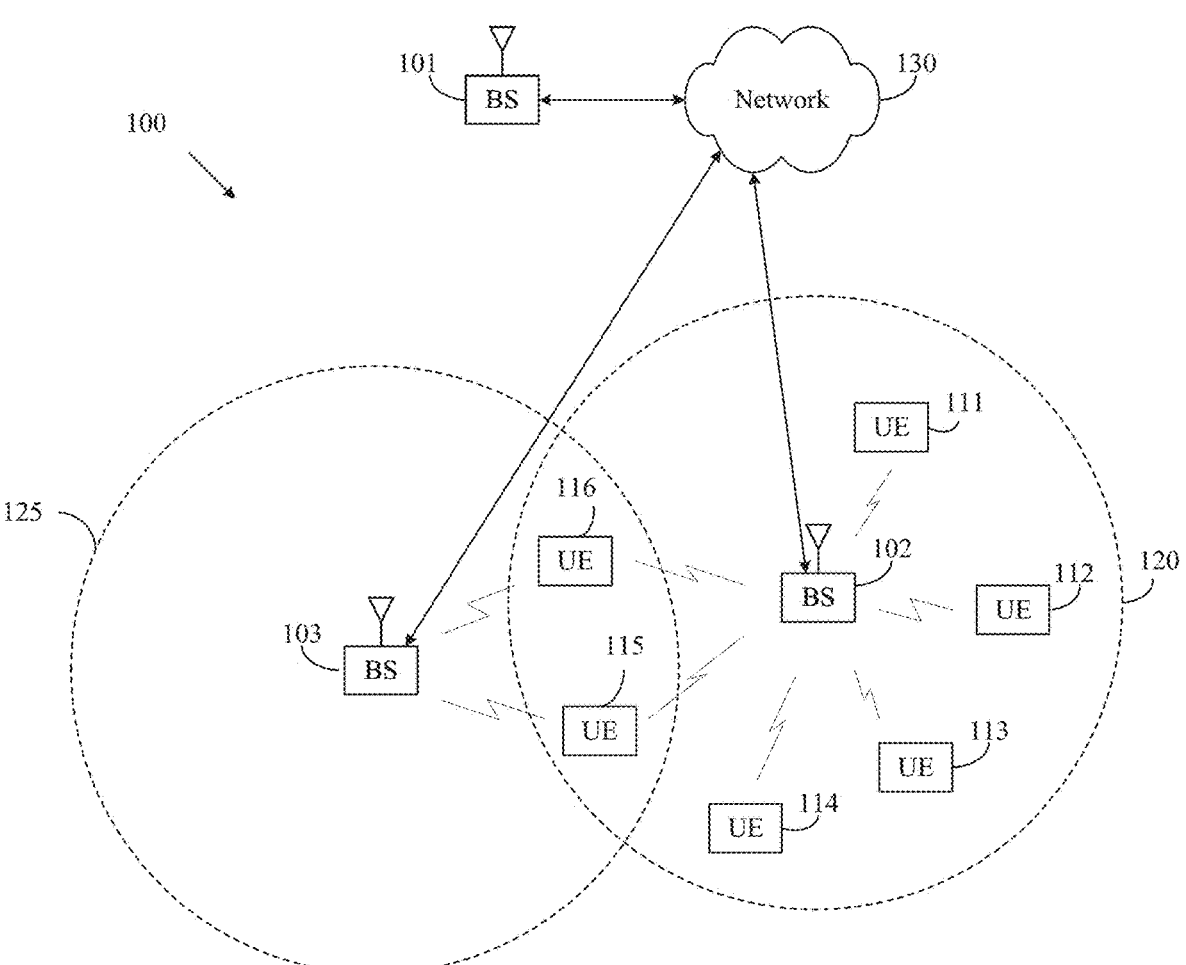
FIG. 1 illustrates an example wireless network according to embodiments of the present disclosure.
Figure 2:
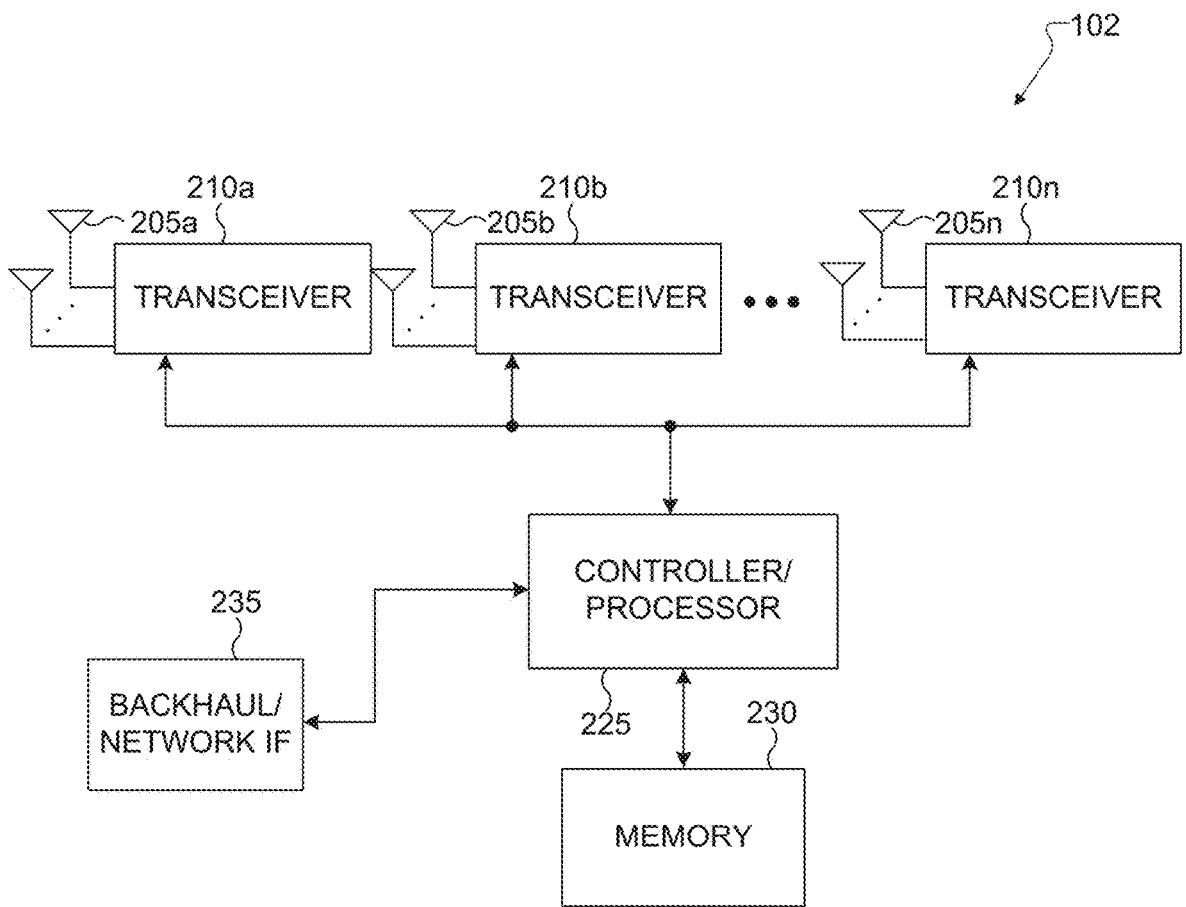
FIG. 2 illustrates an example gNodeB (gNB) according to embodiments of the present disclosure.
Figure 3:
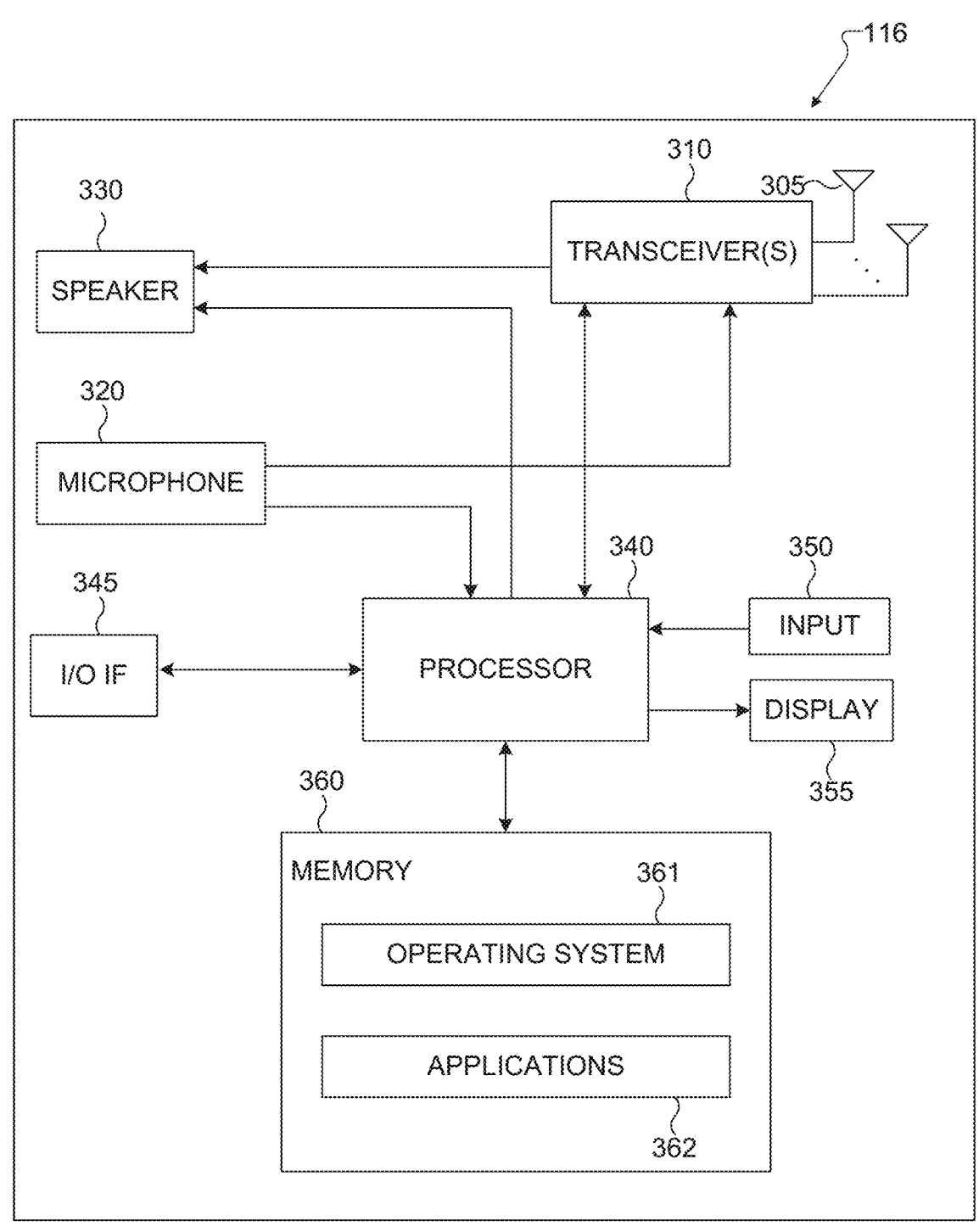
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to how different embodiments may be implemented. Different embodiments of the present disclosure may be implemented in any suitably arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

The dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for utilizing measurement configurations for reporting in multi-TRP communication systems. In certain embodiments, one or more of the BSs 101-103 include circuitry, programing, or a combination thereof to support measurement configurations for reporting in multi-TRP communication systems.

Although FIG. 1 illustrates one example of a wireless network, various changes may be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming radio frequency (RF) signals, such as signals transmitted by UEs in the wireless network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of uplink (UL) channel signals and the transmission of downlink (DL) channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as supporting measurement configurations for reporting in multi-TRP communication systems. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna(s) 305, an incoming RF signal transmitted by a gNB of the wireless network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the ULE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. For example, the processor 340 may execute processes for utilizing measurement configurations for reporting in multi-TRP communication systems as described in embodiments of the present disclosure. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes, for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4A:
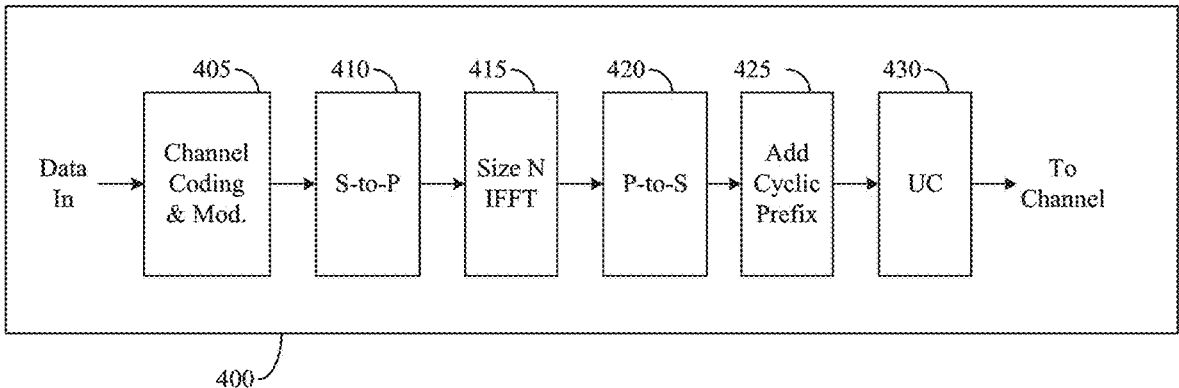
FIGS. 4A and 4B illustrates an example of a wireless transmit and receive paths according to embodiments of the present disclosure.
Figure 4B:
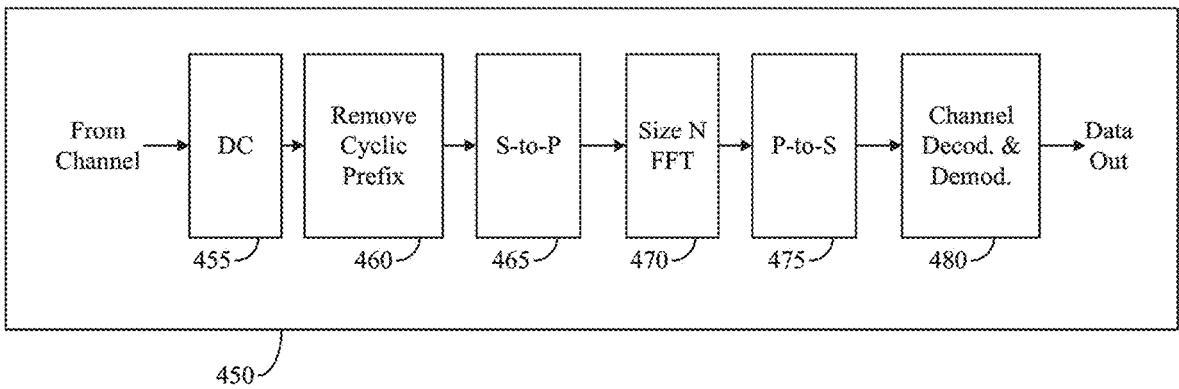

FIG. 4A and FIG. 4B illustrate an example of wireless transmit and receive paths 400 and 450, respectively, according to embodiments of the present disclosure. For example, a transmit path 400 may be described as being implemented in a gNB (such as gNB 102), while a receive path 450 may be described as being implemented in a UE (such as UE 116). However, it will be understood that the receive path 450 can be implemented in a gNB and that the transmit path 400 can be implemented in a UE. In some embodiments, the receive path 450 is configured to support measurement configurations for reporting in multi-TRP communication systems as described in embodiments of the present disclosure.

As illustrated in FIG. 4A, the transmit path 400 includes a channel coding and modulation block 205, a serial-to-parallel (S-to-P) block 410, a size N Inverse Fast Fourier Transform (IFFT) block 415, a parallel-to-serial (P-to-S) block 420, an add cyclic prefix block 425, and an up-converter (UC) 430. The receive path 250 includes a down-converter (DC) 455, a remove cyclic prefix block 460, a S-to-P block 465, a size N Fast Fourier Transform (FFT) block 470, a parallel-to-serial (P-to-S) block 475, and a channel decoding and demodulation block 480.

In the transmit path 400, the channel coding and modulation block 405 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to a RF frequency for transmission via a wireless channel. The signal may also be filtered at a baseband before conversion to the RF frequency.

As illustrated in FIG. 4B, the down-converter 455 down-converts the received signal to a baseband frequency, and the remove cyclic prefix block 460 removes the cyclic prefix to generate a serial time-domain baseband signal. The serial-to-parallel block 465 converts the time-domain baseband signal to parallel time-domain signals. The size N FFT block 470 performs an FFT algorithm to generate N parallel frequency-domain signals. The (P-to-S) block 475 converts the parallel frequency-domain signals to a sequence of modulated data symbols. The channel decoding and demodulation block 480 demodulates and decodes the modulated symbols to recover the original input data stream.

Each of the gNBs 101-103 may implement a transmit path 400 that is analogous to transmitting in the downlink to UEs 111-116 and may implement a receive path 450 that is analogous to receiving in the uplink from UEs 111-116. Similarly, each of UEs 111-116 may implement a transmit path 400 for transmitting in the uplink to gNBs 101-103 and may implement a receive path 450 for receiving in the downlink from gNBs 101-103.

Each of the components in FIGS. 4A and 4B can be implemented using only hardware or using a combination of hardware and software/firmware. As a particular example, at least some of the components in FIGS. 4A and 4B may be implemented in software, while other components may be implemented by configurable hardware or a mixture of software and configurable hardware. For instance, the FFT block 470 and the IFFT block 415 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, can be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 4A and 4B illustrate examples of wireless transmit and receive paths 400 and 450, respectively, various changes may be made to FIGS. 4A and 4B. For example, various components in FIGS. 4A and 4B can be combined, further subdivided, or omitted and additional components can be added according to particular needs. Also, FIGS. 4A and 4B are meant to illustrate examples of the types of transmit and receive paths that can be used in a wireless network. Any other suitable architectures can be used to support wireless communications in a wireless network.

In embodiments of the present disclosure, a beam is determined by either a transmission configuration indicator (TCI) state that establishes a quasi-colocation (QCL) relationship between a source reference signal (RS) (e.g., single sideband (SSB) and/or Channel State Information Reference Signal (CSI-RS)) and a target RS or a spatial relation information that establishes an association to a source RS, such as SSB or CSI-RS or SRS. In either case, the ID of the source reference signal identifies the beam. The TCI state and/or the spatial relation reference RS can determine a spatial RX filter for reception of downlink channels at the UE 116, or a spatial TX filter for transmission of uplink channels from the UE 116.

Figure 5A:
FIG. 5A illustrates an example of a wireless system according to embodiments of the present disclosure.
Figure 5A:
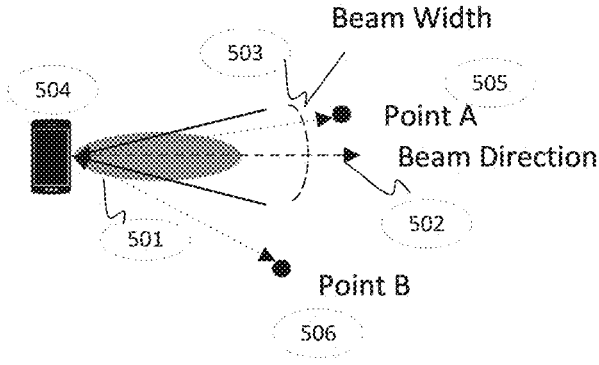

As illustrated in FIG. 5A, in a wireless system 500, a beam 501 for a device 504 can be characterized by a beam direction 502 and a beam width 503. For example, the device 504 (or UE 116) transmits RF energy in a beam direction and within a beam width. The device 504 receives RF energy in a beam direction and within a beam width. As illustrated in FIG. 5A, a device at point A 505 can receive from and transmit to device 504 as Point A is within a beam width and direction of a beam from device 504. As illustrated in FIG. 5A, a device at point B 506 cannot receive from and transmit to device 504 as Point B 506 is outside a beam width and direction of a beam from device 504. While FIG. 5A, for illustrative purposes, shows a beam in 2-dimensions (2D), it should be apparent to those skilled in the art, that a beam can be in 3-dimensions (3D), where the beam direction and beam width are defined in space.

Figure 5B:
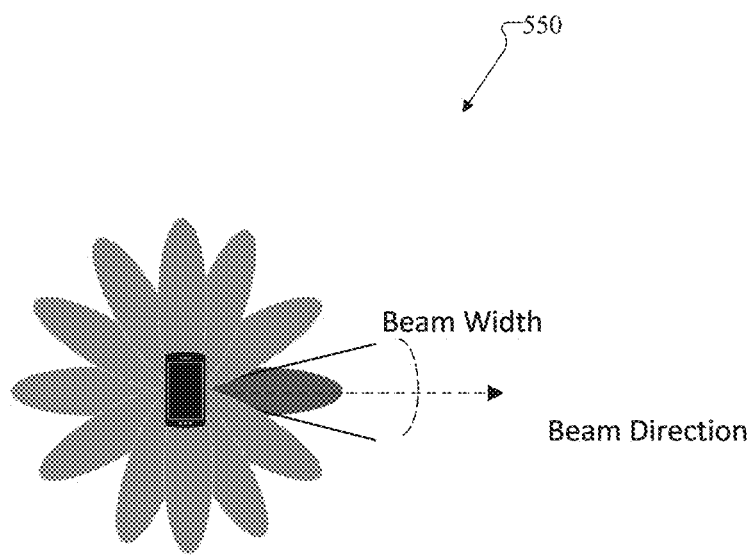
FIG. 5B illustrates an example of a multi-beam operation according to embodiments of the present disclosure.

FIG. 5B illustrates an example of a multi-beam operation 550 according to embodiments of the present disclosure. For example, the multi-beam operation 550 can be utilized by UE 116 of FIG. 3. This example is for illustration only and other embodiments can be used without departing from the scope of the present disclosure.

In a wireless system, a device can transmit and/or receive on multiple beams. This is known as "multi-beam operation". While FIG. 5B, for illustrative purposes, a beam is in 2D, it should be apparent to those skilled in the art, that a beam can be 3D, where a beam can be transmitted to or received from any direction in space.

Figure 6:
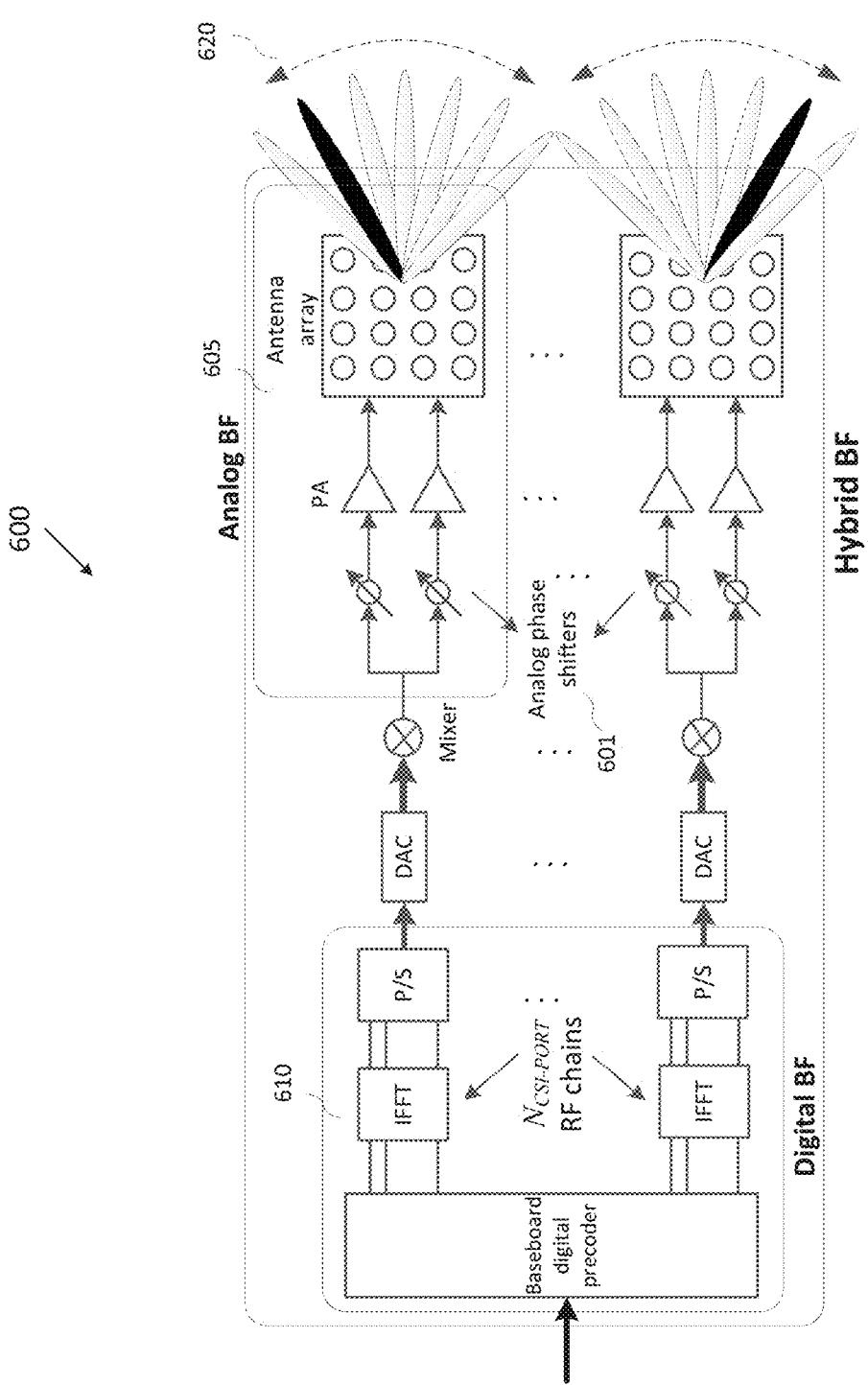
FIG. 6 illustrates an example of a transmitter structure for beamforming according to embodiments of the present disclosure.

FIG. 6 illustrates an example of a transmitter structure 600 for beamforming according to embodiments of the present disclosure. In certain embodiments, one or more of gNB 102 or UE 116 includes the transmitter structure 600. For example, one or more of antenna 205 and its associated systems or antenna 305 and its associated systems can be included in transmitter structure 600. This example is for illustration only and other embodiments can be used without departing from the scope of the present disclosure.

Accordingly, embodiments of the present disclosure recognize that Rel-14 LTE and Rel-15 NR support up to 32 CSI-RS antenna ports which enable an eNB or a gNB to be equipped with a large number of antenna elements (such as 64 or 128). A plurality of antenna elements can then be mapped onto one CSI-RS port. For mmWave bands, although a number of antenna elements can be larger for a given form factor, a number of CSI-RS ports, that can correspond to the number of digitally precoded ports, can be limited due to hardware constraints (such as the feasibility to install a large number of analog-to-digital converters (ADCs)/digital-to-analog converters (DACs) at mmWave frequencies) as illustrated in FIG. 6. Then, one CSI-RS port can be mapped onto a large number of antenna elements that can be controlled by a bank of analog phase shifters 601. One CSI-RS port can then correspond to one sub-array which produces a narrow analog beam through analog beamforming 605. This analog beam can be configured to sweep across a wider range of angles 620 by varying the phase shifter bank across symbols or slots/subframes. The number of sub-arrays (equal to the number of RF chains) is the same as the number of CSI-RS ports $N_{CSI-PORT}$. A digital beamforming unit 610 performs a linear combination across $N_{CSI-PORT}$ analog beams to further increase a precoding gain. While analog beams are wideband (hence not frequency-selective), digital precoding can be varied across frequency sub-bands or resource blocks. Receiver operation can be conceived analogously.

Since the transmitter structure 600 of FIG. 6 utilizes multiple analog beams for transmission and reception (wherein one or a small number of analog beams are selected out of a large number, for instance, after a training duration that is occasionally or periodically performed), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting", respectively), and receiving a DL or UL transmission via a selection of a corresponding RX beam. The system of FIG. 6 is also applicable to higher frequency bands such as >52.6 GHz (also termed frequency range 4 or FR4). In this case, the system can employ only analog beams. Due to the O2 absorption loss around 60 GHz frequency (~10 dB additional loss per 100 m distance), a larger number and narrower analog beams (hence a larger number of radiators in the array) are needed to compensate for the additional path loss.

The text and figures are provided solely as examples to aid the reader in understanding the present disclosure. They are not intended and are not to be construed as limiting the scope of the present disclosure in any manner. Although certain embodiments and examples have been provided, it will be apparent to those skilled in the art based on the disclosures herein that changes in the embodiments and examples shown may be made without departing from the scope of the present disclosure. The transmitter structure 600 for beamforming is for illustration only and other embodiments can be used without departing from the scope of the present disclosure.

This disclosure provides various design aspects for frequency-selective beam management using a JPTA system as an example implementation, wherein one or more (analog) beams can be simultaneously transmitted/received over one or more frequency subbands. Specifically, various beam measurement configurations, reporting configurations, beam indication mechanisms, and the corresponding signaling medium/procedures are specified/customized to enable frequency-selective beam management.

The present disclosure recognizes that due to the rising demand for traffic, wireless systems are moving towards higher frequencies of operation, such as millimeter-wave (mm-wave) and terahertz (THz) frequencies, where abundant spectrum is available, but the higher frequencies also suffer from a high channel propagation loss and therefore require a large antenna array to create sufficient beamforming gain to ensure a sufficient link budget for operation. Thus, these high frequency systems are usually built with a large antenna array at the transmitter and/or the receiver containing many individual antenna elements. At the operating bandwidths of these mm-wave and THz systems, the cost and power consumption of mixed-signal components such as ADCs and/or DACs also grow tremendously. Thus, fully digital transceiver implementations, where each antenna element is fed by a dedicated RF chain, are impractical. To keep the hardware cost and power consumption of such large antenna arrays manageable, typically an analog beamforming or hybrid beamforming architecture is adopted where the large antenna array is fed with a much smaller number of RF chains via the use of analog hardware such as phase-shifters. This reduces the number of mixed-signal components which significantly reduces the cost, size, and power consumption of the transceivers. When transmitting a signal at the transmitter, a combination of digital beamforming before DAC and analog beamforming using the phase-shifters is used to create the overall beam shape in the desired direction. Similarly, when receiving a signal at the receiver, a combination of analog beamforming using phase-shifters and digital beamforming after ADC is used to create the overall beam shape in the desired direction. However other approaches usually use a phase-shifter array or a combination of phase-shifters and switches to connect the large antenna array to a few number of RF chains.

Figure 7:
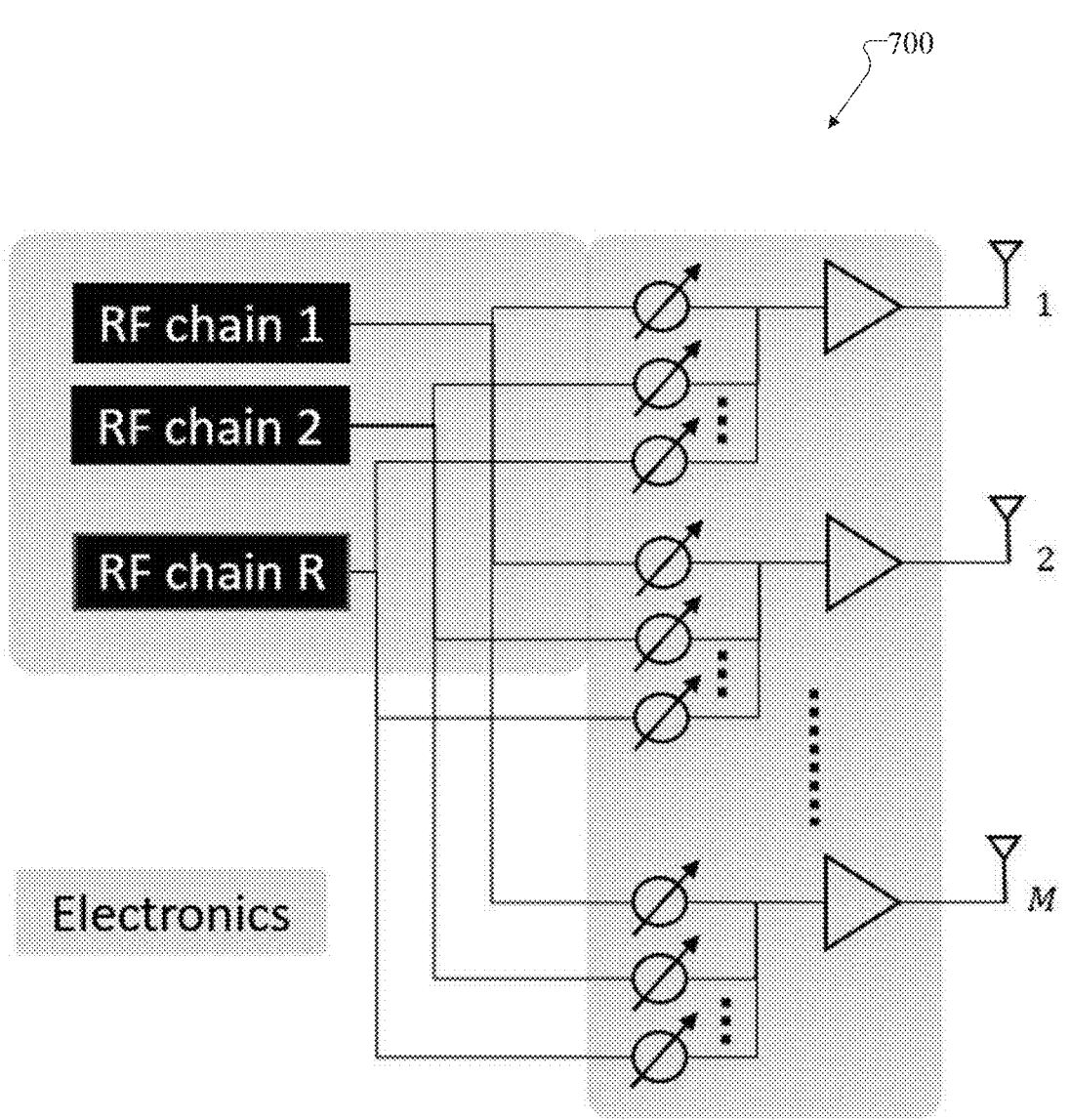
FIG. 7 illustrates an example of a hybrid beamforming based array architecture according to embodiments of the present disclosure.

FIG. 7 illustrates an example architecture 700 for a hybrid beamforming based array architecture according to embodiments of the present disclosure. For example, the architecture 700 may be located in the gNB 101 or the UE 116 in FIG. 1. This example is for illustration only and other embodiments can be sued without departing from the scope of the present disclosure.

With reference to FIG. 7, the case of hybrid beamforming at a BS with a single RF chain, i.e., R=1 is discussed. Note that with M antennas, the maximum possible beamforming gain in any direction is M. For the BS 102 to provide signal coverage to the UEs in the cell, the BS 102 would perform beam sweeping over time for its frequency-flat beams.

An alternative to frequency-flat hybrid beamforming is frequency-dependent hybrid beamforming, which we call JPTA beamforming. Note that, here, frequency-dependent beamforming refers to a technique where different components of the input signal may encounter a differently shaped analog beam based on their frequency.

Figure 8:
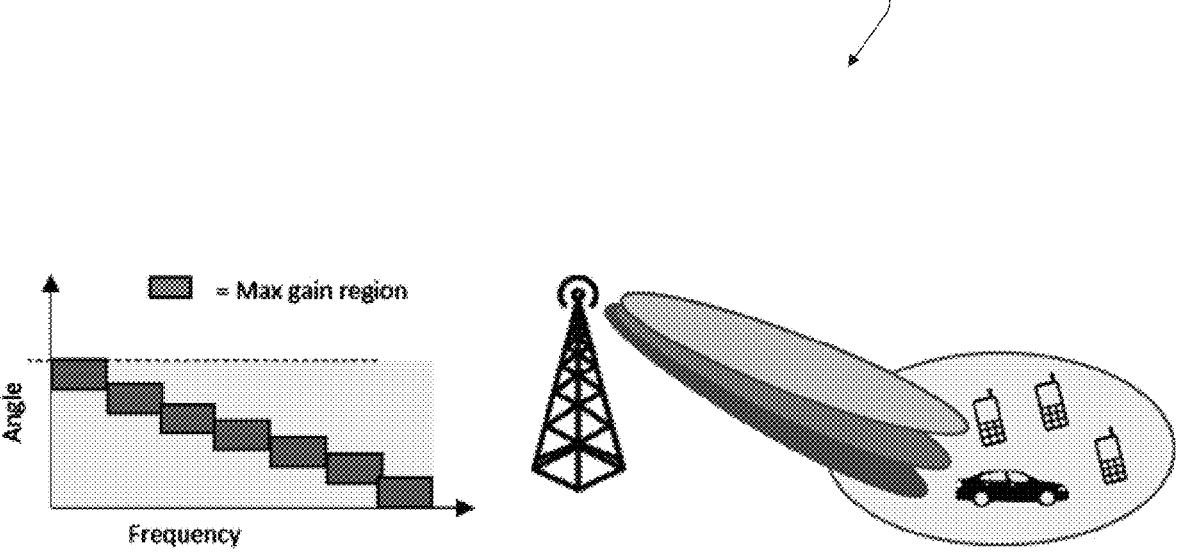
FIG. 8 illustrates an example of joint phase-time array (JPTA) based beamforming according to embodiments of the present disclosure.

FIG. 8 illustrates an example of a system 800 for JPTA based beamforming according to embodiments of the present disclosure. For example, the system 800 may be located in the wireless network 100 in FIG. 1. This example is for illustration only and other embodiments can be used without departing from the scope of the present disclosure.

In one embodiment of JPTA beamforming, the maximum gain region of the beam sweeps over an angle range as the signal frequency varies. At any signal frequency f, the desired beam creates the maximum possible array-gain in one angular direction $\theta(f)$. As f varies linearly over the system bandwidth, the angular direction $\theta(f)$ also sweeps linearly over a certain angular region $[\theta_0-\Delta\theta/2, \theta_0+\Delta\theta/2]$ as shown in FIG. 8. In this disclosure, we assume such behavior of JPTA beamforming; however, it should be noted that the embodiments in this disclosure can be applied to other behaviors of JPTA beamforming 800 as well. This example is for illustration only and other embodiments can be used without departing from the scope of the present disclosure.

Figure 9:
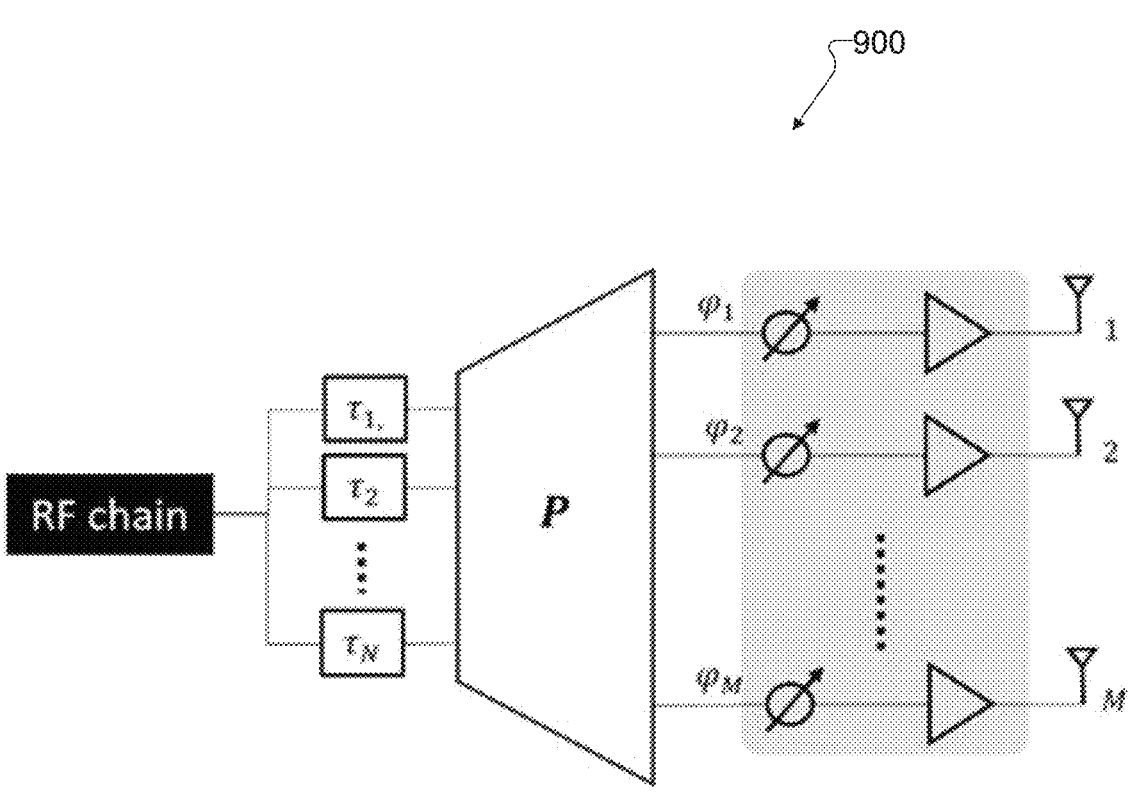
FIG. 9 illustrates an example of a JPTA based array architecture according to embodiments of the present disclosure.

FIG. 9 illustrates an example of a JPTA based array architecture 900 according to embodiments of the present disclosure. For example, the architecture 900 may be located in the gNB 101 and/or the UE 116 in FIG. 1. This example is for illustration only and other embodiments can be used without departing from the scope of the present disclosure.

In one embodiment, a layout with a single base-station (BS) serving many users in its coverage area and operating with a system bandwidth W around a center frequency $f_0$ is provided. The BS 102 is assumed to have a uniform linear antenna array having M elements, and $N_{RF}=1$ RF chain. Note that the disclosure can be directly extended to planar array configurations. The antenna spacing is half-wavelength at the center frequency $f_0$. Each of the M antennas has a dedicated phase-shifter, and they are connected to the single RF chain via a network of $N \leq M$ Time Division Duplexing (TTDs) as shown in FIG. 9. Here P is a fixed M×N mapping matrix, where each row m has one non-zero entry and determines which of the N TTDs antenna m is connected to. The TTDs are assumed to be configurable, with a delay variation range of $0 \leq \tau \leq KW$, where K is a design parameter to be selected. The phase-shifters are assumed to have unit magnitude and have arbitrarily reconfigurable phase $-\pi \leq \phi \leq \phi$. Transmission in both uplink and downlink directions is performed using OFDM with K subcarriers indexed as $$\mathcal{K} = \left\{ \left\lfloor \frac{1-K}{2} \right\rfloor, \dots, \left\lfloor \frac{K-1}{2} \right\rfloor \right\}.$$

Then, the M×1 downlink TX signal on sub-carrier $k \in K$ for a representative OFDM symbol can be expressed as $$x_k = \frac{1}{\sqrt{M}} \begin{bmatrix} e^{j\varphi_1} & \dots & 0 \\ \vdots & \ddots & \vdots \\ 0 & \dots & e^{j\varphi_M} \end{bmatrix} P \begin{bmatrix} e^{j2\pi f_k \tau_1} \\ \vdots \\ e^{j2\pi f_k \tau_N} \end{bmatrix} \alpha_k s_k = TP d_k \alpha_k s_k$$

where $S_k$ and $\alpha_k$ are the scalar data and digital beamforming on the k-th subcarrier, $f_k$ is the frequency of the k-th sub-carrier (including the carrier frequency), $\tau_n$ is the delay of the n-th TTD and $\phi_m$ is the phase of the m phase-shifter connected to the m-th antenna. Note that from the equation above the total transmit power of the BS 102 can be given

14 by $P_{sum}=\Sigma_{k \in K}|\alpha_k|^2$. Note that for this JPTA architecture, the effective downlink unit-norm analog beamformer on sub-carrier k is $e_k=TPd_k$, where the M×M diagonal matrix T captures the effect of phase-shifters and the N×1 vector $d_k$ captures the effect of TTDs. It can be shown that the same beamformer is also applicable at the BS 102 for an uplink scenario.

It is evident that when JPTA beamforming implementation is utilized, a significant departure from analog-based beam management occurs. That is, while analog beam management applies one analog beam for the entire system bandwidth or bandwidth part, JPTA beamforming implementation allows the system to use different analog beams for different parts of the system bandwidth or bandwidth part which amounts to "frequency-selective" beam management (FSBM). Therefore, there is a need for enabling frequency-selective beam management operation wherein different analog beams (associated with TCI states, source RS resources, and/or measurement RS resources) can be utilized for different parts/portions of the system bandwidth or bandwidth parts.

Figure 10:
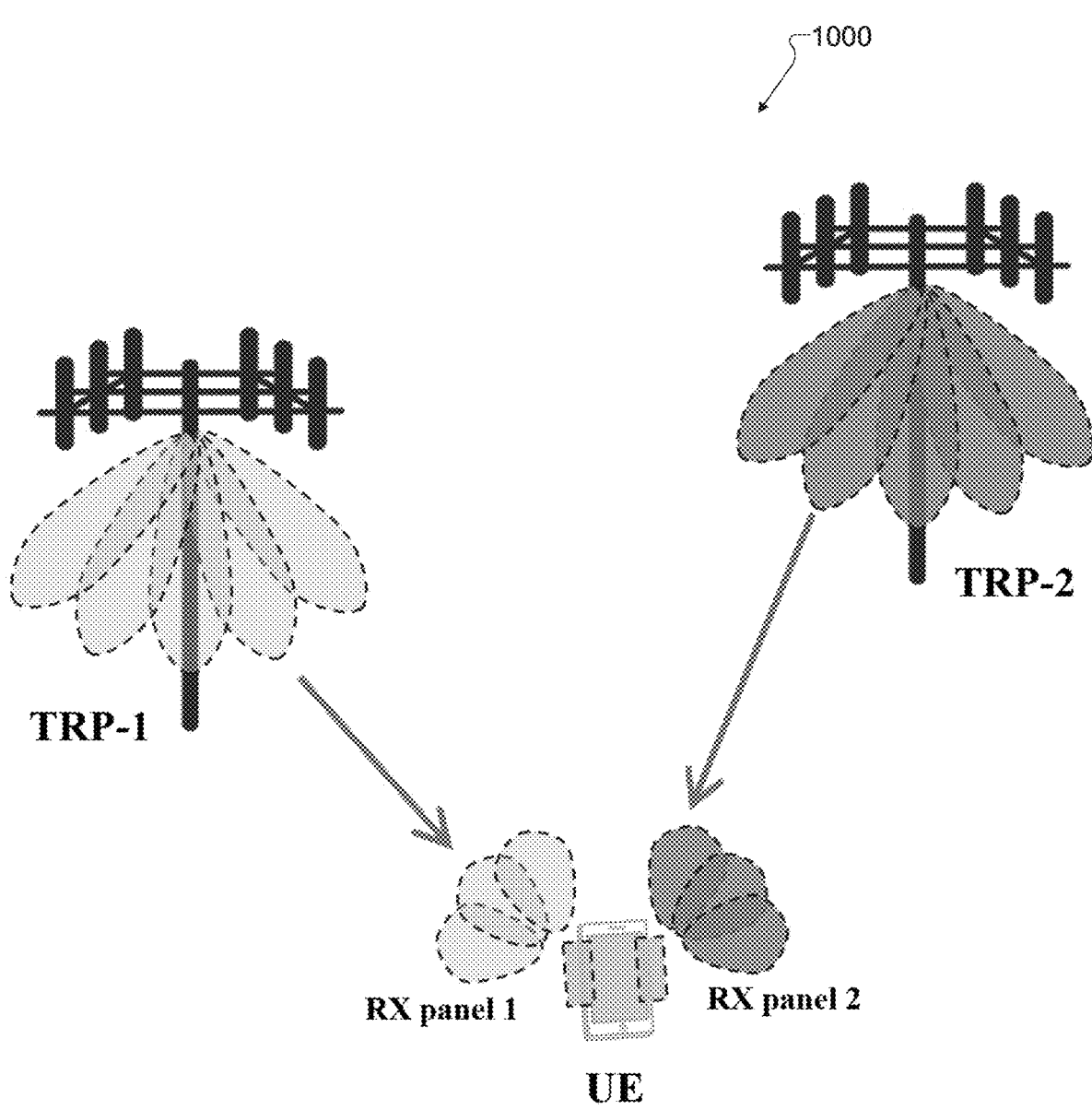
FIG. 10 illustrates an example of a multi-TRP according to embodiments of the present disclosure.

FIG. 10 illustrates an example system 1000 of a multi-TRP according to embodiments of the present disclosure. For example, the system 1000 may operate within the wireless network 100 in FIG. 1. This example is for illustration only and other embodiments can be used without departing from the scope of the present disclosure.

In a wireless communication system, a UE could simultaneously transmit/receive one or more RSs/channels to/from multiple (more than one) transmission-reception points (TRPs), wherein two TRPs, TRP-1 and TRP-2, are deployed. In embodiments of the present disclosure, a TRP can represent a collection of measurement antenna ports, measurement RS resources, and/or control resource sets (CORESETs). For example, a TRP could be associated with/represented by one or more of the following: a plurality of CSI-RS resources such as SSB resources/SSB resource indexes or non-zero power (NZP) CSI-RS resources/NZP CSI-RS resource configuration indexes; a plurality of CRIs (CSI-RS resource indices/indicators) or SSBRIs (SSB resource indices/indicators); a measurement RS resource set, for example, a CSI-RS resource set (e.g., a SSB resource set provided by CSI-SSB-ResourceSet or a NZP CSI-RS resource set provided by NZP-CSI-RS-ResourceSet) along with its indicator; a plurality of CORESETs associated with a CORESETPoolIndex, or a CORESET pool index; a plurality of CORESETs associated with a CORESETGroupIndex, or a CORESET group index; a plurality of CORESETs associated with a TRP-specific index/indicator/identity such as a physical cell ID (PCI); an entity ID corresponding to a PCI, a PCI index pointing to an entry/PCI in a list/set/pool of PCIs that are higher layer configured to the UE 116, a CORESET pool index, a CORESET group index, a 1-bit indicator with '0' indicating a first TRP (or the serving cell PCI or a PCI other than the serving cell PCI) and '1' indicating a second TRP (or a PCI other than the serving cell PCI or the serving cell PCI), a TRP-specific index/ID value, a TRP-specific higher layer signaling index/ID value, a TRP-specific RS set index/ID value, and etc.

Different TRPs in the multi-TRP system could be placed at different locations (i.e., physically non-co-located) and connected through ideal/non-ideal backhauls. Each TRP can include at least one antenna panel comprising multiple antenna elements. The multiple communication links established between the TRPs and the UE 116 can increase the system throughput and/or improve the system diversity gain/reliability.

Different TRPs in the multi-TRP system could share/broadcast the same physical cell identity (PCI) or have/broadcast different PCIs. In this disclosure, the non-serving cell(s) or the non-serving cell TRP(s) could have/broadcast different physical cell IDs (PCIs) and/or other higher layer signaling index values from that of the serving cell or the serving cell TRP (i.e., the serving cell PCI). In one example, the serving cell or the serving cell TRP could be associated with the serving cell ID (SCI) and/or the serving cell PCI. That is, for the inter-cell operation presented in the present disclosure, different cells/TRPs could broadcast different PCIs, and/or one or more cells/TRPs (referred to/defined as non-serving cells/TRPs in the present disclosure) could broadcast different PCIs from that of the serving cell/TRP (i.e., the serving cell PCI) and/or one or more cells/TRPs are not associated with valid SCI (e.g., provided by the higher layer parameter ServCellIndex). In the present disclosure, a non-serving cell PCI can also be referred to as an additional PCI, another PCI, or a different PCI (with respect to the serving cell PCI).

A UE could be indicated/configured/provided by the network 130, e.g., via higher layer RRC signaling/parameter and/or medium access control (MAC) control element (CE) command and/or dynamic downlink control information (DCI) based signaling, FSBM is enabled (or not enabled/disabled). According to embodiments of the present disclosure, the FSBM could be enabled/disabled for single-TRP or multi-TRP systems.

In one example, the UE 116 could receive from the network 130, e.g., in the higher layer parameter CSI-ResportConfig that configures a CSI reporting setting, CSI-ResourceConfig that configures a CSI resource setting, CSI-SSB-ResourceSet/NZP-CSI-RS-ResourceSet that configures a CSI resource set, NZP-CSI-RS-Resource that configures a NZP CSI-RS resource, TCI-State/QCL-Info/DLor-JointTCI-State/UL-TCIState that configures a TCI state, a higher layer parameter, e.g., denoted by FreqSelectiveBeamManagement, set to 'enabled'/'disabled' to turn on/off frequency selective or frequency subband specific/dependent beam management (for single-TRP or multi-TRP operations). When/if the higher layer parameter FreqSelectiveBeamManagement that is configured/provided in the higher layer parameter(s) CSI-ReportConfig, CSI-ResourceConfig, CSI-SSB-ResourceSet/NZP-CSI-RS-ResourceSet or NZP-CSI-RS-Resource is set to 'enabled', the corresponding CSI reporting setting, CSI resource setting, CSI resource set (e.g., SSB resource set or NZP CSI-RS resource set) or NZP CSI-RS resource could be referred to as the CSI reporting setting for FSBM, CSI resource setting for FSBM, CSI resource set (e.g., SSB resource set or NZP CSI-RS resource set) for FSBM, or NZP CSI-RS resource for FSBM.

In another example, the UE 116 could receive from the network 130, e.g., a MAC CE activation/deactivation command, to activate and/or deactivate the FSBM or the frequency selective/frequency subband specific/dependent beam management (for single-TRP or multi-TRP operations).

In yet another example, one or more new/dedicated DCI fields could be introduced in a DCI format (e.g., DCI format 1_1 or 1_2) or one or more bits/codepoints of one or more existing/reserved DCI fields in a DCI format (e.g., DCI format 1_1 or 1_2) could be repurposed to indicate that the FSBM or the frequency selective/frequency subband specific/dependent beam management (for single-TRP or multi-TRP operations) is enabled. For instance, the UE 116 could receive, e.g., in a DCI, a one-bit indicator set to '1' (or '0') indicating that the FSBM or the frequency selective/frequency subband specific/dependent beam management (for single-TRP or multi-TRP operations) is enabled, and/or '0' (or '1') indicating that the FSBM or the frequency selective/frequency subband specific/dependent beam management (for single-TRP or multi-TRP operation) is not enabled/disabled. As discussed herein, the one-bit indicator could be indicated in a DCI by introducing one or more new/dedicated DCI fields in a DCI format (e.g., DCI format 1_1 or 1_2) or repurposing one or more bits/codepoints of one or more existing/reserved DCI fields in a DCI format (e.g., DCI format 1_1 or 1_2).

When the FSBM or frequency selective/frequency subband specific/dependent beam management is enabled for single-TRP or multi-TRP operations (according to one or more examples described herein), a UE could be configured/indicated/provided by the network 130, e.g., via higher layer RRC signaling/parameter and/or MAC CE command and/or dynamic DCI based signaling, one or more (e.g., $N_{meas} \geq 1$) frequency subbands each comprising one or more physical resource blocks (PRBs) for frequency-selective beam measurement for FSBM—referred to as $N_{meas}$ FSBM measurement subbands in the present disclosure. The one or more frequency subbands, or the $N_{meas}$ FSBM measurement subbands, could be for one or more TRPs. The one or more PRBs in each FSBM measurement subband could be continuous, e.g., continuously indexed in frequency, or non-continuous. The UE 116 could be configured/indicated/provided by the network 130, e.g., via higher layer RRC signaling/parameter and/or MAC CE command and/or dynamic DCI based signaling, FSBM measurement subband size(s)—in number of PRBs (or size of each of the FSBM measurement subbands in number of PRBs)—for one or more TRPs.

For instance, for at least one TRP example described herein, the UE 116 could be first indicated/configured/provided by the network 130, e.g., via higher layer RRC signaling/parameter and/or MAC CE command and/or dynamic DCI based signaling, a bandwidth part (BWP) (and therefore, the corresponding BWP size in number of PRBs, etc.) for FSBM.

For another instance, the UE 116 could be provided by the network 130, e.g., in a CSI resource setting provided by CSI-ResourceConfig or a CSI reporting setting provided by CSI-ReportConfig, a higher layer parameter subbandsizeforFSBMmeas set to either 'value1' or 'value2'.

For yet another instance, if the higher layer parameter subbandsizeforFSBMmeas is set to 'value1', the first value/number of subband size corresponding/associated to the BWP is used/determined as the FSBM measurement subband size for the corresponding TRP(s); if the higher layer parameter subbandsizeforFSBMmeas is set to 'value2', the second value/number of subband size corresponding/associated to the BWP is used/determined as the FSBM measurement subband size for the corresponding TRP(s).

For yet another instance, the association/mapping between the potential/candidate subband size(s) and BWP(s) could be fixed in the system specifications (e.g., in the 3GPP TS 38.214)—see TABLE 1 in the present disclosure, and known to both the network 130 and UE sides a prior. As can be seen from TABLE 1 in the present disclosure, each BWP could correspond to two candidate values/numbers of (FSBM) subband size. Alternatively, the UE 116 could be configured/indicated/provided by the network 130, e.g., via higher layer RRC signaling/parameter and/or MAC CE command and/or dynamic DCI based signaling, the potential/candidate subband size(s) for a BWP or the association/mapping between the potential/candidate subband size(s)

and BWP(s). Optionally, the potential/candidate subband size(s) could be a multiple (e.g., m≥1) of the subband size(s) shown/provided in TABLE 1: e.g., 4 m PRBs subband size and 8 m PRBs subband size for 24-72 PRBs BWP, 8 m PRBs subband size and 16 m PRBs subband size for 73-144 PRBs BWP, and 16 m PRBs subband size and 32 m PRBs subband size for 145-275 PRBs BWP. In the present disclosure, the UE 116 could be configured/provided/indicated by the network 130, e.g., via higher layer RRC signaling/parameter and/or MAC CE command and/or dynamic DCI based layer 1 (L1) signaling, the value/number of m.

TABLE 1

| Bandwidth part (BWP) - PRBs | Subband size (PRBs) |
|---|---|
| <24 | N/A |
| 24-72 | 4, 8 |
| 73-144 | 8, 16 |
| 145-275 | 16, 32 |

According to one or more examples described herein, for a single-TRP system, a UE could be configured by the network 130 a single FSBM measurement subband size (for a BWP).

In another example, for a multi-TRP system comprising $N_{trp}$ TRPs, a UE could be configured by the network 130 a single FSBM measurement subband size (for a BWP) for all TRPs.

In yet another example, for a multi-TRP system comprising $N_{trp}$ TRPs, a UE could be configured by the network 130 one or more (e.g., $N_{trp}$) FSBM measurement subband sizes (each for a BWP) each for at least one TRP in the multi-TRP system.

For example, the association/mapping between the configured one or more FSBM measurement subband sizes and the TRPs (and therefore, the corresponding CSI resource sets, PCIs, CORESET pool index values, etc.) are fixed. For instance, for $N_{trp}=2$, the configured first (or second) FSBM measurement subband size could be for the first TRP (e.g., the configured first CSI resource set, the serving cell PCI, value 0 of CORESET pool index, a first entity ID, etc.), and the configured second (or first) FSBM measurement subband size could be for the second TRP (e.g., the configured second CSI resource set, a PCI other than the serving cell PCI, value 1 of CORESET pool index, a second entity ID, etc.).

For another example, the UE 116 could be configured/indicated/provided by the network 130, e.g., via higher layer RRC signaling/parameter and/or MAC CE command and/or dynamic DCI based signaling, the association/mapping between the configured one or more FSBM measurement subband sizes and the TRPs (and therefore, the corresponding CSI resource sets, PCIs, CORESET pool index values, etc.).

Furthermore, the UE 116 could be indicated/configured/provided by the network 130, e.g., via higher layer RRC signaling/parameter and/or MAC CE command and/or dynamic DCI based signaling, one or more first bitmaps each for at least one TRP described herein. Each bit position/entry in a first bitmap could correspond to a subband within the BWP. For instance, the UE 116 could receive from the network 130, e.g., in a CSI resource setting provided by CSI-ResourceConfig or a CSI resource set provided by CSI-SSB-ResourceSet/NZP-CSI-RS-ResourceSet or a CSI-RS resource provided by NZP-CSI-RS-Resource or a CSI reporting setting provided by CSI-ReportConfig, the one or more first bitmaps. If a bit position/entry of a first bitmap is set to '1' (or '0'), the frequency subband corresponding/associated to the bit position/entry of the first bitmap is used/determined as a FSBM measurement subband for the TRP(s) associated/corresponding to the first bitmap. For this case, the first bitmap could contain/comprise $N_{meas}$ bit positions/entries set to '1's (or '0's) indicating/configuring a total of $N_{meas}$ FSBM measurement subbands for the corresponding/associated TRP(s). Different first bitmaps could have the same bit position(s)/entry(s) set to '1' (or '0') indicating that the same FSBM measurement subband(s) could be configured for different TRPs. Furthermore, the one or more first bitmaps described herein could be provided/configured/indicated in one or more MAC CE activation/deactivation commands.

In one example, for a single-TRP system, a UE could be configured by the network 130 a total of $N_{meas}$ FSBM measurement subbands (e.g., via a first bitmap).

In another example, for a multi-TRP system comprising $N_{trp}$ TRPs, a UE could be configured by the network 130 a total of $N_{meas}$ FSBM measurement subbands (e.g., via a first bitmap) for all the $N_{trp}$ TRPs.

For example, all the configured $N_{meas}$ FSBM measurement subbands (e.g., via a bitmap) are for each of the $N_{trp}$ TRPs. For instance, for $N_{trp}=2$, all the configured $N_{meas}$ FSBM measurement subbands could be for the first TRP (e.g., the configured first CSI resource set, the serving cell PCI, value 0 of CORESET pool index, a first entity ID, etc.), and all the configured $N_{meas}$ FSBM measurement subbands could be for the second TRP (e.g., the configured second CSI resource set, a PCI other than the serving cell PCI, value 1 of CORESET pool index, a second entity ID, etc.).

For another example, the UE 116 could be configured/indicated/provided by the network 130, e.g., via higher layer RRC signaling/parameter and/or MAC CE command and/or dynamic DCI based L1 signaling, the number(s) of FSBM measurement subbands (e.g., $N_{meas,1}$, $N_{meas,2}$, . . . , $N_{meas,Ntrp}$ with $N_{meas,1}+N_{meas,2}+$ . . . $+N_{measNtrp}=N_{meas}$) each for at least one TRP described herein. In one example, the association/mapping between the configured/indicated/provided numbers of FSBM measurement subbands and the TRPs (and therefore, the corresponding CSI resource sets, PCIs, CORESET pool index values, etc.) is fixed. For instance, for $N_{trp}=2$, the first (or second) configured/indicated/provided number of FSBM measurement subbands, e.g., $N_{meas,1}$ (or $N_{meas,2}$), and therefore, the corresponding FSBM measurement subbands 1, . . . , $N_{meas,1}$ (or $N_{meas,1}+1$, . . . , $N_{meas}$), could be for the first TRP (e.g., the configured first CSI resource set, the serving cell PCI, value 0 of CORESET pool index, a first entity ID, etc.), and the second (or first) configured/indicated/provided number of FSBM measurement subbands, e.g., $N_{meas,2}$ (or $N_{meas,1}$), and therefore, the corresponding FSBM measurement subbands $N_{meas,1}+1$, . . . , $N_{meas}$ (or 1, . . . , $N_{meas,1}$), could be for the second TRP (e.g., the configured second CSI resource set, a PCI other than the serving cell PCI, value 1 of CORESET pool index, a second entity ID, etc.). In another example, the UE 116 could be provided/indicated/configured by the network 130, e.g., via higher layer RRC signaling/parameter and/or MAC CE command and/or dynamic DCI based L1 signaling, the association/mapping between the configured/indicated/provided numbers of FSBM measurement subbands (and therefore, the corresponding FSBM measurement subbands/FSBM measurement subband indexes) and the TRPs.

Yet for another example, the UE 116 could be configured/indicated/provided by the network 130, e.g., via higher layer RRC signaling/parameter and/or MAC CE command and/or dynamic DCI based L1 signaling, one or more (e.g., $N_{trp}$)

second bitmaps each for at least one TRP described herein. Each bit position/entry in a second bitmap could correspond to a FSBM measurement subband (out of the $N_{meas}$ FSBM measurement subbands). If a bit position/entry in a second bitmap is set to '1' (or '0'), the FSBM measurement subband corresponding/associated to the bit position/entry is for the TRP(s) corresponding/associated to the second bitmap. In one example, the association/mapping between the second bitmaps (and therefore, the corresponding FSBM measurement subbands) and the TRPs (and therefore, the corresponding CSI resource sets, PCIs, CORESET pool index values, etc.) is fixed. For instance, for $N_{trp}$=2, the 1st (or 2nd) second bitmap (and therefore, the corresponding FSBM measurement subbands) could be for the first TRP (e.g., the configured first CSI resource set, the serving cell PCI, value 0 of CORESET pool index, a first entity ID, etc.), and the 2nd (or 1st) second bitmap (and therefore, the corresponding FSBM measurement subbands) could be for the second TRP (e.g., the configured second CSI resource set, a PCI other than the serving cell PCI, value 1 of CORESET pool index, a second entity ID, etc.). In another example, the UE 116 could be provided/indicated/configured by the network 130, e.g., via higher layer RRC signaling/parameter and/or MAC CE command and/or dynamic DCI based L1 signaling, the association/mapping between the second bitmaps (and therefore, the corresponding FSBM measurement subbands) and the TRPs. Different second bitmaps could have the same bit position(s)/entry(s) set to '1' (or '0') indicating that the same FSBM measurement subband(s) could be for different TRPs. Furthermore, the one or more second bitmaps described herein could be provided/configured/indicated in one or more MAC CE activation/deactivation commands.

Yet for another example, the UE 116 could be configured/indicated/provided by the network 130, e.g., via higher layer RRC signaling/parameter and/or MAC CE command and/or dynamic DCI based L1 signaling, one or more (e.g., $N_{trp}$) sets of FSBM measurement subband indexes each for at least one TRP described herein. In one example, the association/mapping between the sets of FSBM measurement subband indexes (and therefore, the corresponding FSBM measurement subbands) and the TRPs (and therefore, the corresponding CSI resource sets, PCIs, CORESET pool index values, etc.) is fixed. For instance, for $N_{trp}$=2, the first (or second) set of FSBM measurement subband indexes (and therefore, the corresponding FSBM measurement subbands) could be for the first TRP (e.g., the configured first CSI resource set, the serving cell PCI, value 0 of CORESET pool index, a first entity ID, etc.), and the second (or first) set of FSBM measurement subband indexes (and therefore, the corresponding FSBM measurement subbands) could be for the second TRP (e.g., the configured second CSI resource set, a PCI other than the serving cell PCI, value 1 of CORESET pool index, a second entity ID, etc.). In another example, the UE 116 could be provided/indicated/configured by the network 130, e.g., via higher layer RRC signaling/parameter and/or MAC CE command and/or dynamic DCI based L1 signaling, the association/mapping between the sets of FSBM measurement subband indexes (and therefore, the corresponding FSBM measurement subbands) and the TRPs. Different sets could have the same subband index(es) indicating that the same FSBM measurement subband(s) could be for different TRPs.

Yet for another example, the UE 116 could receive from the network 130 one or more (e.g., $N_{trp}$) MAC CE activation commands each for at least one TRP described herein—e.g., a MAC CE activation command could contain/provide/include a TRP-specific entity ID such as a CSI resource set index/ID, a PCI, a value of CORESET pool index, an entity ID, etc. Each MAC CE activation command could activate one or more FSBM measurement subbands (out of the $N_{meas}$ FSBM measurement subbands) for the corresponding TRP(s). In one example, the association/mapping between the MAC CE activation commands (and therefore, the corresponding FSBM measurement subbands) and the TRPs (and therefore, the corresponding CSI resource sets, PCIs, CORESET pool index values, etc.) is fixed. For instance, for $N_{trp}$=2, the 1st (or 2nd) MAC CE activation command (and therefore, the corresponding FSBM measurement subbands) could be for the first TRP (e.g., the configured first CSI resource set, the serving cell PCI, value 0 of CORESET pool index, a first entity ID, etc.), and the 2nd (or 1st) MAC CE activation command (and therefore, the corresponding FSBM measurement subbands) could be for the second TRP (e.g., the configured second CSI resource set, a PCI other than the serving cell PCI, value 1 of CORESET pool index, a second entity ID, etc.). In another example, the UE 116 could be provided/indicated/configured by the network 130, e.g., via higher layer RRC signaling/parameter and/or MAC CE command and/or dynamic DCI based L1 signaling, the association/mapping between the MAC CE activation commands (and therefore, the corresponding FSBM measurement subbands) and the TRPs. Different MAC CE activation commands could indicate/provide/configure the same FSBM measurement subband(s) for different TRPs.

In yet another example, for a multi-TRP system comprising $N_{trp}$ TRPs, a UE could be configured by the network 130 $N_{meas,n}$ FSBM measurement subbands (e.g., via a first bitmap) for at least the n-th TRP, where $n \in \{1, \ldots, N_{trp}\}$.

For example, the association/mapping between the first bitmaps (and therefore, the corresponding FSBM measurement subbands) and the TRPs (and therefore, the corresponding CSI resource sets, PCIs, CORESET pool index values, etc.) is fixed. For instance, for $N_{trp}$=2, the 1st (or 2nd) first bitmap (and therefore, the corresponding $N_{meas,1}$ (or $N_{meas,2}$) FSBM measurement subbands) could be for the first TRP (e.g., the configured first CSI resource set, the serving cell PCI, value 0 of CORESET pool index, a first entity ID, etc.), and the 2nd (or 1st) first bitmap (and therefore, the corresponding $N_{meas,2}$ (or $N_{meas,1}$) FSBM measurement subbands) could be for the second TRP (e.g., the configured second CSI resource set, a PCI other than the serving cell PCI, value 1 of CORESET pool index, a second entity ID, etc.).

For another example, the UE 116 could be provided/indicated/configured by the network 130, e.g., via higher layer RRC signaling/parameter and/or MAC CE command and/or dynamic DCI based L1 signaling, the association/mapping between the first bitmaps (and therefore, the corresponding FSBM measurement subbands) and the TRPs.

In the present disclosure, the $N_{meas,x}$ FSBM measurement subbands configured for at least the x-th TRP in the multi-TRP system (following one or more examples described herein), and the $N_{meas,y}$ FSBM measurement subbands configured for at least the y-th TRP in the multi-TRP system (following one or more examples described herein), could be the same/identical, where $x,y \in \{1, \ldots, N_{trp}\}$, $x \neq y$.

According to Embodiments of the present disclosure, when the FSBM or frequency selective/frequency subband specific/dependent beam management is enabled for single-TRP operation (according to one or more examples described herein), a UE could be configured by the network 130 one or more RS resources for frequency-selective beam measurement for FSBM, and report to the network 130, e.g., in a CSI report, one or more beam/report quantities for one or more of the RS resources configured for the frequency-selective beam measurement for FSBM, wherein one RS resource (e.g., corresponding to a synchronization signal block (SSB) resource index or a NZP CSI-RS resource configuration index) could correspond to one or more FSBM measurement subbands configured for the single-TRP operation, and each of the reported beam/report quantities (e.g., comprising at least one resource indicator such as SSB/physical broadcast channel block resource indicator (SSBRI)/CSI reference signal indicator (CRI) and/or one beam metric such as L1-RSRP/L1-signal to interference ratio (SINR)) could correspond to one or more FSBM measurement subbands configured for the single-TRP operation.

In one example, when the FSBM or frequency selective/frequency subband specific/dependent beam management is enabled (according to one or more examples described herein), the UE 116 could be configured by the network 130 with one or more CSI-RS resources such as NZP CSI-RS resources (each provided by NZP-CSI-RS-Resource)—also referred to as CSI-RS resources for FSBM, in a CSI resource subset/group (e.g., provided by NZP-CSI-RS-ResourceSub-Set)—also referred to as a CSI resource subset/group for FSBM, or a CSI resource set (e.g., provided by NZP-CSI-RS-ResourceSet)—also referred to as a CSI resource set for FSBM, or a CSI resource setting (e.g., provided by CSI-ResourceConfig)—also referred to as a CSI resource setting for FSBM, each configured/associated with one or more (e.g., $1 \leq M_{meas} \leq N_{meas}$) of the total configured $N_{meas} \geq 1$ FSBM measurement subbands. In particular, for a CSI-RS resource (e.g., a NZP CSI-RS resource provided by NZP-CSI-RS-Resource) or each of the CSI-RS resources configured for frequency-selective beam measurement for FSBM, For example, all of the configured $N_{meas}$ FSBM measurement subbands could be active/used for frequency-selective beam measurement/reporting for the corresponding CSI-RS resource. For this case, $M_{meas} = N_{meas}$. The UE 116 could also be indicated/configured/provided by the network 130, e.g., via higher layer RRC signaling and/or MAC CE command and/or dynamic DCI based signaling, that $M_{meas} = N_{meas}$.

For another example, the UE 116 could be configured/indicated/provided by the network 130, e.g., via higher layer RRC signaling/parameter and/or MAC CE command and/or dynamic DCI based signaling, a bitmap of length $N_{meas}$ for the CSI-RS resource with each bit position/entry of the bitmap corresponding/associated to a FSBM measurement subband configured for the single-TRP operation. For instance, the UE 116 could receive from the network 130, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting, the bitmap. If a bit position/entry of the bitmap is set to '1' (or '0'), the FSBM measurement subband corresponding/associated with the bit position/entry is active/used for frequency-selective beam measurement/reporting for the corresponding CSI-RS resource. For this example, the bitmap could contain/comprise $1 \leq M_{meas} \leq N_{meas}$ bit positions/entries set to '1's (or '0's) indicating that a total of $M_{meas}$ FSBM measurement subbands—out of the total $N_{meas}$ configured FSBM measurement subbands for the single-TRP operation—could be active/used for the frequency-selective beam measurement/reporting for the corresponding CSI-RS resource. Furthermore, the UE 116 could be configured/indicated/provided by the network 130, e.g., via higher layer RRC signaling/parameter (e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting) and/or MAC CE command and/or dynamic DCI based signaling, $K \geq 1$ such bitmaps each associated/mapped to a CSI-RS resource configured therein—e.g., the first bitmap could be associated/mapped to the first CSI-RS resource, the second bitmap could be associated/mapped to the second CSI-RS resource, and so on. Different bitmaps could have the same bit position(s)/entry(s) set to '1' (or '0').

Yet for another example, the UE 116 could be configured/indicated/provided by the network 130, e.g., via higher layer RRC signaling/parameter and/or MAC CE command and/or dynamic DCI based signaling, a set of $1 \leq M_{meas} \leq N_{meas}$ (subband) indexes for the CSI-RS resource with each (subband) index corresponding/pointing to a FSBM measurement subband—e.g., the (subband) indexes $1, 2, \ldots, M_{meas}$ could correspond/point to the first FSBM measurement subband, the second FSBM measurement subband, . . . , the $M_{meas}$-th FSBM measurement subband, respectively, among all the configured $N_{meas}$ FSBM measurement subbands for the single-TRP operation. For instance, the UE 116 could receive from the network 130, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting, the set of (subband) indexes. For this case, the $M_{meas}$ FSBM measurement subband(s) corresponding/associated to the indicated/provided/configured (subband) index(es) could be active/used for the frequency-selective beam measurement/reporting for the corresponding CSI-RS resource. Furthermore, the UE 116 could be configured/indicated/provided by the network 130, e.g., via higher layer RRC signaling/parameter (e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting) and/or MAC CE command and/or dynamic DCI based signaling, $K \geq 1$ such sets of (subband) indexes each associated/mapped to a CSI-RS resource configured therein—e.g., the first set could be associated/mapped to the first CSI-RS resource, the second set could be associated/mapped to the second CSI-RS resource, and so on. Different sets of (subband) indexes could contain/comprise the same (subband) indexes.

In another example, when the FSBM or frequency selective/frequency subband specific/dependent beam management is enabled (according to one or more examples described herein), the UE 116 could be configured by the network 130 one or more (e.g., K≥1) CSI-RS resources such as NZP CSI-RS resources (each provided by NZP-CSI-RS-Resource)—also referred to as CSI-RS resources for FSBM, in a CSI resource subset/group (e.g., provided by NZP-CSI-RS-ResourceSubSet)—also referred to as a CSI resource subset/group for FSBM, or a CSI resource set (e.g., provided by NZP-CSI-RS-ResourceSet)—also referred to as a CSI resource set for FSBM, or a CSI resource setting (e.g., provided by CSI-ResourceConfig)—also referred to as a CSI resource setting for FSBM, each configured/associated with a FSBM measurement subband configured for the single-TRP operation. In particular, for the one or more (e.g., K≥1) CSI-RS resources (e.g., K≥1 NZP CSI-RS resources each provided by NZP-CSI-RS-Resource) configured in the same CSI resource subset/group (e.g., provided by NZP-CSI-RS-ResourceSubSet) or the same CSI resource set (e.g., provided by NZP-CSI-RS-ResourceSet) or the same CSI resource setting (e.g., provided by CSI-ResourceConfig) for frequency-selective beam measurement for FSBM.

For example, the first configured CSI-RS resource (e.g., the first NZP CSI-RS resource) could be associated/mapped to the first configured FSBM measurement subband, the second configured CSI-RS resource (e.g., the second NZP CSI-RS resource) could be associated/mapped to the second configured FSBM measurement subband, and so on, and the K-th configured CSI-RS resource (e.g., the K-th NZP CSI-RS resource) could be associated/mapped to the $N_{meas}$-th configured FSBM measurement subband. For this case, $K=N_{meas}$.

For another example, the UE 116 could be configured/indicated/provided by the network 130, e.g., via higher layer RRC signaling/parameter and/or MAC CE command and/or dynamic DCI based signaling, a bitmap of length $N_{meas}$ for the one or more (e.g., K≥1) CSI-RS resources configured in the same CSI resource subset/group or the same CSI resource set or the same CSI resource setting with each bit position/entry of the bitmap corresponding/associated to a FSBM measurement subband. For instance, the UE 116 could receive from the network 130, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting, the bitmap. If a bit position/entry of the bitmap is set to '1' (or '0'), the FSBM measurement subband corresponding/associated to the bit position/entry is active/used for frequency-selective beam measurement/reporting for one of the one or more (e.g., K≥1) CSI-RS resources (e.g., one of the K≥1 NZP CSI-RS resources). For this example, the bitmap could contain/comprise $1≤M_{meas}≤N_{meas}$ bit positions/entries set to '1's (or '0's) indicating that a total of $M_{meas}$ FSBM measurement subbands—out of the total $N_{meas}$ configured FSBM measurement subbands for the single-TRP operation—could be active/used for the frequency-selective beam measurement/reporting for the one or more (e.g., K≥1) CSI-RS resources (or the K≥1 NZP CSI-RS resources)—e.g., the first bit position/entry in the bitmap set to '1' (or '0')—and therefore, the corresponding FSBM measurement subband—could be associated/mapped to the first CSI-RS resource (or the first NZP CSI-RS resource), the second bit position/entry in the bitmap set to '1' (or '0')—and therefore, the corresponding FSBM measurement subband— could be associated/mapped to the second CSI-RS resource (or the second NZP CSI-RS resource), and so on, and the $M_{meas}$-th bit position/entry set to '1' (or '0')—and therefore, the corresponding FSBM measurement subband—could be associated/mapped to the K-th CSI-RS resource (or the K-th NZP CSI-RS resource). For this case, $M_{meas}$=K. Alternatively, the higher layer parameter NZP-CSI-RS-Resource that configures a NZP CSI-RS resource could contain/comprise/provide a bitmap of length $N_{meas}$ for the corresponding NZP CSI-RS resource with each bit position/entry of the bitmap corresponding/associated to a FSBM measurement subband. For instance, if a bit position/entry of the bitmap is set to '1' (or '0'), the FSBM measurement subband corresponding/associated with the bit position/entry could be used/active for the frequency-selective beam measurement/reporting for the corresponding NZP CSI-RS resource.

Yet for another example, the UE 116 could be configured/indicated/provided by the network 130, e.g., via higher layer RRC signaling/parameter and/or MAC CE command and/or dynamic DCI based signaling, a set of $1≤M_{meas}≤N_{meas}$ (subband) indexes for the one or more (e.g., K≥1) CSI-RS resources configured in the same CSI resource subset/group or the same CSI resource set or the same CSI resource setting with each (subband) index corresponding/pointing to a FSBM measurement subband—e.g., the (subband) indexes 1, 2, . . . , $M_{meas}$ could correspond/point to the first FSBM measurement subband, the second FSBM measurement subband, . . . , the $M_{meas}$-th FSBM measurement subband, respectively, among all the configured $N_{meas}$ FSBM measurement subbands for the single-TRP operation. For instance, the UE 116 could receive from the network 130, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting, the set of (subband) indexes. For this case, each of the $M_{meas}$ FSBM measurement subband(s) corresponding/associated to the indicated/provided/configured (subband) index(es) could be active/used for the frequency-selective beam measurement/reporting for one of the one or more (e.g., K≥1) CSI-RS resources (e.g., one of the K≥1 NZP CSI-RS resources)—e.g., the first (subband) index in the set—and therefore, the corresponding FSBM measurement subband—could be associated/mapped to the first CSI-RS resource (or the first NZP CSI-RS resource), the second (subband) index in the set—and therefore, the corresponding FSBM measurement subband—could be associated/mapped to the second CSI-RS resource (or the second NZP CSI-RS resource), and so on, and the $M_{meas}$-th (subband) index in the set—and therefore, the corresponding FSBM measurement subband—could be associated/mapped to the K-th CSI-RS resource (or the K-th NZP CSI-RS resource). For this case, $M_{meas}$=K. Alternatively, the higher layer parameter NZP-CSI-RS-Resource that configures a NZP CSI-RS resource could contain/comprise/provide a (subband) index for the corresponding NZP CSI-RS resource. For instance, the FSBM measurement subband corresponding/associated with the (subband) index could be used/active for the frequency-selective beam measurement/reporting for the corresponding NZP CSI-RS resource.

According to embodiments of the present disclosure, when the FSBM or frequency selective/frequency subband specific/dependent beam management is enabled for multi- TRP operation (according to one or more examples described herein), a UE could be configured by the network 130 one or more (e.g., S=2) RS resource groups or sets each associated/mapped to at least one TRP in the multi-TRP system; each configured RS resource group or set could comprise one or more RS resources for frequency-selective beam measurement for FSBM; the UE 116 could also report to the network 130, e.g., in a CSI report, one or more beam/report quantities for one or more of the RS resource groups/sets (and therefore, the RS resources configured therein) configured for the frequency-selective beam measurement for FSBM; here, one RS resource (e.g., corresponding to a SSB resource index or a NZP CSI-RS resource configuration index) could correspond to one or more FSBM measurement subbands configured for the multi-TRP operation, and each of the reported beam/report quantities (e.g., comprising at least one resource indicator such as SSBRI/CRI and/or one beam metric such as L1-RSRP/L1-SINR) could correspond to one or more FSBM measurement subbands configured for the multi-TRP operation.

In one example, when the FSBM or frequency selective/frequency subband specific/dependent beam management is enabled (according to one or more examples described herein), the UE 116 could be configured by the network 130, in a resource setting (e.g., provided by CSI-ResourceConfig), one or more (e.g., S≥1, or S=2) CSI resource sets for FSBM such as SSB resource sets each provided by CSI-SSB-ResourceSet or NZP CSI-RS resource sets each provided by NZP-CSI-RS-ResourceSet each associated/mapped to at least one TRP in the multi-TRP system. Furthermore, each configured CSI resource set for FSBM could comprise/configure/provide one or more CSI-RS resources such as NZP CSI-RS resources (each provided by NZP-CSI-RS-Resource)—also referred to as CSI-RS resources for FSBM—each configured/associated with one or more (e.g., $1 \leq M_{meas} \leq N_{meas}$) of the configured (e.g., $N_{meas} \geq 1$) FSBM measurement subbands for all the TRPs in the multi-TRP system. Alternatively, the s-th configured CSI resource set for FSBM in a resource setting could comprise/configure/provide one or more CSI-RS resources such as NZP CSI-RS resources (each provided by NZP-CSI-RS-Resource)—also referred to as CSI-RS resources for FSBM—each configured/associated with one or more (e.g., $1 \leq M_{meas,s} \leq N_{meas,s}$) of the configured (e.g., $N_{meas,s} \geq 1$) FSBM measurement subbands for at least the s-th TRP in the multi-TRP system, where $s \in \{1, \ldots, S\}$ or $s=1, \ldots, S$. In particular, for a CSI-RS resource (e.g., a NZP CSI-RS resource provided by NZP-CSI-RS-Resource) provided/configured/indicated in the s-th CSI resource set for FSBM in a resource setting ($s \in \{1, \ldots, S\}$, e.g., s=1 or 2) or each of the CSI-RS resources configured for frequency-selective beam measurement for FSBM in the s-th CSI resource set for FSBM in a resource setting ($s \in \{1, \ldots, S\}$, e.g., s=1 or 2).

Figure 11:
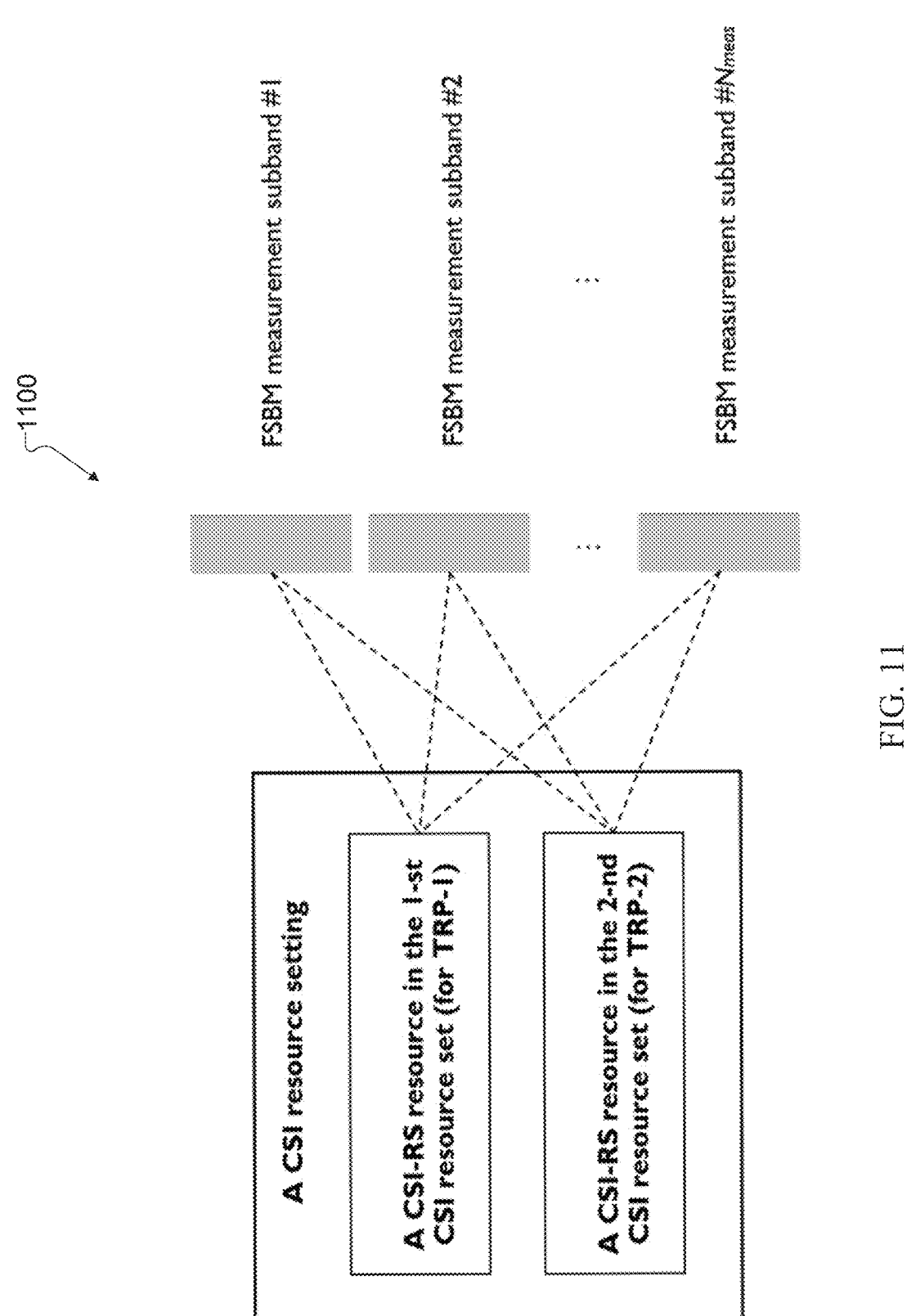
FIG. 11 illustrates an example of an association between the channel state information reference signal (CSI-RS) resources in the 1-st and 2-nd CSI resource sets and the $N_{meas}$ frequency-selective beam management (FSBM) measurement subbands according to embodiments of the present disclosure.

FIG. 11 illustrates an example association 1100 between the channel state information reference signal (CSI-RS) resources in the 1-st and 2-nd CSI resource sets and the $N_{meas}$ FSBM measurement subbands according to embodiments of the present disclosure. For example, association 1100 can be utilized by system 1000 in FIG. 10. This example is for illustration only and other embodiments can be used without departing from the scope of the present disclosure.

For example, all of the $N_{meas}$ FSBM measurement subbands configured for each of the TRPs (e.g., following one or more examples described herein) could be active/used for frequency-selective beam measurement/reporting for the corresponding CSI-RS resource in the s-th set. For this case, $M_{meas} = N_{meas}$. The UE 116 could also be indicated/configured/provided by the network 130, e.g., via higher layer RRC signaling and/or MAC CE command and/or dynamic DCI based signaling, that $M_{meas} = N_{meas}$ for the corresponding CSI-RS resource in the s-th set.

Figure 12:
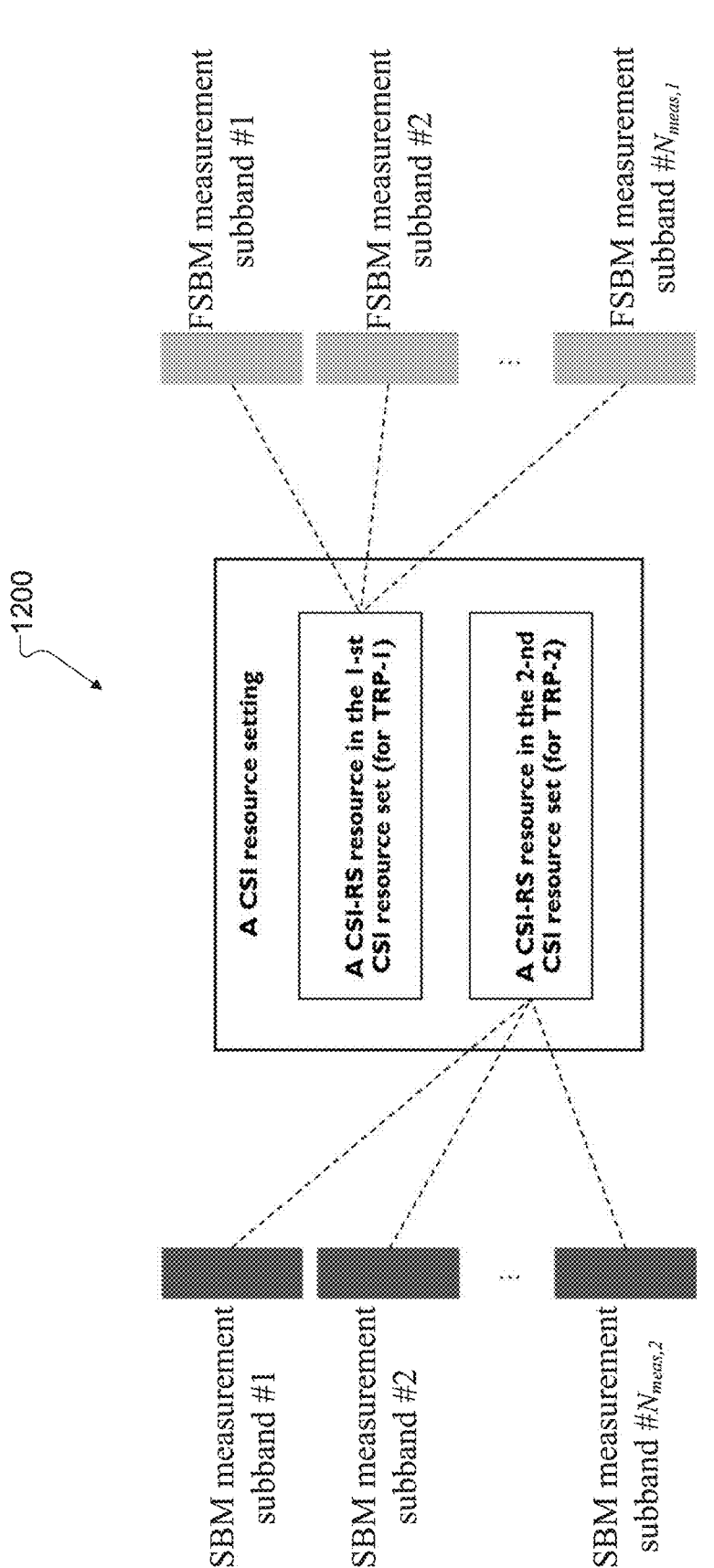
FIG. 12 illustrates an example of an association between the configured CSI-RS resources in the 1-st and 2-nd CSI resource sets and the corresponding $N_{meas,1}$ and $N_{meas,2}$ FSBM measurement subbands according to embodiments of the present disclosure.

FIG. 12 illustrates an example association 1200 between the configured CSI-RS resources in the 1-st and 2-nd CSI resource sets and the corresponding $N_{meas,1}$ and $N_{meas,2}$ FSBM measurement subbands according to embodiments of the present disclosure. For example, association 1200 can be utilized by UE 116 in FIG. 3 to report SINR parameters in system 1000 in FIG. 10. This example is for illustration only and other embodiments can be used without departing from the scope of the present disclosure.

For another example, the $N_{meas,s}$ FSBM measurement subbands configured for at least the s-th TRP (e.g., following one or more examples described herein) could be active/used for frequency-selective beam measurement/reporting for the corresponding CSI-RS resource in the s-th set. For this case, $M_{meas,s} = N_{meas,s}$. The UE 116 could also be indicated/configured/provided by the network 130, e.g., via higher layer RRC signaling and/or MAC CE command and/or dynamic DCI based signaling, that $M_{meas,s} = N_{meas,s}$ for the corresponding CSI-RS resource in the s-th set.

Yet for another example, the UE 116 could be configured/indicated/provided by the network 130, e.g., via higher layer RRC signaling/parameter and/or MAC CE command and/or dynamic DCI based signaling, a bitmap of length $N_{meas}$ for the CSI-RS resource in the s-th set with each bit position/entry of the bitmap corresponding/associated to a FSBM measurement subband configured for each of the TRPs in the multi-TRP system (e.g., following one or more examples described herein). For instance, the UE 116 could receive from the network 130, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting, the bitmap. If a bit position/entry of the bitmap is set to '1' (or '0'), the FSBM measurement subband corresponding/associated with the bit position/entry is active/used for frequency-selective beam measurement/reporting for the corresponding CSI-RS resource in the s-th set. For this example, the bitmap could contain/comprise $1 \leq M_{meas} \leq N_{meas}$ bit positions/entries set to '1's (or '0's) indicating that a total of $M_{meas}$ FSBM measurement subbands—out of the total $N_{meas}$ configured FSBM measurement subbands for each of the TRPs in the multi-TRP system (e.g., following one or more examples described herein)—could be active/used for the frequency-selective beam measurement/reporting for the corresponding CSI-RS resource in the s-th set. Furthermore, the UE 116 could be configured/indicated/provided by the network 130, e.g., via higher layer RRC signaling/parameter (e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting) and/or MAC CE command and/or dynamic DCI based signaling, $K_s \geq 1$ such bitmaps each associated/mapped to a CSI-RS resource configured in the s-th set—e.g., the first bitmap could be associated/mapped to the first CSI-RS resource in the s-th set, the second bitmap could be associated/mapped to the second CSI-RS resource in the s-th set, and so on. Different bitmaps could have the same bit position(s)/entry(s) set to '1' (or '0').

Yet for another example, the UE 116 could be configured/indicated/provided by the network 130, e.g., via higher layer RRC signaling/parameter and/or MAC CE command and/or dynamic DCI based signaling, a bitmap of length $N_{meas,s}$ for the CSI-RS resource in the s-th set with each bit position/entry of the bitmap corresponding/associated to a FSBM measurement subband configured for at least the s-th TRP in the multi-TRP system (e.g., following one or more examples described herein). For instance, the UE 116 could receive from the network 130, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting, the bitmap. If a bit position/entry of the bitmap is set to '1' (or '0'), the FSBM measurement subband corresponding/associated with the bit position/entry is active/used for frequency-selective beam measurement/reporting for the corresponding CSI-RS resource in the s-th set. For this example, the bitmap could contain/comprise $1 \leq M_{meas,s} \leq N_{meas,s}$ bit positions/entries set to '1's (or '0's) indicating that a total of $M_{meas,s}$ FSBM measurement subbands—out of the total $N_{meas,s}$ configured FSBM measurement subbands for at least the s-th TRP in the multi-TRP system (e.g., following one or more examples described herein)—could be active/used for the frequency-selective beam measurement/reporting for the corresponding CSI-RS resource in the s-th set. Furthermore, the UE 116 could be configured/indicated/provided by the network 130, e.g., via higher layer RRC signaling/parameter (e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting) and/or MAC CE command and/or dynamic DCI based signaling, $K_s \geq 1$ such bitmaps each associated/mapped to a CSI-RS resource configured in the s-th set—e.g., the first bitmap could be associated/mapped to the first CSI-RS resource in the s-th set, the second bitmap could be associated/mapped to the second CSI-RS resource in the s-th set, and so on. Different bitmaps could have the same bit position(s)/entry(s) set to '1' (or '0').

Yet for another example, the UE 116 could be configured/indicated/provided by the network 130, e.g., via higher layer RRC signaling/parameter and/or MAC CE command and/or dynamic DCI based signaling, a set of $1 \leq M_{meas} \leq N_{meas}$ (subband) indexes for the CSI-RS resource in the s-th CSI resource set with each (subband) index corresponding/pointing to a FSBM measurement subband—e.g., the (subband) indexes $1, 2, \ldots, M_{meas}$ could correspond/point to the first FSBM measurement subband, the second FSBM measurement subband, . . . , the $M_{meas}$-th FSBM measurement subband, respectively, among all the configured $N_{meas}$ FSBM measurement subbands for each of the TRPs in the multi-TRP system (e.g., following one or more examples described herein). For instance, the UE 116 could receive from the network 130, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting, the set of (subband) indexes. For this case, the $M_{meas}$ FSBM measurement subband(s) corresponding/associated to the indicated/provided/configured (subband) index(es) could be active/used for the frequency-selective beam measurement/reporting for the corresponding CSI-RS resource in the s-th CSI resource set. Furthermore, the UE 116 could be configured/indicated/provided by the network 130, e.g., via higher layer RRC signaling/parameter (e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting) and/or MAC CE command and/or dynamic DCI based signaling, $K_s \geq 1$ such sets of (subband) indexes each associated/mapped to a CSI-RS resource configured in the s-th CSI resource set—e.g., the first set could be associated/mapped to the first CSI-RS resource in the s-th CSI resource set, the second set could be associated/mapped to the second CSI-RS resource in the s-th CSI resource set, and so on. Different sets of (subband) indexes could contain/comprise the same (subband) indexes.

Yet for another example, the UE 116 could be configured/indicated/provided by the network 130, e.g., via higher layer RRC signaling/parameter and/or MAC CE command and/or dynamic DCI based signaling, a set of $1 \leq M_{meas,s} \leq N_{meas,s}$ (subband) indexes for the CSI-RS resource in the s-th CSI resource set with each (subband) index corresponding/pointing to a FSBM measurement subband—e.g., the (subband) indexes $1, 2, \ldots, M_{meas,s}$ could correspond/point to the first FSBM measurement subband, the second FSBM measurement subband, . . . , the $M_{meas,s}$-th FSBM measurement subband, respectively, among all the configured $N_{meas,s}$ FSBM measurement subbands for at least the s-th TRP in the multi-TRP system (e.g., following one or more examples described herein). For instance, the UE 116 could receive from the network 130, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting, the set of (subband) indexes. For this case, the $M_{meas,s}$ FSBM measurement subband(s) corresponding/associated to the indicated/provided/configured (subband) index(es) could be active/used for the frequency-selective beam measurement/reporting for the corresponding CSI-RS resource in the s-th CSI resource set. Furthermore, the UE 116 could be configured/indicated/provided by the network 130, e.g., via higher layer RRC signaling/parameter (e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting) and/or MAC CE command and/or dynamic DCI based signaling, $K_s \geq 1$ such sets of (subband) indexes each associated/mapped to a CSI-RS resource configured in the s-th CSI resource set—e.g., the first set could be associated/mapped to the first CSI-RS resource in the s-th CSI resource set, the second set could be associated/mapped to the second CSI-RS resource in the s-th CSI resource set, and so on. Different sets of (subband) indexes could contain/comprise the same (subband) indexes.

In another example, when the FSBM or frequency selective/frequency subband specific/dependent beam management is enabled (according to one or more examples described herein), the UE 116 could be configured by the network 130, in a resource setting (e.g., provided by CSI-ResourceConfig), one or more (e.g., $S \geq 1$, or $S=2$) CSI resource sets for FSBM such as SSB resource sets each provided by CSI-SSB-ResourceSet or NZP CSI-RS resource sets each provided by NZP-CSI-RS-ResourceSet each associated/mapped to at least one TRP in the multi-TRP system. Furthermore, each configured CSI resource set (e.g., the s-th CSI resource set with $s \in \{1, \ldots, S\}$ or $s=1, \ldots, S$) for FSBM could comprise/configure/provide one or more (e.g., $K_s \geq 1$ for the s-th set with $s \in \{1, \ldots, S\}$ or $s=1, \ldots, S$) CSI-RS resources such as NZP CSI-RS resources (each provided by NZP-CSI-RS-Resource)—also referred to as CSI-RS resources for FSBM—each configured/associated with a FSBM measurement subband configured for all the TRPs in the multi-TRP system. Alternatively, the s-th configured CSI resource set for FSBM in a resource setting could comprise/configure/provide one or more (e.g., $K_s \geq 1$) CSI-RS resources such as NZP CSI-RS resources (each provided by NZP-CSI-RS-Resource)—also referred to as CSI-RS resources for FSBM—each configured/associated with a FSBM measurement subband for at least the s-th TRP in the multi-TRP system, where $s \in \{1, \ldots, S\}$ or $s=1, \ldots, S$. In particular, for the one or more (e.g., $K_s \geq 1$) CSI-RS resources (e.g., $K_s \geq 1$ NZP CSI-RS resources each provided by NZP-CSI-RS-Resource) provided/configured/indicated in the s-th CSI resource set for FSBM in a resource setting ($s \in \{1, \ldots, S\}$, e.g., $s=1$ or 2).

For example, the first configured CSI-RS resource (e.g., the first NZP CSI-RS resource) in the s-th set could be associated/mapped to the first configured FSBM measurement subband among all the $N_{meas}$ FSBM measurement subbands configured for each of the TRPs in the multi-TRP system (e.g., following one or more examples described herein), the second configured CSI-RS resource (e.g., the second NZP CSI-RS resource) in the s-th set could be associated/mapped to the second configured FSBM measurement subband among all the $N_{meas}$ FSBM measurement subbands configured for each of the TRPs in the multi-TRP system (e.g., following the one or more examples described herein), and so on, and the $K_s$-th configured CSI-RS resource (e.g., the $K_s$-th NZP CSI-RS resource) in the s-th set could be associated/mapped to the $N_{meas}$-th configured FSBM measurement subband among all the $N_{meas}$ FSBM measurement subbands configured for each of the TRPs in the multi-TRP system (e.g., following one or more examples described herein). For this case, $K_s = N_{meas}$, where $s \in \{1, \ldots, S\}$ or $s=1, \ldots, S$.

For another example, the first configured CSI-RS resource (e.g., the first NZP CSI-RS resource) in the s-th set could be associated/mapped to the first configured FSBM measurement subband among all the $N_{meas,s}$ FSBM measurement subbands configured for at least the s-th TRP in the multi-TRP system (e.g., following one or more examples described herein), the second configured CSI-RS resource (e.g., the second NZP CSI-RS resource) in the s-th set could be associated/mapped to the second configured FSBM measurement subband among all the $N_{meas,s}$ FSBM measurement subbands configured for at least the s-th TRP in the multi-TRP system (e.g., following one or more examples described herein), and so on, and the $K_s$-th configured CSI-RS resource (e.g., the $K_s$-th NZP CSI-RS resource) in the s-th set could be associated/mapped to the $N_{meas,s}$-th configured FSBM measurement subband among all the $N_{meas,s}$ FSBM measurement subbands configured for the s-th TRP in the multi-TRP system (e.g., following one or more examples described herein). For this case, $K_s = N_{meas,s}$, where $s \in \{1, \ldots, S\}$ or $s=1, \ldots, S$.

Yet for another example, the UE 116 could be configured/indicated/provided by the network 130, e.g., via higher layer RRC signaling/parameter and/or MAC CE command and/or dynamic DCI based signaling, a bitmap of length $N_{meas}$ for the one or more (e.g., $K_s \geq 1$) CSI-RS resources configured in the same CSI resource set (e.g., the s-th set) with each bit position/entry of the bitmap corresponding/associated to a FSBM measurement subband configured for each of the TRPs in the multi-TRP system (e.g., following one or more examples described herein). For instance, the UE 116 could receive from the network 130, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting, the bitmap. If a bit position/entry of the bitmap is set to '1' (or '0'), the FSBM measurement subband corresponding/associated to the bit position/entry is active/used for frequency-selective beam measurement/reporting for one of the one or more (e.g., $K_s \geq 1$) CSI-RS resources (e.g., one of the $K_s \geq 1$ NZP CSI-RS resources). For this example, the bitmap could contain/comprise $1 \leq M_{meas} \leq N_{meas}$ bit positions/entries set to '1's (or '0's) indicating that a total of $M_{meas}$ FSBM measurement subbands—out of the total $N_{meas}$ configured FSBM measurement subbands for each of the TRPs in the multi-TRP system (e.g., following one or more examples described herein)—could be active/used for the frequency-selective beam measurement/reporting for the one or more (e.g., $K_s \geq 1$) CSI-RS resources (or the $K_s \geq 1$ NZP CSI-RS resources) in the s-th set—e.g., the first bit position/entry in the bitmap set to '1' (or '0')—and therefore, the corresponding FSBM measurement subband among all the $N_{meas}$ FSBM measurement subbands configured for each of the TRPs in the multi-TRP system (e.g., following one or more examples described herein)—could be associated/mapped to the first CSI-RS resource (or the first NZP CSI-RS resource) in the s-th set, the second bit position/entry in the bitmap set to '1' (or '0')—and therefore, the corresponding FSBM measurement subband among all the $N_{meas}$ FSBM measurement subbands configured for each of the TRPs in the multi-TRP system (e.g., following one or more examples described herein)—could be associated/mapped to the second CSI-RS resource (or the second NZP CSI-RS resource)

in the s-th set, and so on, and the $M_{meas}$-th bit position/entry set to '1' (or '0')—and therefore, the corresponding FSBM measurement subband among all the $N_{meas}$ FSBM measurement subbands configured for each of the TRPs in the multi-TRP system (e.g., following one or more examples described herein)—could be associated/mapped to the $K_s$-th CSI-RS resource (or the $K_s$-th NZP CSI-RS resource) in the s-th set. For this case, $M_{meas} = K_s$. Alternatively, the higher layer parameter NZP-CSI-RS-Resource that configures a NZP CSI-RS resource in the s-th set could contain/comprise/provide a bitmap of length $N_{meas}$ for the corresponding NZP CSI-RS resource with each bit position/entry of the bitmap corresponding/associated to a FSBM measurement subband for each of the TRPs in the multi-TRP system (e.g., following one or more examples described herein). For instance, if a bit position/entry of the bitmap is set to '1' (or '0'), the FSBM measurement subband corresponding/associated with the bit position/entry could be used/active for the frequency-selective beam measurement/reporting for the corresponding NZP CSI-RS resource in the s-th resource set.

Yet for another example, the UE 116 could be configured/indicated/provided by the network 130, e.g., via higher layer RRC signaling/parameter and/or MAC CE command and/or dynamic DCI based signaling, a bitmap of length $N_{meas,s}$ for the one or more (e.g., $K_s \geq 1$) CSI-RS resources configured in the same CSI resource set (e.g., the s-th set) with each bit position/entry of the bitmap corresponding/associated to a FSBM measurement subband configured for at least the s-th TRP in the multi-TRP system (e.g., following one or more examples described herein). For instance, the UE 116 could receive from the network 130, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-Resource-Set that configures a CSI resource set or the higher layer parameter CSI-ResourceConfig that configures a CSI resource setting or the higher layer parameter CSI-Report-Config that configures a CSI reporting setting, the bitmap. If a bit position/entry of the bitmap is set to '1' (or '0'), the FSBM measurement subband corresponding/associated to the bit position/entry is active/used for frequency-selective beam measurement/reporting for one of the one or more (e.g., $K_s \geq 1$) CSI-RS resources (e.g., one of the $K_s \geq 1$ NZP CSI-RS resources). For this example, the bitmap could contain/comprise $1 \leq M_{meas,s} \leq N_{meas,s}$ bit positions/entries set to '1's (or '0's) indicating that a total of $M_{meas,s}$ FSBM measurement subbands—out of the total $N_{meas,s}$ configured FSBM measurement subbands for at least the s-th TRP in the multi-TRP system (e.g., following one or more examples described herein)—could be active/used for the frequency-selective beam measurement/reporting for the one or more (e.g., $K_s \geq 1$) CSI-RS resources (or the $K_s \geq 1$ NZP CSI-RS resources) in the s-th set—e.g., the first bit position/entry in the bitmap set to '1' (or '0')—and therefore, the corresponding FSBM measurement subband among all the $N_{meas,s}$ FSBM measurement subbands configured for at least the s-th TRP in the multi-TRP system (e.g., following one or more examples described herein)—could be associated/mapped to the first CSI-RS resource (or the first NZP CSI-RS resource) in the s-th set, the second bit position/entry in the bitmap set to '1' (or '0')—and therefore, the corresponding FSBM measurement subband among all the $N_{meas,s}$ FSBM measurement subbands configured for at least the s-th TRP in the multi-TRP system (e.g., following one or more examples described herein)—could be associated/mapped to the second CSI-RS resource (or the second NZP CSI-RS resource) in the s-th set, and so on, and the $M_{meas,s}$-th bit position/entry set to '1' (or '0')—and therefore, the corresponding FSBM measurement subband among all the $N_{meas,s}$ FSBM measurement subbands configured for at least the s-th TRP in the multi-TRP system (e.g., following one or more examples described herein)—could be associated/mapped to the $K_s$-th CSI-RS resource (or the $K_s$-th NZP CSI-RS resource) in th s-th set. For this case, $M_{meas,s}$ $K_s$. Alternatively, the higher layer parameter NZP-CSI-RS-Resource that configures a NZP CSI-RS resource in the s-th set could contain/comprise/provide a bitmap of length $N_{meas,s}$ for the corresponding NZP CSI-RS resource with each bit position/entry of the bitmap corresponding/associated to a FSBM measurement subband for at least the s-th TRP in the multi-TRP system (e.g., following one or more examples described herein). For instance, if a bit position/entry of the bitmap is set to '1' (or '0'), the FSBM measurement subband corresponding/associated with the bit position/entry could be used/active for the frequency-selective beam measurement/reporting for the corresponding NZP CSI-RS resource in the s-th resource set.

Yet for another example, the UE 116 could be configured/indicated/provided by the network 130, e.g., via higher layer RRC signaling/parameter and/or MAC CE command and/or dynamic DCI based signaling, a set of $1 \leq M_{meas,s} \leq N_{meas}$ (subband) indexes for the one or more (e.g., $K_s \geq 1$) CSI-RS resources configured in the same CSI resource set (e.g., the s-th CSI resource set) with each (subband) index corresponding/pointing to a FSBM measurement subband configured for each of the TRPs in the multi-TRP system (e.g., following one or more examples described herein)—e.g., the (subband) indexes 1, 2, . . . , $M_{meas}$ could correspond/point to the first FSBM measurement subband, the second FSBM measurement subband, . . . , the $M_{meas}$-th FSBM measurement subband, respectively, among all the configured $N_{meas}$ FSBM measurement subbands for each of the TRPs in the multi-TRP system (e.g., according to one or more examples described herein). For instance, the UE 116 could receive from the network 130, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting, the set of (subband) indexes. For this case, each of the $M_{meas}$ FSBM measurement subband(s) corresponding/associated to the indicated/provided/configured (subband) index(es) could be active/used for the frequency-selective beam measurement/reporting for one of the one or more (e.g., $K_s \geq 1$) CSI-RS resources (e.g., one of the $K_s \geq 1$ NZP CSI-RS resources)—e.g., the first (subband) index in the set—and therefore, the corresponding FSBM measurement subband among all the $N_{meas}$ FSBM measurement subbands configured for each of the TRPs in the multi-TRP system (e.g., following one or more examples described herein)—could be associated/mapped to the first CSI-RS resource (or the first NZP CSI-RS resource) in the s-th CSI resource set, the second (subband) index in the set—and therefore, the corresponding FSBM measurement subband among all the $N_{meas}$ FSBM measurement subbands configured for each of the TRPs in the multi-TRP system (e.g., following oen or more examples described herein)—could be associated/mapped to the second CSI-RS resource (or the second NZP CSI-RS resource) in the s-th CSI resource set, and so on, and the $M_{meas}$-th (subband) index in the set—and therefore, the corresponding FSBM measurement subband among all the $N_{meas}$ FSBM measurement subbands configured for each of the TRPs in the multi-TRP system (e.g., following one or more examples described herein)—could be associated/mapped to the $K_s$-th CSI-RS resource (or the $K_s$-th NZP CSI-RS resource) in the s-th CSI resource set. For this case, $M_{meas}=K_s$. Alternatively, the higher layer parameter NZP-CSI-RS-Resource that configures a NZP CSI-RS resource in the s-th CSI resource set could contain/comprise/provide a (subband) index for the corresponding NZP CSI-RS resource. For instance, the FSBM measurement subband corresponding/associated with the (subband) index could be used/active for the frequency-selective beam measurement/reporting for the corresponding NZP CSI-RS resource in the s-th CSI resource set.

Yet for another example, the UE 116 could be configured/indicated/provided by the network 130, e.g., via higher layer RRC signaling/parameter and/or MAC CE command and/or dynamic DCI based signaling, a set of $1 \leq M_{meas,s} \leq N_{meas,s}$ (subband) indexes for the one or more (e.g., $K_s \geq 1$) CSI-RS resources configured in the same CSI resource set (e.g., the s-th CSI resource set) with each (subband) index corresponding/pointing to a FSBM measurement subband configured for at least the s-th TRP in the multi-TRP system (e.g., following one or more examples described herein)—e.g., the (subband) indexes 1, 2, . . . , $M_{meas,s}$ could correspond/point to the first FSBM measurement subband, the second FSBM measurement subband, . . . , the $M_{meas,s}$-th FSBM measurement subband, respectively, among all the configured $N_{meas,s}$ FSBM measurement subbands for at least the s-th TRPs in the multi-TRP system (e.g., following one or more examples described herein). For instance, the UE 116 could receive from the network 130, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting, the set of (subband) indexes. For this case, each of the $M_{meas,s}$ FSBM measurement subband(s) corresponding/associated to the indicated/provided/configured (subband) index(es) could be active/used for the frequency-selective beam measurement/reporting for one of the one or more (e.g., $K_s \geq 1$) CSI-RS resources (e.g., one of the $K_s \geq 1$ NZP CSI-RS resources)—e.g., the first (subband) index in the set—and therefore, the corresponding FSBM measurement subband among all the $N_{meas,s}$ FSBM measurement subbands configured for at least the s-th TRP in the multi-TRP system (e.g., following one or more examples described herein)—could be associated/mapped to the first CSI-RS resource (or the first NZP CSI-RS resource) in the s-th CSI resource set, the second (subband) index in the set—and therefore, the corresponding FSBM measurement subband among all the $N_{meas,s}$ FSBM measurement subbands configured for at least the s-th TRP in the multi-TRP system (e.g., following one or more examples described herein)—could be associated/mapped to the second CSI-RS resource (or the second NZP CSI-RS resource) in the s-th CSI resource set, and so on, and the $M_{meas,s}$-th (subband) index in the set—and therefore, the corresponding FSBM measurement subband among all the $N_{meas,s}$ FSBM measurement subbands configured for at least the s-th TRP in the multi-TRP system (e.g., following one or more examples described herein)—could be associated/ mapped to the $K_s$-th CSI-RS resource (or the $K_s$-th NZP CSI-RS resource) in the s-th CSI resource set. For this case, $M_{meas,s}=K_s$. Alternatively, the higher layer parameter NZP-CSI-RS-Resource that configures a NZP CSI-RS resource in the s-th CSI resource set could contain/comprise/provide a (subband) index for the corresponding NZP CSI-RS resource. For instance, the FSBM measurement subband corresponding/associated with the (subband) index could be used/active for the frequency-selective beam measurement/reporting for the corresponding NZP CSI-RS resource in the s-th CSI resource set.

In yet another example, when the FSBM or frequency selective/frequency subband specific/dependent beam management is enabled (according to one or more examples described herein), the UE 116 could be configured by the network 130, in a resource set (e.g., provided by CSI-SSB-ResourceSet/NZP-CSI-RS-ResourceSet), one or more (e.g., $S' \geq 1$, or $S'=2$) CSI resource subsets/groups for FSBM such as SSB resource subsets/groups (e.g., each provided by CSI-SSB-ResourceSubSet) or NZP CSI-RS resource subsets/groups (e.g., each provided by NZP-CSI-RS-ResourceSubSet) each associated/mapped to at least one TRP in the multi-TRP system. Furthermore, each configured CSI resource subset/group for FSBM could comprise/configure/provide one or more CSI-RS resources such as NZP CSI-RS resources (each provided by NZP-CSI-RS-Resource)—also referred to as CSI-RS resources for FSBM; each of the one or more CSI-RS resources for FSBM in a resource subset/group could be configured/associated with one or more (e.g., $1 \leq M_{meas} \leq N_{meas}$) of the configured (e.g., $N_{meas} \geq 1$) FSBM measurement subbands for all the TRPs in the multi-TRP system following one or more examples described herein by replacing CSI resource set(s) with CSI resource subset(s)/group(s) (or using CSI resource subset(s)/group(s) instead of CSI resource set(s)). Alternatively, the s'-th configured CSI resource subset/group for FSBM in a resource set could comprise/configure/provide one or more CSI-RS resources such as NZP CSI-RS resources (each provided by NZP-CSI-RS-Resource)—also referred to as CSI-RS resources for FSBM; each of the one or more CSI-RS resources for FSBM in the s'-th CSI resource subset/group in a resource set could be configured/associated with one or more (e.g., $1 \leq M_{meas,s} \leq N_{meas,s}$) of the configured (e.g., $N_{meas,s} \geq 1$) FSBM measurement subbands for at least the s'-th TRP in the multi-TRP system following those specified in one or more examples described herein by replacing CSI resource set(s) with CSI resource subset(s)/group(s) (or using CSI resource subset(s)/group(s) instead of CSI resource set(s)), where $s' \in \{1, \ldots, S'\}$ or $s'=1, \ldots, S'$.

In yet another example, when the FSBM or frequency selective/frequency subband specific/dependent beam management is enabled (according to one or more examples described herein), the UE 116 could be configured by the network 130, in a resource set (e.g., provided by CSI-SSB-ResourceSet/NZP-CSI-RS-ResourceSet), one or more (e.g., $S' \geq 1$, or $S'=2$) CSI resource subsets/groups for FSBM such as SSB resource subsets/groups (e.g., each provided by CSI-SSB-ResourceSubSet) or NZP CSI-RS resource subsets/groups (e.g., each provided by NZP-CSI-RS-ResourceSubSet) each associated/mapped to at least one TRP in the multi-TRP system. Furthermore, each configured CSI resource subset/group (e.g., the s'-th CSI resource subset/group in a resource set with $s' \in \{1, \ldots, S'\}$ or $s'=1, \ldots, S'$) for FSBM could comprise/configure/provide one or more (e.g., $K_s \geq 1$ for the s'-th CSI resource subset/group in the resource set with $s' \in \{1, \ldots, S'\}$ or $s'=1, \ldots, S'$) CSI-RS resources such as NZP CSI-RS resources (each provided by NZP-CSI-RS-Resource)—also referred to as CSI-RS resources for FSBM; each of the one or more CSI-RS resources for FSBM in a resource subset/group could be configured/associated with a FSBM measurement subband configured for all the TRPs in the multi-TRP system following those specified in one or more examples described herein by replacing CSI resource set(s) with CSI resource subset(s)/group(s) (or using CSI resource subset(s)/group(s) instead of CSI resource set(s)). Alternatively, the s'-th configured CSI resource subset/group for FSBM in a resource set could comprise/configure/provide one or more (e.g., $K_s \geq 1$) CSI-RS resources such as NZP CSI-RS resources (each provided by NZP-CSI-RS-Resource)—also referred to as CSI-RS resources for FSBM; for this case, each of the one or more CSI-RS resources for FSBM in the s'-th CSI resource subset/group in a resource set could be configured/associated with a FSBM measurement subband for at least the s'-th TRP in the multi-TRP system following those specified in one or more examples described herein by replacing CSI resource set(s) with CSI resource subset(s)/group(s) (or using CSI resource subset(s)/group(s) instead of CSI resource set(s)), where s'∈{1, . . . , S'} or s'=1, . . . , S'.

When the FSBM or frequency selective/frequency subband specific/dependent beam management is enabled (according to one or more examples described herein), a UE could be configured/indicated/provided by the network 130, e.g., via higher layer RRC signaling/parameter and/or MAC CE command and/or dynamic DCI based signaling, one or more (e.g., $N_{report} \geq 1$) frequency subbands each comprising one or more PRBs for frequency-selective beam reporting for FSBM—referred to as $N_{report}$ FSBM reporting subbands in the present disclosure. The one or more frequency subbands, or the $N_{report}$ FSBM reporting subbands, could be for one or more TRPs. The one or more PRBs in each FSBM reporting subband could be continuous, e.g., continuously indexed in frequency, or non-continuous. The UE 116 could be configured/indicated/provided by the network 130, e.g., via higher layer RRC signaling/parameter and/or MAC CE command and/or dynamic DCI based signaling, the FSBM reporting subband size—in number of PRBs (or size of each of the FSBM reporting subbands in number of PRBs)—for one or more TRPs.

For instance, for at least one TRP described herein, the UE 116 could be first indicated/configured/provided by the network 130, e.g., via higher layer RRC signaling/parameter and/or MAC CE command and/or dynamic DCI based signaling, a BWP (and therefore, the corresponding BWP size in number of PRBs, etc.) for FSBM.

For another instance, the UE 116 could be provided by the network 130, e.g., in a CSI resource setting provided by CSI-ResourceConfig or a CSI reporting setting provided by CSI-ReportConfig, a higher layer parameter subbandsize-forFSBMreport set to either 'value1' or 'value2'.

For yet another instance, if the higher layer parameter subbandsizeforFSBMreport is set to 'value1', the first value/number of subband size corresponding/associated to the BWP is used/determined as the FSBM reporting subband size for the corresponding TRP(s); if the higher layer parameter subbandsizeforFSBMreport is set to 'value2', the second value/number of subband size corresponding/associated to the BWP is used/determined as the FSBM reporting subband size for the corresponding TRP(s).

For yet another instance, the association/mapping between the potential/candidate subband size(s) and BWP(s) could be fixed in the system specifications (e.g., in the 3GPP TS 38.214)—see TABLE 1 in the present disclosure, and known to both the network 130 and UE sides a prior. As can be seen from TABLE 1 in the present disclosure, each BWP could correspond to two candidate values/numbers of (FSBM) subband size. Alternatively, the UE 116 could be configured/indicated/provided by the network 130, e.g., via higher layer RRC signaling/parameter and/or MAC CE command and/or dynamic DCI based signaling, the potential/candidate subband size(s) for a BWP or the association/mapping between the potential/candidate subband size(s) and BWP(s). Optionally, the potential/candidate subband size(s) could be a multiple (e.g., $m \geq 1$) of the subband size(s) shown/provided in TABLE 1: e.g., 4 m PRBs subband size and 8 m PRBs subband size for 24-72 PRBs BWP, 8 m PRBs subband size and 16 m PRBs subband size for 73-144 PRBs BWP, and 16 m PRBs subband size and 32 m PRBs subband size for 145-275 PRBs BWP. In the present disclosure, the UE 116 could be configured/provided/indicated by the network 130, e.g., via higher layer RRC signaling/parameter and/or MAC CE command and/or dynamic DCI based L1 signaling, the value/number of m.

In one example, for a single-TRP system, a UE could be configured by the network 130 a single FSBM reporting subband size (for a BWP).

In another example, for a multi-TRP system comprising $N_{trp}$ TRPs, a UE could be configured by the network 130 a single FSBM reporting subband size (for a BWP) for all TRPs.

In yet another example, for a multi-TRP system comprising $N_{trp}$ TRPs, a UE could be configured by the network 130 one or more (e.g., $N_{trp}$) FSBM reporting subband sizes (each for a BWP) each for at least one TRP in the multi-TRP system.

For example, the association/mapping between the configured one or more FSBM reporting subband sizes and the TRPs (and therefore, the corresponding CSI resource sets, PCIs, CORESET pool index values, etc.) are fixed. For instance, for $N_{trp}$=2, the configured first (or second) FSBM reporting subband size could be for the first TRP (e.g., the configured first CSI resource set, the serving cell PCI, value 0 of CORESET pool index, a first entity ID, etc.), and the configured second (or first) FSBM reporting subband size could be for the second TRP (e.g., the configured second CSI resource set, a PCI other than the serving cell PCI, value 1 of CORESET pool index, a second entity ID, etc.).

For another example, the UE 116 could be configured/indicated/provided by the network 130, e.g., via higher layer RRC signaling/parameter and/or MAC CE command and/or dynamic DCI based signaling, the association/mapping between the configured one or more FSBM reporting subband sizes and the TRPs (and therefore, the corresponding CSI resource sets, PCIs, CORESET pool index values, etc.).

Furthermore, the UE 116 could be indicated/configured/provided by the network 130, e.g., via higher layer RRC signaling/parameter and/or MAC CE command and/or dynamic DCI based signaling, one or more first bitmaps each for at least one TRP described herein. Each bit position/entry in a first bitmap could correspond to a subband within the BWP. For instance, the UE 116 could receive from the network 130, e.g., in a CSI resource setting provided by CSI-ResourceConfig or a CSI resource set provided by CSI-SSB-ResourceSet/NZP-CSI-RS-ResourceSet or a CSI-RS resource provided by ZP-CSI-RS-Resource or a CSI reporting setting provided by CSI-ReportConfig, the one or more first bitmaps. If a bit position/entry of a first bitmap is set to '1' (or '0'), the frequency subband corresponding/associated to the bit position/entry of the first bitmap is used/determined as a FSBM reporting subband for the TRP(s) associated/corresponding to the first bitmap. For this case, the first bitmap could contain/comprise $N_{report}$ bit positions/entries set to '1's (or '0's) indicating/configuring a total of $N_{report}$ FSBM reporting subbands for the corresponding/associated TRP(s). Different first bitmaps could have the same bit position(s)/entry(s) set to '1' (or '0') indicating that the same FSBM reporting subband(s) could be configured for different TRPs. Furthermore, the one or more first bitmaps described herein could be provided/configured/indicated in one or more MAC CE activation/deactivation commands.

In one example, for a single-TRP system, a UE could be configured by the network 130 a total of $N_{report}$ FSBM reporting subbands (e.g., via a first bitmap).

In another example, for a multi-TRP system comprising $N_{trp}$ TRPs, a UE could be configured by the network 130 a total of $N_{report}$ FSBM reporting subbands (e.g., via a first bitmap) for all the $N_{trp}$ TRPs.

For example, all the configured $N_{report}$ FSBM reporting subbands (e.g., via a bitmap) are for each of the $N_{trp}$ TRPs. For instance, for $N_{trp}=2$, all the configured $N_{report}$ FSBM reporting subbands could be for the first TRP (e.g., the configured first CSI resource set, the serving cell PCI, value 0 of CORESET pool index, a first entity ID, etc.), and all the configured $N_{report}$ FSBM reporting subbands could be for the second TRP (e.g., the configured second CSI resource set, a PCI other than the serving cell PCI, value 1 of CORESET pool index, a second entity ID, etc.).

For another example, the UE 116 could be configured/indicated/provided by the network 130, e.g., via higher layer RRC signaling/parameter and/or MAC CE command and/or dynamic DCI based L1 signaling, the number(s) of FSBM reporting subbands (e.g., $N_{report,1}$, $N_{report,2}$, . . . , $N_{report,Ntrp}$ with $N_{report,1}+N_{report,2}+ . . . +N_{report,Ntrp}=N_{report}$) each for at least one TRP described herein. In one example, the association/mapping between the configured/indicated/provided numbers of FSBM reporting subbands and the TRPs (and therefore, the corresponding CSI resource sets, PCIs, CORESET pool index values, etc.) is fixed. For instance, for $N_{trp}=2$, the first (or second) configured/indicated/provided number of FSBM reporting subbands, e.g., $N_{report,1}$ (or $N_{report,2}$), and therefore, the corresponding FSBM reporting subbands 1, . . . , $N_{report,1}$ (or $N_{report,1}+1, . . . , N_{report}$), could be for the first TRP (e.g., the configured first CSI resource set, the serving cell PCI, value 0 of CORESET pool index, a first entity ID, etc.), and the second (or first) configured/indicated/provided number of FSBM reporting subbands, e.g., $N_{report,2}$ (or $N_{report,1}$), and therefore, the corresponding FSBM reporting subbands $N_{report,1}+1$, . . . , $N_{report}$ (or 1, . . . , $N_{report,1}$), could be for the second TRP (e.g., the configured second CSI resource set, a PCI other than the serving cell PCI, value 1 of CORESET pool index, a second entity ID, etc.). In another example, the UE 116 could be provided/indicated/configured by the network 130, e.g., via higher layer RRC signaling/parameter and/or MAC CE command and/or dynamic DCI based L1 signaling, the association/mapping between the configured/indicated/provided numbers of FSBM reporting subbands (and therefore, the corresponding FSBM reporting subbands/FSBM reporting subband indexes) and the TRPs.

Yet for another example, the UE 116 could be configured/indicated/provided by the network 130, e.g., via higher layer RRC signaling/parameter and/or MAC CE command and/or dynamic DCI based L1 signaling, one or more (e.g., $N_{trp}$) second bitmaps each for at least one TRP described herein. Each bit position/entry in a second bitmap could correspond to a FSBM reporting subband (out of the $N_{report}$ FSBM reporting subbands). If a bit position/entry in a second bitmap is set to '1' (or '0'), the FSBM reporting subband corresponding/associated to the bit position/entry is for the TRP(s) corresponding/associated to the second bitmap. In one example, the association/mapping between the second bitmaps (and therefore, the corresponding FSBM reporting subbands) and the TRPs (and therefore, the corresponding CSI resource sets, PCIs, CORESET pool index values, etc.) is fixed. For instance, for $N_{trp}=2$, the 1st (or 2nd) second bitmap (and therefore, the corresponding FSBM reporting subbands) could be for the first TRP (e.g., the configured first CSI resource set, the serving cell PCI, value 0 of CORESET pool index, a first entity ID, etc.), and the 2nd (or 1st) second bitmap (and therefore, the corresponding FSBM reporting subbands) could be for the second TRP (e.g., the configured second CSI resource set, a PCI other than the serving cell PCI, value 1 of CORESET pool index, a second entity ID, etc.). In another example, the UE 116 could be provided/indicated/configured by the network 130, e.g., via higher layer RRC signaling/parameter and/or MAC CE command and/or dynamic DCI based L1 signaling, the association/mapping between the second bitmaps (and therefore, the corresponding FSBM reporting subbands) and the TRPs. Different second bitmaps could have the same bit position(s)/entry(s) set to '1' (or '0') indicating that the same FSBM reporting subband(s) could be for different TRPs. Furthermore, the one or more second bitmaps described herein could be provided/configured/indicated in one or more MAC CE activation/deactivation commands.

Yet for another example, the UE 116 could be configured/indicated/provided by the network 130, e.g., via higher layer RRC signaling/parameter and/or MAC CE command and/or dynamic DCI based L1 signaling, one or more (e.g., $N_{trp}$) sets of FSBM reporting subband indexes each for at least one TRP described herein. In one example, the association/mapping between the sets of FSBM reporting subband indexes (and therefore, the corresponding FSBM reporting subbands) and the TRPs (and therefore, the corresponding CSI resource sets, PCIs, CORESET pool index values, etc.) is fixed. For instance, for $N_{trp}=2$, the first (or second) set of FSBM reporting subband indexes (and therefore, the corresponding FSBM reporting subbands) could be for the first TRP (e.g., the configured first CSI resource set, the serving cell PCI, value 0 of CORESET pool index, a first entity ID, etc.), and the second (or first) set of FSBM reporting subband indexes (and therefore, the corresponding FSBM reporting subbands) could be for the second TRP (e.g., the configured second CSI resource set, a PCI other than the serving cell PCI, value 1 of CORESET pool index, a second entity ID, etc.). In another example, the UE 116 could be provided/indicated/configured by the network 130, e.g., via higher layer RRC signaling/parameter and/or MAC CE command and/or dynamic DCI based L1 signaling, the association/mapping between the sets of FSBM reporting subband indexes (and therefore, the corresponding FSBM reporting subbands) and the TRPs. Different sets could have the same subband index(es) indicating that the same FSBM reporting subband(s) could be for different TRPs.

Yet for another example, the UE 116 could receive from the network 130 one or more (e.g., $N_{trp}$) MAC CE activation commands each for at least one TRP described herein—e.g., a MAC CE activation command could contain/provide/include a TRP-specific entity ID such as a CSI resource set index/ID, a PCI, a value of CORESET pool index, an entity ID, etc. Each MAC CE activation command could activate one or more FSBM reporting subbands (out of the $N_{report}$ FSBM reporting subbands) for the corresponding TRP(s). In one example, the association/mapping between the MAC CE activation commands (and therefore, the corresponding FSBM reporting subbands) and the TRPs (and therefore, the corresponding CSI resource sets, PCIs, CORESET pool index values, etc.) is fixed. For instance, for $N_{trp}=2$, the 1st (or 2nd) MAC CE activation command (and therefore, the corresponding FSBM reporting subbands) could be for the first TRP (e.g., the configured first CSI resource set, the serving cell PCI, value 0 of CORESET pool index, a first entity ID, etc.), and the 2nd (or 1st) MAC CE activation command (and therefore, the corresponding FSBM reporting subbands) could be for the second TRP (e.g., the configured second CSI resource set, a PCI other than the serving cell PCI, value 1 of CORESET pool index, a second entity ID, etc.). In another example, the UE 116 could be provided/indicated/configured by the network 130, e.g., via higher layer RRC signaling/parameter and/or MAC CE command and/or dynamic DCI based L1 signaling, the association/mapping between the MAC CE activation commands (and therefore, the corresponding FSBM reporting subbands) and the TRPs. Different MAC CE activation commands could indicate/provide/configure the same FSBM reporting subband(s) for different TRPs.

In yet another example, for a multi-TRP system comprising $N_{trp}$ TRPs, a UE could be configured by the network 130 $N_{report,n}$ FSBM reporting subbands (e.g., via a first bitmap) for at least the n-th TRP, where $n \in \{1, \ldots, N_{trp}\}$.

For example, the association/mapping between the first bitmaps (and therefore, the corresponding FSBM reporting subbands) and the TRPs (and therefore, the corresponding CSI resource sets, PCIs, CORESET pool index values, etc.) is fixed. For instance, for $N_{trp}=2$, the 1st (or 2nd) first bitmap (and therefore, the corresponding $N_{meas,1}$ (or $N_{meas,2}$) FSBM measurement subbands) could be for the first TRP (e.g., the configured first CSI resource set, the serving cell PCI, value 0 of CORESET pool index, a first entity ID, etc.), and the 2nd (or 1st) first bitmap (and therefore, the corresponding $N_{meas,2}$ (or $N_{meas,1}$) FSBM measurement subbands) could be for the second TRP (e.g., the configured second CSI resource set, a PCI other than the serving cell PCI, value 1 of CORESET pool index, a second entity ID, etc.).

For another example, the UE 116 could be provided/indicated/configured by the network 130, e.g., via higher layer RRC signaling/parameter and/or MAC CE command and/or dynamic DCI based L1 signaling, the association/mapping between the first bitmaps (and therefore, the corresponding FSBM reporting subbands) and the TRPs.

According to embodiments of the present disclosure, the $N_{report,x}$ FSBM reporting subbands configured for at least the x-th TRP in the multi-TRP system (following one or more examples described herein), and the $N_{report,y}$ FSBM reporting subbands configured for at least the y-th TRP in the multi-TRP system (following one or more examples described herein), could be the same/identical, where $x, y \in \{1, \ldots, N_{trp}\}$, $x \neq y$.

According to embodiments of the present disclosure, when the FSBM or frequency selective/frequency subband specific/dependent beam management is enabled for single-TRP operation (according to one or more examples described herein), a UE could be configured by the network 130 one or more RS resources for frequency-selective beam measurement for FSBM, and report to the network 130, e.g., in a CSI report, one or more beam/report quantities for one or more of the RS resources configured for the frequency-selective beam measurement for FSBM, wherein one RS resource (e.g., corresponding to a SSB resource index or a NZP CSI-RS resource configuration index) could correspond to one or more FSBM reporting subbands configured for the single-TRP operation, and each of the reported beam/report quantities (e.g., comprising at least one resource indicator such as SSBRI/CRI and/or one beam metric such as L1-RSRP/L1-SINR) could correspond to one or more FSBM reporting subbands configured for the single-TRP operation.

In one example, when the FSBM or frequency selective/frequency subband specific/dependent beam management is enabled (according to one or more examples described herein), the UE 116 could be configured by the network 130 with one or more CSI-RS resources such as NZP CSI-RS resources (each provided by NZP-CSI-RS-Resource)—also referred to as CSI-RS resources for FSBM, in a CSI resource subset/group (e.g., provided by NZP-CSI-RS-ResourceSub-Set)—also referred to as a CSI resource subset/group for FSBM, or a CSI resource set (e.g., provided by NZP-CSI-RS-ResourceSet)—also referred to as a CSI resource set for FSBM, or a CSI resource setting (e.g., provided by CSI-ResourceConfig)—also referred to as a CSI resource setting for FSBM, each configured/associated with one or more (e.g., $1 \leq M_{report} \leq N_{report}$) of the total configured $N_{report} \geq 1$ FSBM reporting subbands. In particular, for a CSI-RS resource (e.g., a NZP CSI-RS resource provided by NZP-CSI-RS-Resource) or each of the CSI-RS resources configured for frequency-selective beam measurement for FSBM, the corresponding FSBM reporting subband(s) could be determined according to one or more of the following design examples.

For example, all of the configured $N_{report}$ FSBM reporting subbands could be active/used for frequency-selective beam measurement/reporting for the corresponding CSI-RS resource. For this case, $M_{report}=N_{report}$. The UE 116 could also be indicated/configured/provided by the network 130, e.g., via higher layer RRC signaling and/or MAC CE command and/or dynamic DCI based signaling, that $M_{report}=N_{report}$.

For another example, the UE 116 could be configured/indicated/provided by the network 130, e.g., via higher layer RRC signaling/parameter and/or MAC CE command and/or dynamic DCI based signaling, a bitmap of length $N_{report}$ for the CSI-RS resource with each bit position/entry of the bitmap corresponding/associated to a FSBM reporting subband configured for the single-TRP operation. For instance, the UE 116 could receive from the network 130, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting, the bitmap. If a bit position/entry of the bitmap is set to '1' (or '0'), the FSBM reporting subband corresponding/associated with the bit position/entry is active/used for frequency-selective beam measurement/reporting for the corresponding CSI-RS resource. For this example, the bitmap could contain/comprise $1 \leq M_{report} \leq N_{report}$ bit positions/entries set to '1's (or '0's) indicating that a total of $M_{report}$ FSBM reporting subbands—out of the total $N_{report}$ configured FSBM reporting subbands for the single-TRP operation—could be active/used for the frequency-selective beam measurement/reporting for the corresponding CSI-RS resource. Furthermore, the UE 116 could be configured/indicated/provided by the network 130, e.g., via higher layer RRC signaling/parameter (e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting) and/or MAC CE command and/or dynamic DCI based signaling, K≥1 such bitmaps each associated/mapped to a CSI-RS resource configured therein—e.g., the first bitmap could be associated/mapped to the first CSI-RS resource, the second bitmap could be associated/mapped to the second CSI-RS resource, and so on. Different bitmaps could have the same bit position(s)/entry(s) set to '1' (or '0').

Yet for another example, the UE 116 could be configured/indicated/provided by the network 130, e.g., via higher layer RRC signaling/parameter and/or MAC CE command and/or dynamic DCI based signaling, a set of $1 \leq 5 \ M_{report} \leq N_{report}$ (subband) indexes for the CSI-RS resource with each (subband) index corresponding/pointing to a FSBM reporting subband—e.g., the (subband) indexes $1, 2, \ldots, M_{report}$ could correspond/point to the first FSBM reporting subband, the second FSBM reporting subband, . . . , the $M_{report}$-th FSBM reporting subband, respectively, among all the configured $N_{report}$ FSBM reporting subbands for the single-TRP operation. For instance, the UE 116 could receive from the network 130, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting, the set of (subband) indexes. For this case, the $M_{report}$ FSBM reporting subband(s) corresponding/associated to the indicated/provided/configured (subband) index(es) could be active/used for the frequency-selective beam measurement/reporting for the corresponding CSI-RS resource. Furthermore, the UE 116 could be configured/indicated/provided by the network 130, e.g., via higher layer RRC signaling/parameter (e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting) and/or MAC CE command and/or dynamic DCI based signaling, K≥1 such sets of (subband) indexes each associated/mapped to a CSI-RS resource configured therein—e.g., the first set could be associated/mapped to the first CSI-RS resource, the second set could be associated/mapped to the second CSI-RS resource, and so on. Different sets of (subband) indexes could contain/comprise the same (subband) indexes.

In another example, when the FSBM or frequency selective/frequency subband specific/dependent beam management is enabled (according to one or more examples described herein), the UE 116 could be configured by the network 130 one or more (e.g., K≥1) CSI-RS resources such as NZP CSI-RS resources (each provided by NZP-CSI-RS-Resource)—also referred to as CSI-RS resources for FSBM, in a CSI resource subset/group (e.g., provided by NZP-CSI-RS-ResourceSubSet)—also referred to as a CSI resource subset/group for FSBM, or a CSI resource set (e.g., provided by NZP-CSI-RS-ResourceSet)—also referred to as a CSI resource set for FSBM, or a CSI resource setting (e.g., provided by CSI-ResourceConfig)—also referred to as a CSI resource setting for FSBM, each configured/associated with a FSBM reporting subband configured for the single-TRP operation. In particular, for the one or more (e.g., K≥1) CSI-RS resources (e.g., K≥1 NZP CSI-RS resources each provided by NZP-CSI-RS-Resource) configured in the same CSI resource subset/group (e.g., provided by NZP-CSI-RS-ResourceSubSet) or the same CSI resource set (e.g., provided by NZP-CSI-RS-ResourceSet) or the same CSI resource setting (e.g., provided by CSI-ResourceConfig) for frequency-selective beam measurement for FSBM.

For example, the first configured CSI-RS resource (e.g., the first NZP CSI-RS resource) could be associated/mapped to the first configured FSBM reporting subband, the second configured CSI-RS resource (e.g., the second NZP CSI-RS resource) could be associated/mapped to the second configured FSBM reporting subband, and so on, and the K-th configured CSI-RS resource (e.g., the K-th NZP CSI-RS resource) could be associated/mapped to the $N_{report}$-th configured FSBM reporting subband. For this case, $K=N_{report}$.

For another example, the UE 116 could be configured/indicated/provided by the network 130, e.g., via higher layer RRC signaling/parameter and/or MAC CE command and/or dynamic DCI based signaling, a bitmap of length $N_{report}$ for the one or more (e.g., K≥1) CSI-RS resources configured in the same CSI resource subset/group or the same CSI resource set or the same CSI resource setting with each bit position/entry of the bitmap corresponding/associated to a FSBM reporting subband. For instance, the UE 116 could receive from the network 130, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting, the bitmap. If a bit position/entry of the bitmap is set to '1' (or '0'), the FSBM reporting subband corresponding/associated to the bit position/entry is active/used for frequency-selective beam measurement/reporting for one of the one or more (e.g., K≥1) CSI-RS resources (e.g., one of the K≥1 NZP CSI-RS resources). For this example, the bitmap could contain/comprise $1 \leq M_{report} \leq N_{report}$ bit positions/entries set to '1's (or '0's) indicating that a total of $M_{report}$ FSBM measurement subbands—out of the total $N_{report}$ configured FSBM reporting subbands for the single-TRP operation—could be active/used for the frequency-selective beam measurement/reporting for the one or more (e.g., K≥1) CSI-RS resources (or the K≥1 NZP CSI-RS resources)—e.g., the first bit position/entry in the bitmap set to '1' (or '0')—and therefore, the corresponding FSBM reporting subband—could be associated/mapped to the first CSI-RS resource (or the first NZP CSI-RS resource), the second bit position/entry in the bitmap set to '1' (or '0')—and therefore, the corresponding FSBM reporting subband—could be associated/mapped to the second CSI-RS resource (or the second NZP CSI-RS resource), and so on, and the $M_{report}$-th bit position/entry set to '1' (or '0')—and therefore, the corresponding FSBM reporting subband—could be associated/mapped to the K-th CSI-RS resource (or the K-th NZP CSI-RS resource). For this case, $M_{report}=K$. Alternatively, the higher layer parameter NZP-CSI-RS-Resource that configures a NZP CSI-RS resource could contain/comprise/provide a bitmap of length $N_{report}$ for the corresponding NZP CSI-RS resource with each bit position/entry of the bitmap corresponding/associated to a FSBM reporting subband. For instance, if a bit position/entry of the bitmap is set to '1' (or '0'), the FSBM reporting subband corresponding/associated with the bit position/entry could be used/active for the frequency-selective beam measurement/reporting for the corresponding NZP CSI-RS resource.

Yet for another example, the UE 116 could be configured/indicated/provided by the network 130, e.g., via higher layer RRC signaling/parameter and/or MAC CE command and/or dynamic DCI based signaling, a set of $1 \le M_{report} \le N_{report}$ (subband) indexes for the one or more (e.g., K≥1) CSI-RS resources configured in the same CSI resource subset/group or the same CSI resource set or the same CSI resource setting with each (subband) index corresponding/pointing to a FSBM reporting subband—e.g., the (subband) indexes 1, 2, . . . , $M_{report}$ could correspond/point to the first FSBM reporting subband, the second FSBM reporting subband, . . . , the $M_{report}$-th FSBM reporting subband, respectively, among all the configured $N_{report}$ FSBM reporting subbands for the single-TRP operation. For instance, the UE 116 could receive from the network 130, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting, the set of (subband) indexes. For this case, each of the $M_{report}$ FSBM reporting subband(s) corresponding/associated to the indicated/provided/configured (subband) index (es) could be active/used for the frequency-selective beam measurement/reporting for one of the one or more (e.g., K≥1) CSI-RS resources (e.g., one of the K≥1 NZP CSI-RS resources)—e.g., the first (subband) index in the set—and therefore, the corresponding FSBM reporting subband—could be associated/mapped to the first CSI-RS resource (or the first NZP CSI-RS resource), the second (subband) index in the set—and therefore, the corresponding FSBM reporting subband—could be associated/mapped to the second CSI-RS resource (or the second NZP CSI-RS resource), and so on, and the $M_{report}$-th (subband) index in the set—and therefore, the corresponding FSBM reporting subband—could be associated/mapped to the K-th CSI-RS resource (or the K-th NZP CSI-RS resource). For this case, $M_{report}$ K. Alternatively, the higher layer parameter NZP-CSI-RS-Resource that configures a NZP CSI-RS resource could contain/comprise/provide a (subband) index for the corresponding NZP CSI-RS resource. For instance, the FSBM reporting subband corresponding/associated with the (subband) index could be used/active for the frequency-selective beam measurement/reporting for the corresponding NZP CSI-RS resource.

According to embodiments of the present disclosure, when the FSBM or frequency selective/frequency subband specific/dependent beam management is enabled for multi-TRP operation (according to one or more examples described herein), a UE could be configured by the network 130 one or more (e.g., S≥2) RS resource groups or sets each associated/mapped to at least one TRP in the multi-TRP system; furthermore, each configured RS resource group or set could comprise one or more RS resources for frequency-selective beam measurement for FSBM; the UE 116 could also report to the network 130, e.g., in a CSI report, one or more beam/report quantities for one or more of the RS resource groups/sets (and therefore, the RS resources configured therein) configured for the frequency-selective beam measurement for FSBM; here, one RS resource (e.g., corresponding to a SSB resource index or a NZP CSI-RS resource configuration index) could correspond to one or more FSBM reporting subbands configured for the multi-TRP operation, and each of the reported beam/report quantities (e.g., comprising at least one resource indicator such as SSBRI/CRI and/or one beam metric such as L1-RSRP/L1-SINR) could correspond to one or more FSBM reporting subbands configured for the multi-TRP operation.

In one example, when the FSBM or frequency selective/frequency subband specific/dependent beam management is enabled (according to one or more examples described herein), the UE 116 could be configured by the network 130, in a resource setting (e.g., provided by CSI-ResourceConfig), one or more (e.g., S≥1, or S=2) CSI resource sets for FSBM such as SSB resource sets each provided by CSI-SSB-ResourceSet or NZP CSI-RS resource sets each provided by NZP-CSI-RS-ResourceSet each associated/mapped to at least one TRP in the multi-TRP system. Furthermore, each configured CSI resource set for FSBM could comprise/configure/provide one or more CSI-RS resources such as NZP CSI-RS resources (each provided by NZP-CSI-RS-Resource)—also referred to as CSI-RS resources for FSBM—each configured/associated with one or more (e.g., $1 \le M_{report} \le N_{report}$) of the configured (e.g., $N_{report} \ge 1$) FSBM reporting subbands for all the TRPs in the multi-TRP system. Alternatively, the s-th configured CSI resource set for FSBM in a resource setting could comprise/configure/provide one or more CSI-RS resources such as NZP CSI-RS resources (each provided by NZP-CSI-RS-Resource)—also referred to as CSI-RS resources for FSBM—each configured/associated with one or more (e.g., $1 \le M_{report,s} \le N_{report,s}$) of the configured (e.g., $N_{report,s} \ge 1$) FSBM reporting subbands for at least the s-th TRP in the multi-TRP system, where $s \in \{1, \ldots, S\}$ or $s=1, \ldots, S$. In particular, for a CSI-RS resource (e.g., a NZP CSI-RS resource provided by NZP-CSI-RS-Resource) provided/configured/indicated in the s-th CSI resource set for FSBM in a resource setting ($s \in \{1, \ldots, S\}$, e.g., s=1 or 2) or each of the CSI-RS resources configured for frequency-selective beam measurement for FSBM in the s-th CSI resource set for FSBM in a resource setting ($s \in \{1, \ldots, S\}$, e.g., s=1 or 2).

Figure 13:
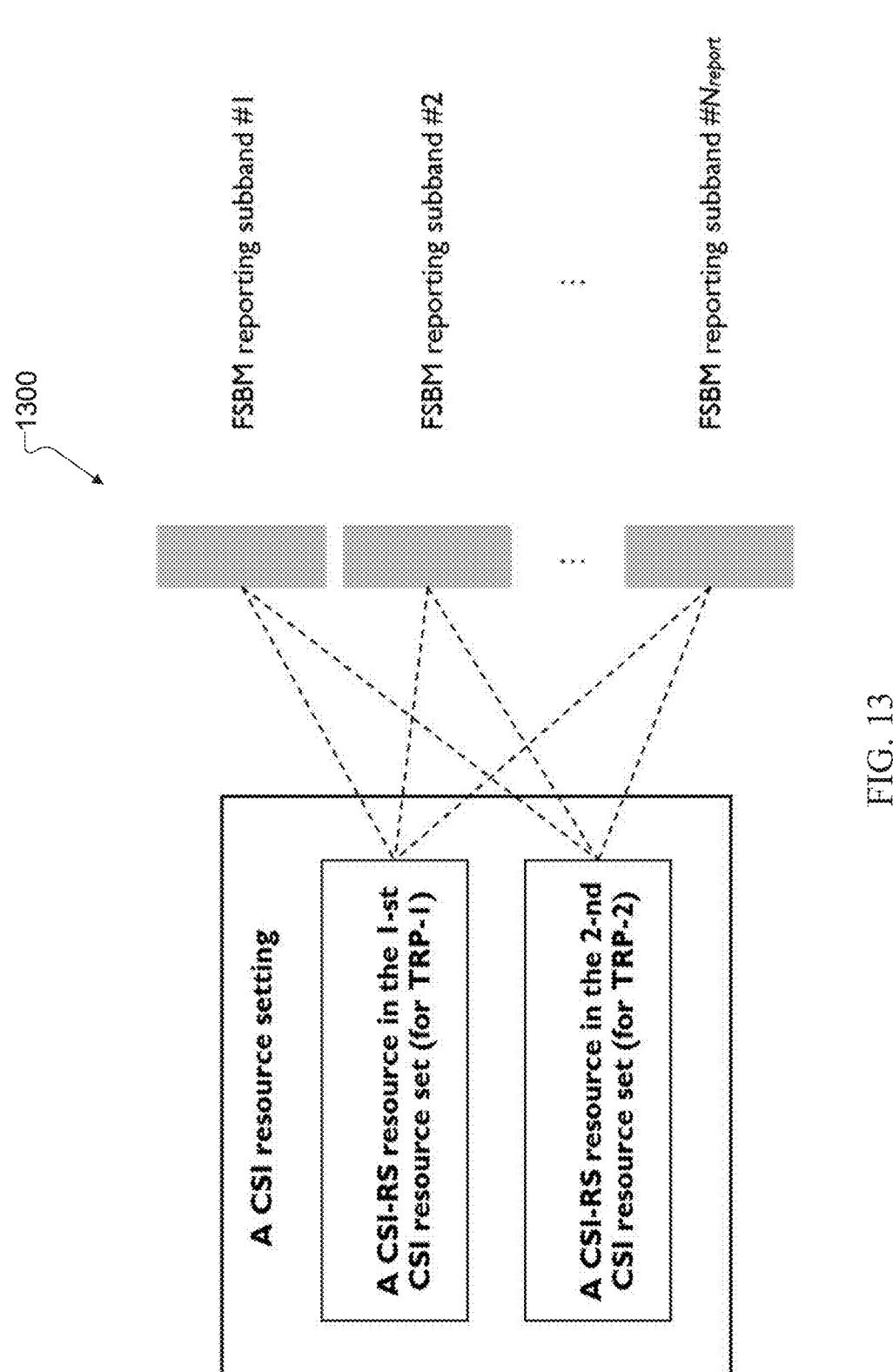
FIG. 13 illustrates an example of an association between the configured CSI-RS resources in the 1-st and 2-nd CSI resource sets and the $N_{report}$ FSBM reporting subbands according to embodiments of the present disclosure.

FIG. 13 illustrates an example association 1300 between the configured CSI-RS resources in the 1-st and 2-nd CSI resource sets and the $N_{report}$ FSBM reporting subbands according to embodiments of the present disclosure. For example, the UE 116 may utilize the association 1300 for CSI measurement and reporting. This example is for illustration only and other embodiments can be used without departing from the scope of the present disclosure.

For example, all of the $N_{report}$ FSBM reporting subbands configured for each of the TRPs (e.g., following one or more examples described herein) could be active/used for frequency-selective beam measurement/reporting for the corresponding CSI-RS resource in the s-th set. For this case, $M_{report} = N_{report}$. The UE 116 could also be indicated/configured/provided by the network 130, e.g., via higher layer RRC signaling and/or MAC CE command and/or dynamic DCI based signaling, that $M_{report} = N_{report}$ for the corresponding CSI-RS resource in the s-th set.

Figure 14:
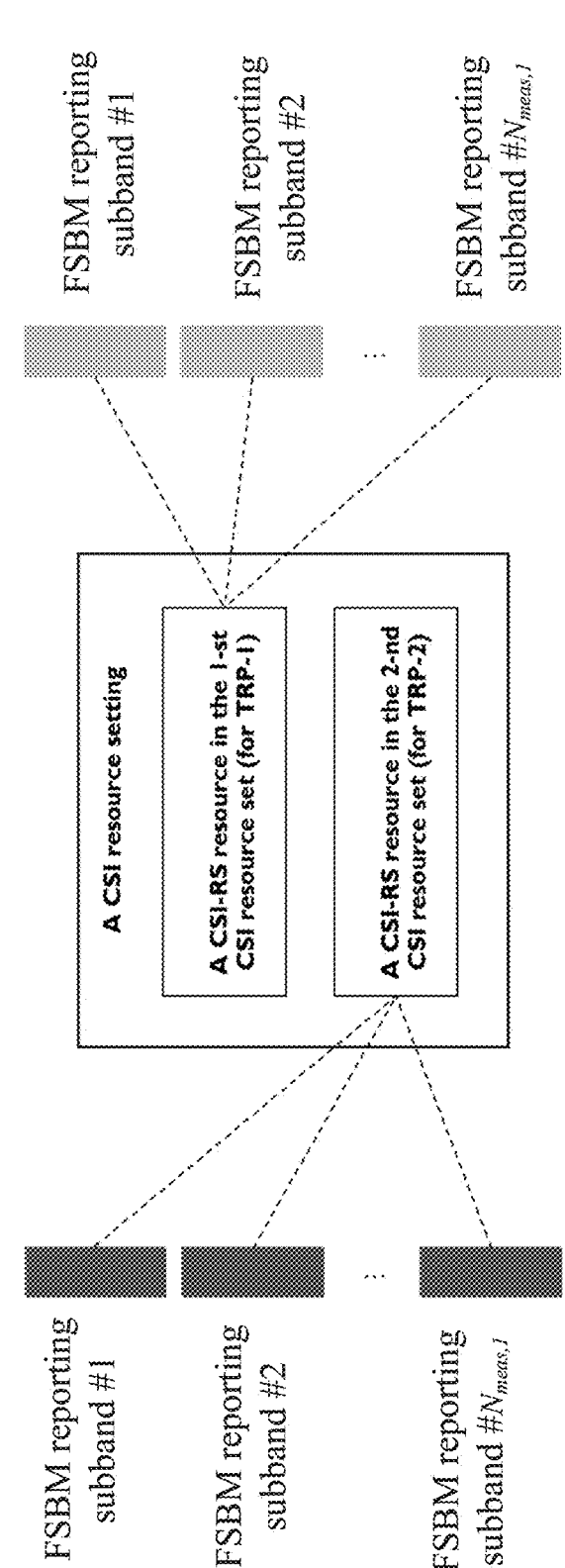
FIG. 14 illustrates an example of an association between the configured CSI-RS resources in the 1-st and 2-nd CSI resource sets and the corresponding $N_{report,1}$ and $N_{report,2}$ FSBM reporting subbands according to embodiments of the present disclosure.

FIG. 14 illustrates an example association 1400 between the configured CSI-RS resources in the 1-st and 2-nd CSI resource sets and the corresponding $N_{report,1}$ and $N_{report,2}$ FSBM reporting subbands according to embodiments of the present disclosure. For example, association 1400 utilized by the UE 116 for reporting to the BS 102. This example is for illustration only and other embodiments can be used without departing from the scope of the present disclosure.

For another example, the $N_{report,s}$ FSBM reporting subbands configured for at least the s-th TRP (e.g., following one or more examples described herein) could be active/used for frequency-selective beam measurement/reporting for the corresponding CSI-RS resource in the s-th set. For this case, $M_{report,s}=N_{report,s}$. The UE 116 could also be indicated/configured/provided by the network 130, e.g., via higher layer RRC signaling and/or MAC CE command and/or dynamic DCI based signaling, that $M_{report,s}=N_{report,s}$ for the corresponding CSI-RS resource in the s-th set.

Yet for another example, the UE 116 could be configured/indicated/provided by the network 130, e.g., via higher layer RRC signaling/parameter and/or MAC CE command and/or dynamic DCI based signaling, a bitmap of length $N_{report}$ for the CSI-RS resource in the s-th set with each bit position/entry of the bitmap corresponding/associated to a FSBM reporting subband configured for each of the TRPs in the multi-TRP system (e.g., following one or more examples described herein). For instance, the UE 116 could receive from the network 130, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting, the bitmap. If a bit position/entry of the bitmap is set to '1' (or '0'), the FSBM reporting subband corresponding/associated with the bit position/entry is active/used for frequency-selective beam measurement/reporting for the corresponding CSI-RS resource in the s-th set. For this example, the bitmap could contain/comprise $1 \leq M_{report} \leq N_{report}$ bit positions/entries set to '1's (or '0's) indicating that a total of $M_{report}$ FSBM reporting subbands—out of the total $N_{report}$ configured FSBM reporting subbands for each of the TRPs in the multi-TRP system (e.g., following one or more examples described herein)—could be active/used for the frequency-selective beam measurement/reporting for the corresponding CSI-RS resource in the s-th set. Furthermore, the UE 116 could be configured/indicated/provided by the network 130, e.g., via higher layer RRC signaling/parameter (e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting) and/or MAC CE command and/or dynamic DCI based signaling, $K_s \geq 1$ such bitmaps each associated/mapped to a CSI-RS resource configured in the s-th set—e.g., the first bitmap could be associated/mapped to the first CSI-RS resource in the s-th set, the second bitmap could be associated/mapped to the second CSI-RS resource in the s-th set, and so on. Different bitmaps could have the same bit position(s)/entry(s) set to '1' (or '0').

Yet for another example, the UE 116 could be configured/indicated/provided by the network 130, e.g., via higher layer RRC signaling/parameter and/or MAC CE command and/or dynamic DCI based signaling, a bitmap of length $N_{report,s}$ for the CSI-RS resource in the s-th set with each bit position/entry of the bitmap corresponding/associated to a FSBM reporting subband configured for at least the s-th TRP in the multi-TRP system (e.g., following one or more examples described herein). For instance, the UE 116 could receive from the network 130, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting, the bitmap. If a bit position/entry of the bitmap is set to '1' (or '0'), the FSBM reporting subband corresponding/associated with the bit position/entry is active/used for frequency-selective beam measurement/reporting for the corresponding CSI-RS resource in the s-th set. For this example, the bitmap could contain/comprise $1 \leq M_{report,s} \leq N_{report,s}$ bit positions/entries set to '1's (or '0's) indicating that a total of $M_{report,s}$ FSBM reporting subbands—out of the total $N_{report,s}$ configured FSBM reporting subbands for at least the s-th TRP in the multi-TRP system (e.g., following one or more examples described herein)—could be active/used for the frequency-selective beam measurement/reporting for the corresponding CSI-RS resource in the s-th set. Furthermore, the UE 116 could be configured/indicated/provided by the network 130, e.g., via higher layer RRC signaling/parameter (e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting) and/or MAC CE command and/or dynamic DCI based signaling, $K_s \geq 1$ such bitmaps each associated/mapped to a CSI-RS resource configured in the s-th set—e.g., the first bitmap could be associated/mapped to the first CSI-RS resource in the s-th set, the second bitmap could be associated/mapped to the second CSI-RS resource in the s-th set, and so on. Different bitmaps could have the same bit position(s)/entry(s) set to '1' (or '0').

Yet for another example, the UE 116 could be configured/indicated/provided by the network 130, e.g., via higher layer RRC signaling/parameter and/or MAC CE command and/or dynamic DCI based signaling, a set of $1 \leq M_{report} \leq N_{report}$ (subband) indexes for the CSI-RS resource in the s-th CSI resource set with each (subband) index corresponding/pointing to a FSBM reporting subband—e.g., the (subband) indexes 1, 2, ..., $M_{report}$ could correspond/point to the first FSBM reporting subband, the second FSBM reporting subband, ..., the $M_{report}$-th FSBM reporting subband, respectively, among all the configured $N_{report}$ FSBM reporting subbands for each of the TRPs in the multi-TRP system (e.g., following one or more examples described herein). For instance, the UE 116 could receive from the network 130, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting, the set of (subband) indexes. For this case, the $M_{report}$ FSBM reporting subband(s) corresponding/associated to the indicated/provided/configured (subband) index(es) could be active/used for the frequency-selective beam measurement/ reporting for the corresponding CSI-RS resource in the s-th CSI resource set. Furthermore, the UE 116 could be configured/indicated/provided by the network 130, e.g., via higher layer RRC signaling/parameter (e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-Report-Config that configures a CSI reporting setting) and/or MAC CE command and/or dynamic DCI based signaling, $K_s \geq 1$ such sets of (subband) indexes each associated/mapped to a CSI-RS resource configured in the s-th CSI resource set— e.g., the first set could be associated/mapped to the first CSI-RS resource in the s-th CSI resource set, the second set could be associated/mapped to the second CSI-RS resource in the s-th CSI resource set, and so on. Different sets of (subband) indexes could contain/comprise the same (subband) indexes.

Yet for another example, the UE 116 could be configured/ indicated/provided by the network 130, e.g., via higher layer RRC signaling/parameter and/or MAC CE command and/or dynamic DCI based signaling, a set of $1 \leq M_{report,s} \leq N_{report,s}$ (subband) indexes for the CSI-RS resource in the s-th CSI resource set with each (subband) index corresponding/pointing to a FSBM reporting subband—e.g., the (subband) indexes $1, 2, \ldots, M_{report,s}$ could correspond/point to the first FSBM reporting subband, the second FSBM reporting subband, . . . , the $M_{report,s}$-th FSBM reporting subband, respectively, among all the configured $N_{report,s}$ FSBM reporting subbands for at least the s-th TRP in the multi-TRP system (e.g., following one or more examples described herein). For instance, the UE 116 could receive from the network 130, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting, the set of (subband) indexes. For this case, the $M_{report,s}$ FSBM reporting subband(s) corresponding/associated to the indicated/provided/configured (subband) index(es) could be active/used for the frequency-selective beam measurement/reporting for the corresponding CSI-RS resource in the s-th CSI resource set. Furthermore, the UE 116 could be configured/indicated/provided by the network 130, e.g., via higher layer RRC signaling/parameter (e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting) and/or MAC CE command and/or dynamic DCI based signaling, $K_s \geq 1$ such sets of (subband) indexes each associated/mapped to a CSI-RS resource configured in the s-th CSI resource set—e.g., the first set could be associated/mapped to the first CSI-RS resource in the s-th CSI resource set, the second set could be associated/mapped to the second CSI-RS resource in the s-th CSI resource set, and so on. Different sets of (subband) indexes could contain/comprise the same (subband) indexes.

In another example, when the FSBM or frequency selective/frequency subband specific/dependent beam management is enabled (according to one or more examples described herein), the UE 116 could be configured by the network 130, in a resource setting (e.g., provided by CSI-ResourceConfig), one or more (e.g., $S \geq 1$, or $S=2$) CSI resource sets for FSBM such as SSB resource sets each provided by CSI-SSB-ResourceSet or NZP CSI-RS resource sets each provided by NZP-CSI-RS-ResourceSet each associated/mapped to at least one TRP in the multi-TRP system. Furthermore, each configured CSI resource set (e.g., the s-th CSI resource set with $s \in \{1, \ldots, S\}$ or $s=1, \ldots, S$) for FSBM could comprise/configure/provide one or more (e.g., $K_s \geq 1$ for the s-th set with $s \in \{1, \ldots, S\}$ or $s=1, \ldots, S$) CSI-RS resources such as NZP CSI-RS resources (each provided by NZP-CSI-RS-Resource)—also referred to as CSI-RS resources for FSBM—each configured/associated with a FSBM reporting subband configured for all the TRPs in the multi-TRP system. Alternatively, the s-th configured CSI resource set for FSBM in a resource setting could comprise/configure/provide one or more (e.g., $K_s \geq 1$) CSI-RS resources such as NZP CSI-RS resources (each provided by NZP-CSI-RS-Resource)—also referred to as CSI-RS resources for FSBM—each configured/associated with a FSBM reporting subband for at least the s-th TRP in the multi-TRP system, where $s \in \{1, \ldots, S\}$ or $s=1, \ldots, S$. In particular, for the one or more (e.g., $K_s \geq 1$) CSI-RS resources (e.g., $K_s \geq 1$ NZP CSI-RS resources each provided by NZP-CSI-RS-Resource) provided/configured/indicated in the s-th CSI resource set for FSBM in a resource setting ($s \in \{1, \ldots, S\}$, e.g., $s=1$ or 2).

For example, the first configured CSI-RS resource (e.g., the first NZP CSI-RS resource) in the s-th set could be associated/mapped to the first configured FSBM reporting subband among all the $N_{report}$ FSBM reporting subbands configured for each of the TRPs in the multi-TRP system (e.g., following one or more examples described herein), the second configured CSI-RS resource (e.g., the second NZP CSI-RS resource) in the s-th set could be associated/mapped to the second configured FSBM reporting subband among all the $N_{report}$ FSBM reporting subbands configured for each of the TRPs in the multi-TRP system (e.g., following one or more examples described herein), and so on, and the $K_s$-th configured CSI-RS resource (e.g., the $K_s$-th NZP CSI-RS resource) in the s-th set could be associated/mapped to the $N_{report}$-th configured FSBM reporting subband among all the $N_{report}$ FSBM reporting subbands configured for each of the TRPs in the multi-TRP system (e.g., following one or more examples described herein). For this case, $K_s = N_{report}$, where $s \in \{1, \ldots, S\}$ or $s=1, \ldots, S$.

For another example, the first configured CSI-RS resource (e.g., the first NZP CSI-RS resource) in the s-th set could be associated/mapped to the first configured FSBM reporting subband among all the $N_{report,s}$ FSBM reporting subbands configured for at least the s-th TRP in the multi-TRP system (e.g., following one or more examples described herein), the second configured CSI-RS resource (e.g., the second NZP CSI-RS resource) in the s-th set could be associated/mapped to the second configured FSBM reporting subband among all the $N_{report,s}$ FSBM reporting subbands configured for at least the s-th TRP in the multi-TRP system (e.g., following one or more examples described herein), and so on, and the $K_s$-th configured CSI-RS resource (e.g., the $K_s$-th NZP CSI-RS resource) in the s-th set could be associated/mapped to the $N_{report,s}$-th configured FSBM reporting subband among all the $N_{report,s}$ FSBM reporting subbands configured for the s-th TRP in the multi-TRP system (e.g., following one or more examples described herein). For this case, $K_s N_{report,s}$, where $s \in \{1, \ldots, S\}$ or $s = 1, \ldots, S$.

Yet for another example, the UE 116 could be configured/indicated/provided by the network 130, e.g., via higher layer RRC signaling/parameter and/or MAC CE command and/or dynamic DCI based signaling, a bitmap of length $N_{report}$ for the one or more (e.g., $K_s \geq 1$) CSI-RS resources configured in the same CSI resource set (e.g., the s-th set) with each bit position/entry of the bitmap corresponding/associated to a FSBM reporting subband configured for each of the TRPs in the multi-TRP system (e.g., following one or more examples described herein). For instance, the UE 116 could receive from the network 130, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting, the bitmap. If a bit position/entry of the bitmap is set to '1' (or '0'), the FSBM reporting subband corresponding/associated to the bit position/entry is active/used for frequency-selective beam measurement/reporting for one of the one or more (e.g., $K_s \geq 1$) CSI-RS resources (e.g., one of the $K_s \geq 1$ NZP CSI-RS resources). For this example, the bitmap could contain/comprise $1 \leq M_{report} \leq N_{report}$ bit positions/entries set to '1's (or '0's) indicating that a total of $M_{report}$ FSBM reporting subbands—out of the total $N_{report}$ configured FSBM reporting subbands for each of the TRPs in the multi-TRP system (e.g., following one or more examples described herein)—could be active/used for the frequency-selective beam measurement/reporting for the one or more (e.g., $K_s \geq 1$) CSI-RS resources (or the $K_s \geq 1$ NZP CSI-RS resources) in the s-th set—e.g., the first bit position/entry in the bitmap set to '1' (or '0')—and therefore, the corresponding FSBM reporting subband among all the $N_{report}$ FSBM reporting subbands configured for each of the TRPs in the multi-TRP system (e.g., following one or more examples described herein)—could be associated/mapped to the first CSI-RS resource (or the first NZP CSI-RS resource) in the s-th set, the second bit position/entry in the bitmap set to '1' (or '0')—and therefore, the corresponding FSBM reporting subband among all the $N_{report}$ FSBM reporting subbands configured for each of the TRPs in the multi-TRP system (e.g., following one or more examples described herein)—could be associated/mapped to the second CSI-RS resource (or the second NZP CSI-RS resource) in the s-th set, and so on, and the $M_{report}$-th bit position/entry set to '1' (or '0')—and therefore, the corresponding FSBM reporting subband among all the $N_{report}$ FSBM reporting subbands configured for each of the TRPs in the multi-TRP system (e.g., following one or more examples described herein)—could be associated/mapped to the $K_s$-th CSI-RS resource (or the $K_s$-th NZP CSI-RS resource) in th s-th set. For this case, $M_{report} = K_s$. Alternatively, the higher layer parameter NZP-CSI-RS-Resource that configures a NZP CSI-RS resource in the s-th set could contain/comprise/provide a bitmap of length $N_{report}$ for the corresponding NZP CSI-RS resource with each bit position/entry of the bitmap corresponding/associated to a FSBM reporting subband for each of the TRPs in the multi-TRP system (e.g., following one or more examples described herein). For instance, if a bit position/entry of the bitmap is set to '1' (or '0'), the FSBM reporting subband corresponding/associated with the bit position/entry could be used/active for the frequency-selective beam measurement/reporting for the corresponding NZP CSI-RS resource in the s-th resource set.

Yet for another example, the UE 116 could be configured/indicated/provided by the network 130, e.g., via higher layer RRC signaling/parameter and/or MAC CE command and/or dynamic DCI based signaling, a bitmap of length $N_{report,s}$ for the one or more (e.g., $K_s \geq 1$) CSI-RS resources configured in the same CSI resource set (e.g., the s-th set) with each bit position/entry of the bitmap corresponding/associated to a FSBM reporting subband configured for at least the s-th TRP in the multi-TRP system (e.g., following one or more examples described herein). For instance, the UE 116 could receive from the network 130, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting, the bitmap. If a bit position/entry of the bitmap is set to '1' (or '0'), the FSBM reporting subband corresponding/associated to the bit position/entry is active/used for frequency-selective beam measurement/reporting for one of the one or more (e.g., $K_s \geq 1$) CSI-RS resources (e.g., one of the $K_s \geq 1$ NZP CSI-RS resources). For this example, the bitmap could contain/comprise $1 \leq M_{report,s} \leq N_{report,s}$ bit positions/entries set to '1's (or '0's) indicating that a total of $M_{report,s}$ FSBM reporting subbands—out of the total $N_{report,s}$ configured FSBM reporting subbands for at least the s-th TRP in the multi-TRP system (e.g., following one or more examples described herein)—could be active/used for the frequency-selective beam measurement/reporting for the one or more (e.g., $K_s \geq 1$) CSI-RS resources (or the $K_s \geq 1$ NZP CSI-RS resources) in the s-th set—e.g., the first bit position/entry in the bitmap set to '1' (or '0')—and therefore, the corresponding FSBM reporting subband among all the $N_{report,s}$ FSBM reporting subbands configured for at least the s-th TRP in the multi-TRP system (e.g., following one or more examples described herein)—could be associated/mapped to the first CSI-RS resource (or the first NZP CSI-RS resource) in the s-th set, the second bit position/entry in the bitmap set to '1' (or '0')—and therefore, the corresponding FSBM reporting subband among all the $N_{report,s}$ FSBM reporting subbands configured for at least the s-th TRP in the multi-TRP system (e.g., following one or more examples described herein)—could be associated/mapped to the second CSI-RS resource (or the second NZP CSI-RS resource) in the s-th set, and so on, and the $M_{report,s}$-th bit position/entry set to '1' (or '0')—and therefore, the corresponding FSBM reporting subband among all the $N_{report,s}$ FSBM reporting subbands configured for at least the s-th TRP in the multi-TRP system (e.g., following one or more examples described herein)—could be associated/mapped to the $K_s$-th CSI-RS resource (or the $K_s$-th NZP CSI-RS resource) in th s-th set. For this case, $M_{report,s} = K_s$. Alternatively, the higher layer parameter NZP-CSI-RS-Resource that configures a NZP CSI-RS resource in the s-th set could contain/comprise/provide a bitmap of length $N_{report,s}$ for the corresponding NZP CSI-RS resource with each bit position/entry of the bitmap corresponding/associated to a FSBM reporting subband for at least the s-th TRP in the multi-TRP system (e.g., following one or more examples described herein). For instance, if a bit position/entry of the bitmap is set to '1' (or '0'), the FSBM reporting subband corresponding/associated with the bit position/entry could be used/active for the frequency-selective beam measurement/reporting for the corresponding NZP CSI-RS resource in the s-th resource set.

Yet for another example, the UE 116 could be configured/indicated/provided by the network 130, e.g., via higher layer RRC signaling/parameter and/or MAC CE command and/or dynamic DCI based signaling, a set of $1 \leq M_{report} \leq N_{report}$ (subband) indexes for the one or more (e.g., $K_s \geq 1$) CSI-RS resources configured in the same CSI resource set (e.g., the s-th CSI resource set) with each (subband) index corresponding/pointing to a FSBM reporting subband configured for each of the TRPs in the multi-TRP system (e.g., following one or more examples described herein)—e.g., the (subband) indexes $1, 2, \ldots, M_{report}$ could correspond/point to the first FSBM reporting subband, the second FSBM reporting subband, . . . , the $M_{report}$-th FSBM reporting subband, respectively, among all the configured $N_{report}$ FSBM reporting subbands for each of the TRPs in the multi-TRP system (e.g., according to one or more examples described herein). For instance, the UE 116 could receive from the network 130, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting, the set of (subband) indexes. For this case, each of the $M_{report}$ FSBM reporting subband(s) corresponding/associated to the indicated/provided/configured (subband) index(es) could be active/used for the frequency-selective beam measurement/reporting for one of the one or more (e.g., $K_s \geq 1$) CSI-RS resources (e.g., one of the $K_s \geq 1$ NZP CSI-RS resources)—e.g., the first (subband) index in the set—and therefore, the corresponding FSBM reporting subband among all the $N_{report}$ FSBM reporting subbands configured for each of the TRPs in the multi-TRP system (e.g., following one or more examples described herein)—could be associated/mapped to the first CSI-RS resource (or the first NZP CSI-RS resource) in the s-th CSI resource set, the second (subband) index in the set—and therefore, the corresponding FSBM reporting subband among all the $N_{report}$ FSBM reporting subbands configured for each of the TRPs in the multi-TRP system (e.g., following one or more examples described herein)—could be associated/mapped to the second CSI-RS resource (or the second NZP CSI-RS resource) in the s-th CSI resource set, and so on, and the $M_{report}$-th (subband) index in the set—and therefore, the corresponding FSBM reporting subband among all the $N_{report}$ FSBM reporting subbands configured for each of the TRPs in the multi-TRP system (e.g., following one or more examples described herein)—could be associated/mapped to the $K_s$-th CSI-RS resource (or the $K_s$-th NZP CSI-RS resource) in the s-th CSI resource set. For this case, $M_{report}=K_s$. Alternatively, the higher layer parameter NZP-CSI-RS-Resource that configures a NZP CSI-RS resource in the s-th CSI resource set could contain/comprise/provide a (subband) index for the corresponding NZP CSI-RS resource. For instance, the FSBM reporting subband corresponding/associated with the (subband) index could be used/active for the frequency-selective beam measurement/reporting for the corresponding NZP CSI-RS resource in the s-th CSI resource set.

Yet for another example, the UE 116 could be configured/indicated/provided by the network 130, e.g., via higher layer RRC signaling/parameter and/or MAC CE command and/or dynamic DCI based signaling, a set of $1 \leq M_{report,s} \leq N_{report,s}$ (subband) indexes for the one or more (e.g., $K_s \geq 1$) CSI-RS resources configured in the same CSI resource set (e.g., the s-th CSI resource set) with each (subband) index corresponding/pointing to a FSBM reporting subband configured for at least the s-th TRP in the multi-TRP system (e.g., following one or more examples described herein)—e.g., the (subband) indexes $1, 2, \ldots, M_{report,s}$ could correspond/point to the first FSBM reporting subband, the second FSBM reporting subband, . . . , the $M_{report,s}$-th FSBM reporting subband, respectively, among all the configured $N_{report,s}$ FSBM reporting subbands for at least the s-th TRPs in the multi-TRP system (e.g., following one or more examples described herein). For instance, the UE 116 could receive from the network 130, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting, the set of (subband) indexes. For this case, each of the $M_{report,s}$ FSBM reporting subband(s) corresponding/associated to the indicated/provided/configured (subband) index(es) could be active/used for the frequency-selective beam measurement/reporting for one of the one or more (e.g., $K_s \geq 1$) CSI-RS resources (e.g., one of the $K_s \geq 1$ NZP CSI-RS resources)—e.g., the first (subband) index in the set—and therefore, the corresponding FSBM reporting subband among all the $N_{report,s}$ FSBM reporting subbands configured for at least the s-th TRP in the multi-TRP system (e.g., following one or more examples described herein)—could be associated/mapped to the first CSI-RS resource (or the first NZP CSI-RS resource) in the s-th CSI resource set, the second (subband) index in the set—and therefore, the corresponding FSBM reporting subband among all the $N_{report,s}$ FSBM reporting subbands configured for at least the s-th TRP in the multi-TRP system (e.g., following one or more examples described herein)—could be associated/mapped to the second CSI-RS resource (or the second NZP CSI-RS resource) in the s-th CSI resource set, and so on, and the $M_{report,s}$-th (subband) index in the set—and therefore, the corresponding FSBM reporting subband among all the $N_{report,s}$ FSBM reporting subbands configured for at least the s-th TRP in the multi-TRP system (e.g., following one or more examples described herein)—could be associated/mapped to the $K_s$-th CSI-RS resource (or the $K_s$-th NZP CSI-RS resource) in the s-th CSI resource set. For this case, $M_{report,s}=K_s$. Alternatively, the higher layer parameter NZP-CSI-RS-Resource that configures a NZP CSI-RS resource in the s-th CSI resource set could contain/comprise/provide a (subband) index for the corresponding NZP CSI-RS resource. For instance, the FSBM reporting subband corresponding/associated with the (subband) index could be used/active for the frequency-selective beam measurement/reporting for the corresponding NZP CSI-RS resource in the s-th CSI resource set.

In yet another example, when the FSBM or frequency selective/frequency subband specific/dependent beam management is enabled (according to one or more examples described herein), the UE 116 could be configured by the network 130, in a resource set (e.g., provided by CSI-SSB-ResourceSet/NZP-CSI-RS-ResourceSet), one or more (e.g., S'≥1, or S'=2) CSI resource subsets/groups for FSBM such as SSB resource subsets/groups (e.g., each provided by CSI-SSB-ResourceSubSet) or NZP CSI-RS resource subsets/groups (e.g., each provided by NZP-CSI-RS-Resource-SubSet) each associated/mapped to at least one TRP in the multi-TRP system. Furthermore, each configured CSI resource subset/group for FSBM could comprise/configure/provide one or more CSI-RS resources such as NZP CSI-RS resources (each provided by NZP-CSI-RS-Resource)—also referred to as CSI-RS resources for FSBM; each of the one or more CSI-RS resources for FSBM in a resource subset/group could be configured/associated with one or more (e.g., $1 \leq M_{report} \leq N_{report}$) of the configured (e.g., $N_{report} \leq 1$) FSBM reporting subbands for all the TRPs in the multi-TRP system following one or more examples described herein by replacing CSI resource set(s) with CSI resource subset(s)/group(s) (or using CSI resource subset(s)/group(s) instead of CSI resource set(s)). Alternatively, the s'-th configured CSI resource subset/group for FSBM in a resource set could comprise/configure/provide one or more CSI-RS resources such as NZP CSI-RS resources (each provided by NZP-CSI-RS-Resource)—also referred to as CSI-RS resources for FSBM; each of the one or more CSI-RS resources for FSBM in the s'-th CSI resource subset/group in a resource set could be configured/associated with one or more (e.g., $1 \leq M_{report,s} \leq N_{report,s}$) of the configured (e.g., $N_{report,s} \geq 1$) FSBM reporting subbands for at least the s'-th TRP in the multi-TRP system following one or more examples described herein by replacing CSI resource set(s) with CSI resource subset(s)/group(s) (or using CSI resource subset(s)/group(s) instead of CSI resource set(s)), where s'∈ $\{1, \ldots, S'\}$ or s'=1, . . . , S'.

In yet another example, when the FSBM or frequency selective/frequency subband specific/dependent beam management is enabled (according to one or more examples described herein), the UE 116 could be configured by the network 130, in a resource set (e.g., provided by CSI-SSB-ResourceSet/NZP-CSI-RS-ResourceSet), one or more (e.g., S'≥1, or S'=2) CSI resource subsets/groups for FSBM such as SSB resource subsets/groups (e.g., each provided by CSI-SSB-ResourceSubSet) or NZP CSI-RS resource subsets/groups (e.g., each provided by NZP-CSI-RS-Resource-SubSet) each associated/mapped to at least one TRP in the multi-TRP system. Furthermore, each configured CSI resource subset/group (e.g., the s'-th CSI resource subset/group in a resource set with s'∈ $\{1, \ldots, S'\}$ or s'=1, . . . , S') for FSBM could comprise/configure/provide one or more (e.g., $K_s \geq 1$ for the s'-th CSI resource subset/group in the resource set with s'∈ $\{1, \ldots, S'\}$ or s'=1, . . . , S') CSI-RS resources such as NZP CSI-RS resources (each provided by NZP-CSI-RS-Resource)—also referred to as CSI-RS resources for FSBM; each of the one or more CSI-RS resources for FSBM in a resource subset/group could be configured/associated with a FSBM reporting subband configured for all the TRPs in the multi-TRP system following those specified in one or more examples described herein by replacing CSI resource set(s) with CSI resource subset(s)/group(s) (or using CSI resource subset(s)/group(s) instead of CSI resource set(s)). Alternatively, the s'-th configured CSI resource subset/group for FSBM in a resource set could comprise/configure/provide one or more (e.g., $K_s \geq 1$) CSI-RS resources such as NZP CSI-RS resources (each provided by NZP-CSI-RS-Resource)—also referred to as CSI-RS resources for FSBM; for this case, each of the one or more CSI-RS resources for FSBM in the s'-th CSI resource subset/group in a resource set could be configured/associated with a FSBM reporting subband for at least the s'-th TRP in the multi-TRP system following those specified in one or more examples described herein by replacing CSI resource set(s) with CSI resource subset(s)/group(s) (or using CSI resource subset(s)/group(s) instead of CSI resource set(s)), where s'∈ $\{1, \ldots, S'\}$ or s'=1, . . . , S'.

When the FSBM or frequency selective/frequency subband specific/dependent beam management is enabled (according to one or more examples described herein), the FSBM measurement subband(s) and the FSBM reporting subband(s) configured for the same TRP (e.g., the s-th TRP in the multi-TRP system, represented by, e.g., the s-th CSI resource set configured in a resource setting, a PCI—the serving cell PCI or a PCI other than the serving cell PCI, a value of CORESET pool index—0 or 1, etc., with s∈ $\{1, \ldots, S\}$, e.g., s=1 or 2) could be the same or different, i.e., $N_{meas} = N_{report}$, $N_{meas} \geq N_{report}$ or $N_{meas} \leq N_{report}$, or $N_{meas,s} = N_{report,s}$, $N_{meas,s} \geq N_{report,s}$ or $N_{meas,s} \leq N_{report,s}$ for s∈ $\{1, \ldots, S\}$. That is, for a TRP in a multi-TRP system, e.g., the s-th TRP in the multi-TRP system, represented by, e.g., the s-th CSI resource set configured in a resource setting, a PCI—the serving cell PCI or a PCI other than the serving cell PCI, a value of CORESET pool index—0 or 1, etc., with s∈ $\{1, \ldots, S\}$, e.g., s=1 or 2.

For example, when the FSBM or frequency selective/frequency subband specific/dependent beam management is enabled (according to one or more examples described herein), the UE 116 could be configured/indicated/provided by the network 130, e.g., via higher layer RRC signaling/parameter and/or MAC CE command and/or dynamic DCI based signaling, the same frequency subband(s) for both frequency-selective beam measurement and reporting (i.e., $N_{meas} = N_{report}$ or $N_{meas,s} = N_{report,s}$). For this case, the UE 116 could only be configured/indicated/provided by the network 130, e.g., via higher layer RRC signaling/parameter and/or MAC CE command and/or dynamic DCI based signaling, either the FSBM measurement subband(s) or the FSBM reporting subband(s) according to the herein discussed/described design examples. The UE 116 could be further indicated by the network 130 that the FSBM measurement subband(s) is the same as the FSBM reporting subband(s) or vice versa for the corresponding TRP; this indication could be via higher layer RRC signaling/parameter and/or MAC CE command and/or dynamic DCI based signaling.

For another example, when the FSBM or frequency selective/frequency subband specific/dependent beam management is enabled (according to one or more examples described herein), the FSBM measurement subband(s) could be a subset of the FSBM reporting subband(s), or vice versa, for the corresponding TRP.

In one example, when the FSBM or frequency selective/frequency subband specific/dependent beam management is enabled (according to one or more examples described herein), the association/mapping between the FSBM measurement subband(s) and the FSBM reporting subband(s) for the corresponding TRP could be fixed in the system specification(s)—e.g., the first FSBM measurement subband could correspond to the first FSBM reporting subband, the second FSBM measurement subband could correspond to the second FSBM reporting subband, and so on.

In another example, when the FSBM or frequency selective/frequency subband specific/dependent beam management is enabled (according to one or more examples described herein), the UE 116 could be indicated/configured/provided by the network 130, e.g., via higher layer RRC signaling/parameter and/or MAC CE command and/or dynamic DCI based signaling, the association/mapping between one or more of the FSBM measurement subband(s) and one or more of the FSBM reporting subband(s) for the corresponding TRP.

Furthermore, when the FSBM or frequency selective/frequency subband specific/dependent beam management is enabled (according to one or more examples described herein), the FSBM measurement subband(s) that is active/used for frequency-selective beam measurement/reporting for one or more CSI-RS resources in the CSI resource set associated/corresponding to the TRP (e.g., the s-th CSI resource set configured in a resource setting associated/corresponding to the s-th TRP)—referred to as active FSBM measurement subband(s) for the corresponding TRP in the present disclosure (configured according to one or more examples described herein) and the FSBM reporting subband(s) that is active/used for frequency-selective beam measurement/reporting for one or more CSI-RS resources in the CSI resource set associated/corresponding to the TRP (e.g., the s-th CSI resource set configured in a resource setting associated/corresponding to the s-th TRP)—refereed to as active FSBM reporting subband(s) for the corresponding TRP in the present disclosure (configured according to one or more examples described herein) could be the same or different (i.e., $M_{meas}=M_{report}$, $M_{meas}\geq M_{report}$ or $M_{meas}\leq M_{report}$, or $M_{meas,s}=M_{report,s}$, $M_{meas,s}\geq M_{report,s}$ or $M_{meas,s}\leq M_{report,s}$ for $s\in\{1, \ldots, S\}$).

For example, when the FSBM or frequency selective/frequency subband specific/dependent beam management is enabled (according to one or more examples described herein), the UE 116 could be configured/indicated/provided by the network 130, e.g., via higher layer RRC signaling/parameter and/or MAC CE command and/or dynamic DCI based signaling, the same frequency subband(s) for both active FSBM measurement subband(s) and active FSBM reporting subband(s) (i.e., $M_{meas}=M_{report}$ or $M_{meas,s}=M_{report,s}$). For this case, the UE 116 could only be configured/indicated/provided by the network 130, e.g., via higher layer RRC signaling/parameter and/or MAC CE command and/or dynamic DCI based signaling, either the active FSBM measurement subband(s) for the corresponding TRP—following the examples therein, or the active FSBM reporting subband(s) for the corresponding TRP—following the examples therein. The UE 116 could be further indicated by the network 130 that the active FSBM measurement subband(s) is the same as the active FSBM reporting subband(s) or vice versa, for the corresponding TRP; this indication could be via higher layer RRC signaling/parameter and/or MAC CE command and/or dynamic DCI based signaling.

For another example, when the FSBM or frequency selective/frequency subband specific/dependent beam management is enabled (according to one or more examples described herein), the active FSBM measurement subband(s) could be a subset of the active FSBM reporting subband(s), or vice versa, for the corresponding TRP (e.g., the s-th TRP described herein).

In one example, when the FSBM or frequency selective/frequency subband specific/dependent beam management is enabled (according to one or more examples described herein), the association/mapping between the active FSBM measurement subband(s) and the active FSBM reporting subband(s) for the corresponding TRP could be fixed in the system specification(s)—e.g., the first active FSBM measurement subband could correspond to the first active FSBM reporting subband, the second active FSBM measurement subband could correspond to the second active FSBM reporting subband, and so on, for the corresponding TRP.

In another example, when the FSBM or frequency selective/frequency subband specific/dependent beam management is enabled (according to one or more examples described herein), the UE 116 could be indicated/configured/provided by the network 130, e.g., via higher layer RRC signaling/parameter and/or MAC CE command and/or dynamic DCI based signaling, the association/mapping between one or more of the active FSBM measurement subband(s) and one or more of the active FSBM reporting subband(s), for the corresponding TRP.

When the FSBM or frequency selective/frequency subband specific/dependent beam management is enabled (according to one or more examples described herein), the association/mapping relationship between the following (i) and (ii) could follow or be determined/configured according one or more examples described herein, for a TRP in a multi-TRP system, e.g., the s-th TRP in the multi-TRP system, represented by, e.g., the s-th CSI resource set configured in a resource setting, a PCI—the serving cell PCI or a PCI other than the serving cell PCI, a value of CORESET pool index—0 or 1, etc., with $s\in\{1, \ldots, S\}$, e.g., s=1 or 2.

(i) active FSBM measurement subband(s) and (ii) FSBM reporting subband(s), for the corresponding TRP (i) active FSBM reporting subband(s) and (ii) FSBM measurement subband(s), for the corresponding TRP When the FSBM or frequency selective/frequency subband specific/dependent beam management is enabled (according to one or more examples described herein), the UE 116 could be configured/indicated/provided by the network 130, e.g., via higher layer RRC signaling/parameter and/or MAC CE command and/or dynamic DCI based signaling, one or more FSBM measurement subband sizes—in number of PRBs (or size of each of the FSBM measurement subbands in number of PRBs) for one or more TRPs, one or more FSBM reporting subband sizes—in number of PRBs (or size of each of the FSBM reporting subbands in number of PRBs). For a FSBM measurement subband size configured for a TRP in a multi-TRP system, e.g., the s-th TRP in the multi-TRP system, represented by, e.g., the s-th CSI resource set configured in a resource setting, a PCI—the serving cell PCI or a PCI other than the serving cell PCI, a value of CORESET pool index—0 or 1, etc., with $s\in\{1, \ldots, S\}$, e.g., s=1 or 2.

In one example, the FSBM measurement subband size could be the same as the FSBM reporting subband size configured for the same TRP.

In another example, the FSBM measurement subband size is related to the FSBM reporting subband size configured for the same TRP by a fixed (mapping/association) relationship. For instance, the FSBM measurement subband size is a multiple (e.g., a multiple/scaling factor k) of the FSBM reporting subband size for the same TRP. The multiple/scaling factor k could be fixed in the system specifications and/or indicated/configured/provided to the UE 116 via higher layer RRC signaling/parameter and/or MAC CE command and/or dynamic DCI based signaling.

In yet another example, the FSBM measurement subband size is independently/separately configured/indicated relative to the FSBM reporting subband size for the same TRP.

For a FSBM reporting subband size configured for a TRP in a multi-TRP system, e.g., the s-th TRP in the multi-TRP system, represented by, e.g., the s-th CSI resource set configured in a resource setting, a PCI—the serving cell PCI or a PCI other than the serving cell PCI, a value of CORESET pool index—0 or 1, etc., with $s \in \{1, \ldots, S\}$, e.g., s=1 or 2.

In one example, the FSBM reporting subband size could be the same as the FSBM measurement subband size configured for the same TRP.

In another example, the FSBM reporting subband size is related to the FSBM measurement subband size configured for the same TRP by a fixed (mapping/association) relationship. For instance, the FSBM reporting subband size is a multiple (e.g., a multiple/scaling factor k) of the FSBM measurement subband size for the same TRP. The multiple/scaling factor k could be fixed in the system specifications and/or indicated/configured/provided to the UE 116 via higher layer RRC signaling/parameter and/or MAC CE command and/or dynamic DCI based signaling.

In yet another example, the FSBM reporting subband size is independently/separately configured/indicated relative to the FSBM measurement subband size for the same TRP.

A UE could be provided/configured/indicated by the network 130, e.g., via higher layer RRC signaling/parameter (e.g., in the higher layer parameter CSI-ReportConfig that configures a CSI reporting setting) and/or MAC CE command and/or dynamic DCI based signaling, that group based beam reporting for FSBM based multi-TRP operation is enabled or not (not enabled/disabled). For example, a UE could receive from the network 130, in the higher layer parameter CSI-ReportConfig that configures a CSI reporting setting, a higher layer parameter groupBasedBeamReporting-FSBM, to turn on/off the group based beam reporting for the FSBM based multi-TRP operation.

Figure 15:
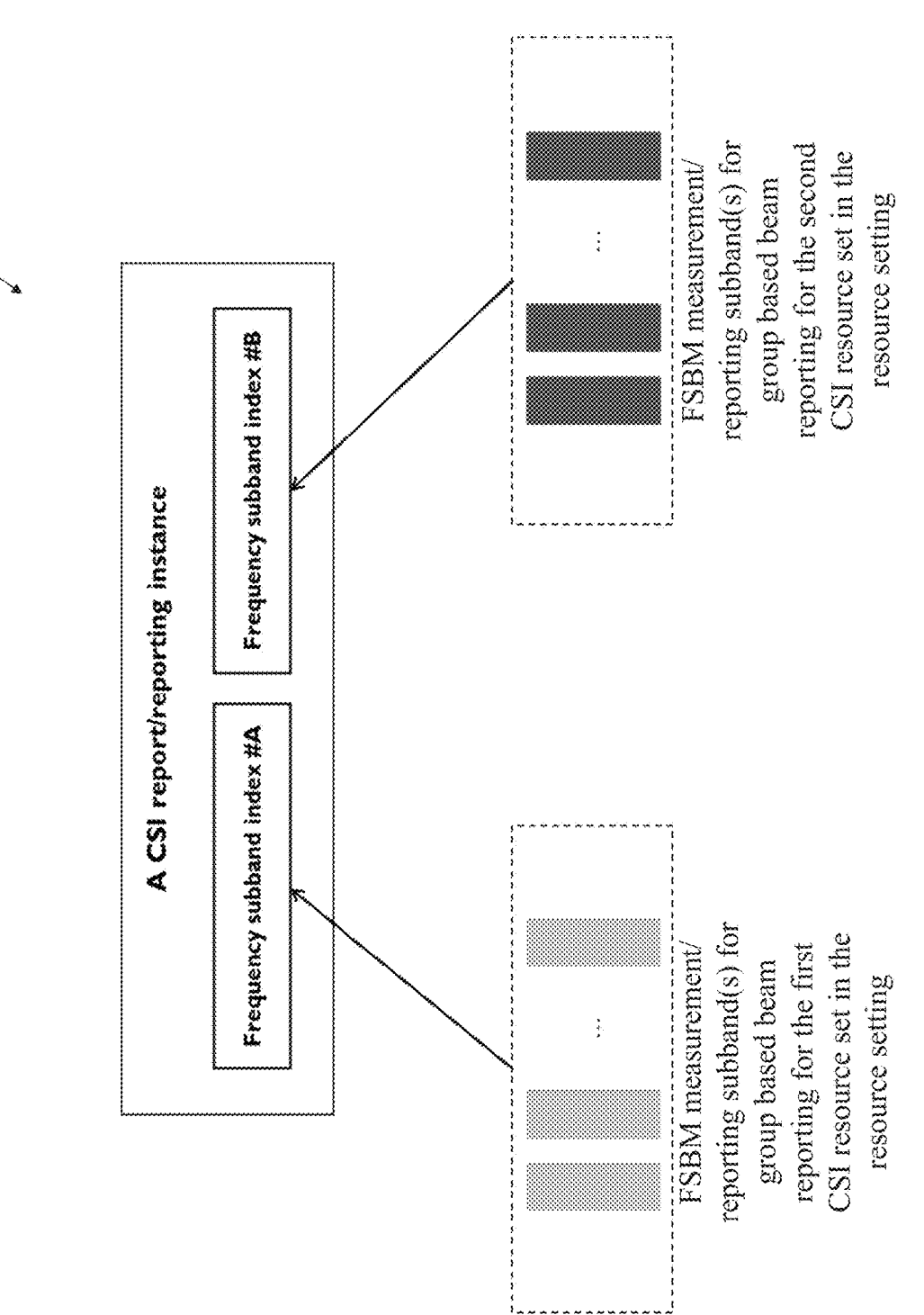
FIG. 15 illustrates an example of reporting, in a CSI report/reporting instance, a group of two frequency subband indexes according to embodiments of the present disclosure.

FIG. 15 illustrates an example architecture 1500 of reporting, in a CSI report/reporting instance, a group of two frequency subband indexes according to embodiments of the present disclosure. For example, the UE 116 in FIG. 3 may utilize architecture 1500 for measurement and reporting. This example is for illustration only and other embodiments can be used without departing from the scope of the present disclosure.

When the group based beam reporting for the FSBM based multi-TRP operation is enabled, e.g., when the higher layer parameter groupBasedBeamReporting-FSBM in CSI-ReportConfig is enabled or turned on, the UE 116 could report, e.g., in a CSI report/CSI reporting instance, one or more (e.g., $N_{group} \geq 1$) groups of frequency subband index(es) with each group comprising one or more (e.g., $N_{freq} \geq 1$) frequency subband indexes. The UE 116 could also report, e.g., in the same CSI report/CSI reporting instance, one or more beam metrics such as L1-RSRPs/L1-SINRs each corresponding/associated to a reported frequency subband index. Each reported frequency subband index in a reported group of frequency subband indexes could be selected/determined from one or more of the FSBM measurement/reporting subbands configured/active for the one or more CSI-RS resources configured in a CSI resource set in a resource setting or configured/active for the BWP/component carrier (CC)—also referred to as FSBM measurement/reporting subband(s) for group based beam reporting for the CSI resource set in the resource setting (e.g., the FSBM measurement/reporting subbands for group based beam reporting for the s-th CSI resource set could correspond to one or more of the $N_{meas}/M_{meas}$ or $N_{meas,s}$ $M_{meas,s}$ FSBM measurement/reporting subbands configured/active for the s-th CSI resource set with $s \in \{1, \ldots, S\}$, where S is the number of CSI resource sets configured in the resource setting).

For example, for each of the CSI resource sets configured in the resource setting, the corresponding FSBM measurement/reporting subbands for group based beam reporting (e.g., the FSBM measurement/reporting subbands for group based beam reporting for the s-th CSI resource set with $s \in \{1, \ldots, S\}$, where S is the number of CSI resource sets configured in the resource setting) could correspond to the FSBM measurement/reporting subbands configured/active for the corresponding CSI resource set (e.g., the $N_{meas}/M_{meas}$ or $N_{meas,s}/M_{meas,s}$ FSBM measurement/reporting subbands configured/active for the s-th CSI resource set with $s \in \{1, \ldots, S\}$, where S is the number of CSI resource sets configured in the resource setting), or the FSBM measurement/reporting subbands configured/active for the BWP/CC.

For another example, the UE 116 could be configured/indicated/provided by the network 130, e.g., via higher layer RRC signaling and/or MAC CE command and/or dynamic DCI based signaling, one or more (e.g., S) bitmaps with each bitmap corresponding/associated to a CSI resource set configured in a resource setting for FSBM. For instance, the UE 116 could receive from the network 130, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting, the one or more bitmaps. Each bit position/entry in a bitmap could correspond to a FSBM measurement/reporting subband among all the FSBM measurement/reporting subbands configured/active for the CSI resource set associated/corresponding to the bitmap. Alternatively, each bit position/entry in a bitmap could correspond to a FSBM measurement/reporting subband among all the FSBM measurement/reporting subbands configured/active for the BWP/CC. If a bit position/entry of a bitmap is set to '1' (or '0'), the FSBM measurement/reporting subband corresponding/associated to the bit position/entry could be configured/active/regarded as a FSBM measurement/reporting subband for group based beam reporting for the CSI resource set corresponding/associated to the bitmap. The association/mapping between the one or more bitmaps and the CSI resource sets in a resource setting could be fixed in the system specifications. For instance, the first (or last) bitmap could correspond to the first configured CSI resource set in the resource setting, the second (or second last) bitmap could correspond to the second configured CSI resource set in the resource setting, and so on, and the last (or first) bitmap could correspond to the last configured CSI resource set in the resource setting. Alternatively, the UE 116 could be configured/provided/indicated by the network 130, e.g., via higher layer RRC signaling/parameter and/or MAC CE command and/or dynamic DCI based signaling, the association/mapping between the one or more bitmaps and the CSI resource sets in the resource setting for FSBM.

Yet for another example, the UE 116 could be configured/indicated/provided by the network 130, e.g., via higher layer RRC signaling and/or MAC CE command and/or dynamic DCI based signaling, one or more (e.g., S) sets of frequency subband indexes with each set corresponding/associated to a CSI resource set configured in a resource setting for FSBM. For instance, the UE 116 could receive from the network 130, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting, the one or more sets of frequency subband indexes. Each frequency subband index in a set of frequency subband indexes could correspond to a FSBM measurement/reporting subband among all the FSBM measurement/reporting subbands configured/active for the CSI resource set associated/corresponding to the set of frequency subband indexes. Alternatively, each frequency subband index in a set of frequency subband indexes could correspond to a FSBM measurement/reporting subband among all the FSBM measurement/reporting subbands configured/active for the BWP/CC. The FSBM measurement/reporting subband(s) corresponding/associated to the indicated/configured/provided frequency subband index(es) in a set could be configured/active/regarded as the FSBM measurement/reporting subband(s) for group based beam reporting for the CSI resource set corresponding/associated to the set of frequency subband index(es). The association/mapping between the one or more sets of frequency subband indexes and the CSI resource sets in a resource setting could be fixed in the system specifications. For instance, the first (or last) set could correspond to the first configured CSI resource set in the resource setting, the second (or second last) set could correspond to the second configured CSI resource set in the resource setting, and so on, and the last (or first) set could correspond to the last configured CSI resource set in the resource setting. Alternatively, the UE 116 could be configured/provided/indicated by the network 130, e.g., via higher layer RRC signaling/parameter and/or MAC CE command and/or dynamic DCI based L1 signaling, the association/mapping between the one or more sets of frequency subband indexes and the CSI resource sets in the resource setting for FSBM.

Yet for another example, the UE 116 could receive from the network 130 one or more (e.g., S) MAC CE activation commands each corresponding/associated to a CSI resource set configured in a resource setting for FSBM. A MAC CE activation command could activate one or more frequency subband indexes from all the FSBM measurement/reporting subbands configured/active for the CSI resource set associated/corresponding to the MAC CE activation command, or from all the FSBM measurement/reporting subbands configured/active for the BWP/CC. The FSBM measurement/reporting subband(s) activated by a MAC CE activation command could be configured/active/regarded as the FSBM measurement/reporting subband(s) for group based beam reporting for the CSI resource set corresponding/associated with the MAC CE activation command. The association/mapping between the one or more MAC CE activation commands and the CSI resource sets in a resource setting could be fixed in the system specifications. For instance, the first (or last) MAC CE activation command could correspond to the first configured CSI resource set in the resource setting, the second (or second last) MAC CE activation command could correspond to the second configured CSI resource set in the resource setting, and so on, and the last (or first) MAC CE activation command could correspond to the last configured CSI resource set in the resource setting. Alternatively, the UE 116 could be configured/provided/indicated by the network 130, e.g., via higher layer RRC signaling/parameter and/or MAC CE command and/or dynamic DCI based L1 signaling, the association/mapping between the one or more MAC CE activation commands and the CSI resource sets in the resource setting for FSBM.

Different frequency subband indexes reported in the same group of frequency subband indexes could be selected/determined from the FSBM measurement/reporting subbands (for group based beam reporting) configured/active for different CSI resource sets in a resource setting. In addition, the UE 116 could receive the CSI-RS resource(s) (e.g., SSB resource(s) and/or NZP CSI-RS resource(s)) on the frequency subbands—whose indexes are reported in the same group of frequency subband indexes—using either a single spatial domain receive filter, or multiple simultaneous spatial domain receive filters.

For example, in the first group of $N_{freq}$ frequency subband indexes reported in a CSI report/reporting instance, the first reported frequency subband index could be selected/determined from the one or more FSBM measurement/reporting subbands (for group based beam reporting) configured/active for the u-th CSI resource set with $u \in \{1, \ldots, S\}$, where S is the number of CSI resource sets configured in the resource setting. The rest of the $N_{freq}-1$ frequency subband indexes reported in the first group in the same CSI report/reporting instance could be one-to-one associated/mapped to the rest of the S–1 CSI resource sets configured in the same CSI resource setting. For instance, the first frequency subband index—among the rest of the $N_{freq}-1$ frequency subband indexes reported in the first group in the same CSI report/reporting instance—could be determined/selected from the one or more FSBM measurement/reporting subbands (for group based beam reporting) configured/active for the first (or last) CSI resource set—among the rest of the S–1 CSI resource sets configured in the same CSI resource setting, the second frequency subband index—among the rest of the $N_{freq}-1$ frequency subband indexes reported in the first group in the same CSI report/reporting instance—could be determined/selected from the one or more FSBM measurement/reporting subbands (for group based beam reporting) configured/active for the second (or second last) CSI resource set—among the rest of the S–1 CSI resource sets configured in the same CSI resource setting, and so on, and the last frequency subband index—among the rest of the $N_{freq}-1$ frequency subband indexes reported in the first group in the same CSI report/reporting instance—could be determined/selected from the one or more FSBM measurement/reporting subbands (for group based beam reporting) configured/active for the last (or first) CSI resource set—among the rest of the S–1 CSI resource sets configured in the same CSI resource setting; for this case, $N_{freq}=S$. Alternatively, the UE 116 could be indicated/configured/provided by the network 130, e.g., via higher layer RRC signaling/parameter and/or MAC CE command and/or dynamic DCI based L1 signaling, the association/mapping between the rest of the $N_{freq}-1$ frequency subband indexes reported in the first group in the same CSI report/reporting instance and the rest of the S–1 CSI resource sets configured in the same CSI resource setting. Optionally, the UE 116 could autonomously determine/decide the association/mapping between the rest of the $N_{freq}-1$ frequency subband indexes reported in the first group in the same CSI report/reporting instance and the rest of the S–1 CSI resource sets configured in the same CSI resource setting; for this case, the UE 116 could indicate to the network 130 the association/mapping relationship. The UE 116 could also report to the network 130, in the same CSI report/reporting instance, the set index/ID of the u-th CSI resource set in the resource setting with $u \in \{1, \ldots, S\}$, where S is the number of CSI resource sets configured in the resource setting. Furthermore, the UE 116 shall use differential L1-RSRP based reporting, where the largest measured value of L1-RSRP—associated with the reported u-th CSI resource set discussed herein—is quantized to a 7-bit value in the range [−140, −44] dBm with 1 dB step size, and the differential L1-RSRP—associated with CSI resource set(s) other than the reported u-th CSI resource set described herein—is quantized to a 4-bit value. The differential L1-RSRP value is computed with a 2 dB step size with a reference to the largest measured L1-RSRP value which is part of the same L1-RSRP reporting instance. The UE 116 could also use differential L1-SINR based reporting in a similar/same manner to/as the differential L1-RSRP based reporting described herein. In the rest of the $N_{group}-1$ groups of frequency subband indexes (if reported), the ordering of the reported frequency subband indexes (and therefore, the ordering of their associated/corresponding CSI resource sets) could follow that in the first reported group of frequency subband indexes described herein. For $N_{freq}=2$ and/or $S=2$, in a group of frequency subband indexes reported in a CSI report/reporting instance, the first reported frequency subband index could be selected/determined from the one or more FSBM measurement/reporting subbands (for group based beam reporting) configured/active for the 1-st (or 2-nd) CSI resource set, and the second reported frequency subband index could be selected/determined from the one or more FSBM measurement/reporting subbands (for group based beam reporting) configured/active for the 2-nd (or 1-st) CSI resource set. For this case, the UE 116 could report to the network 130, in the same CSI report/CSI reporting instance, the set index/ID of the 1-st (or 2-nd) CSI resource set in the resource setting, and the reported 1-st (or 2-nd) CSI resource set is associated with the largest measured L1-RSRP (differential L1-RSRP reporting is enabled).

For another example, the $N_{freq}$ frequency subband indexes reported in a group of frequency subband indexes (or each group of frequency subband indexes) in the same CSI report/reporting instance could be one-to-one associated/mapped to the S CSI resource sets configured in the same CSI resource setting. For instance, in a group of $N_{freq}$ frequency subband indexes (or each group of $N_{freq}$ frequency subband indexes) reported in a CSI report/reporting instance, the first reported frequency subband index could be selected/determined from the one or more FSBM measurement/reporting subbands (for group based beam reporting) configured/active for the first (or last) CSI resource set in the resource setting, the second frequency subband index could be determined/selected from the one or more FSBM measurement/reporting subbands (for group based beam reporting) configured/active for the second (or second last) CSI resource set in the same resource setting, and so on, and the last frequency subband index could be determined/selected from the one or more FSBM measurement/reporting subbands (for group based beam reporting) configured/active for the last (or first) CSI resource set in the same CSI resource setting; for this case, $N_{freq}=S$. Alternatively, the UE 116 could be indicated/configured/provided by the network 130, e.g., via higher layer RRC signaling/parameter and/or MAC CE command and/or dynamic DCI based L1 signaling, the association/mapping between the $N_{freq}$ frequency subband indexes reported in a group of frequency subband indexes (or each group of frequency subband indexes) in the same CSI report/reporting instance and the S CSI resource sets configured in the same CSI resource setting. Optionally, the UE 116 could autonomously determine/decide the association/mapping between the $N_{freq}$ frequency subband indexes reported in a group of frequency subband indexes (or each group of frequency subband indexes) in the same CSI report/reporting instance and the S CSI resource sets configured in the same CSI resource setting; for this case, the UE 116 could indicate to the network 130 the association/mapping relationship. Furthermore, the UE 116 shall use differential L1-RSRP based reporting, where the largest measured value of L1-RSRP is quantized to a 7-bit value in the range [−140, −44] dBm with 1 dB step size, and the differential L1-RSRP is quantized to a 4-bit value. The differential L1-RSRP value is computed with a 2 dB step size with a reference to the largest measured L1-RSRP value which is part of the same L1-RSRP reporting instance. The UE 116 could also report to the network 130, e.g., in the same CSI report/reporting instance, the position/location of the largest measured L1-RSRP in the CSI report/reporting instance and/or the CSI resource set index/ID associated with the largest measured L1-RSRP. The UE 116 could also use differential L1-SINR based reporting in a similar/same manner to/as the differential L1-RSRP based reporting described herein. For $N_{freq}=2$ and/or $S=2$, in a group of frequency subband indexes reported in a CSI report/reporting instance, the first reported frequency subband index could be selected/determined from the one or more FSBM measurement/reporting subbands (for group based beam reporting) configured/active for the 1-st (or 2-nd) CSI resource set, and the second reported frequency subband index could be selected/determined from the one or more FSBM measurement/reporting subbands (for group based beam reporting) configured/active for the 2-nd (or 1-st) CSI resource set.

In another example, the UE 116 could report, e.g., in a CSI report/CSI reporting instance, one or more (e.g., $N_{group}\geq 1$) groups of frequency subband index(es) with each group comprising one or more (e.g., $N_{freq}\geq 1$) frequency subband indexes. The UE 116 could also report, e.g., in the same CSI report/CSI reporting instance, one or more beam metrics such as L1-RSRPs/L1-SINRs each corresponding/associated to a reported frequency subband index. Each reported frequency subband index in a reported group of frequency subband indexes could be selected/determined from one or more of the FSBM measurement/reporting subbands configured/active for the one or more CSI-RS resources configured in a CSI resource subset/group in a CSI resource set or configured/active for the BWP/CC—also referred to as FSBM measurement/reporting subband(s) for group based beam reporting for the CSI resource subset/group in the resource set (e.g., the FSBM measurement/reporting subbands for group based beam reporting for the s'-th CSI resource subset/group could correspond to one or more of the $N_{meas}/M_{meas}$ or $N_{meas,s'}/M_{meas,s'}$ FSBM measurement/reporting subbands configured/active for the s'-th CSI resource subset/group with $s' \in \{1, \ldots, S'\}$, where S' is the number of CSI resource subsets/groups configured in the CSI resource set). For this design example, the configuration/indication of the FSBM measurement/reporting subband(s) for group based beam reporting could follow those specified in the examples therein, e.g., one or more examples described herein, by replacing CSI resource set(s) in a resource setting with CSI resource subset(s)/group(s) in a resource set (or using CSI resource subset(s)/group(s) in a resource set instead of CSI resource set(s) in a resource setting in these examples). Different frequency subband indexes reported in the same group of frequency subband indexes could be selected/determined from the FSBM measurement/reporting subbands (for group based beam reporting) configured/active for different CSI resource subsets/groups in a resource set. In addition, the UE 116 could receive the CSI-RS resource(s) (e.g., SSB resource(s) and/or NZP CSI-RS resource(s)) on the frequency subbands—whose indexes are reported in the same group of frequency subband indexes—using either a single spatial domain receive filter, or multiple simultaneous spatial domain receive filters.

For example, in the first group of $N_{freq}$ frequency subband indexes reported in a CSI report/reporting instance, the first reported frequency subband index could be selected/determined from the one or more FSBM measurement/reporting subbands (for group based beam reporting) configured/active for the v-th CSI resource subset/group with $v \in \{1, \ldots, S'\}$, where S' is the number of CSI resource subsets/groups configured in the CSI resource set. The rest of the $N_{freq}-1$ frequency subband indexes reported in the first group in the same CSI report/reporting instance could be one-to-one associated/mapped to the rest of the S'-1 CSI resource subsets/groups configured in the same CSI resource set. For instance, the first frequency subband index—among the rest of the $N_{freq}-1$ frequency subband indexes reported in the first group in the same CSI report/reporting instance—could be determined/selected from the one or more FSBM measurement/reporting subbands (for group based beam reporting) configured/active for the first (or last) CSI resource subset/group—among the rest of the S'-1 CSI resource subsets/groups configured in the same CSI resource set, the second frequency subband index—among the rest of the $N_{freq}-1$ frequency subband indexes reported in the first group in the same CSI report/reporting instance—could be determined/selected from the one or more FSBM measurement/reporting subbands (for group based beam reporting) configured/active for the second (or second last) CSI resource subset/group—among the rest of the S'-1 CSI resource subsets/groups configured in the same CSI resource set, and so on, and the last frequency subband index—among the rest of the $N_{freq}-1$ frequency subband indexes reported in the first group in the same CSI report/reporting instance—could be determined/selected from the one or more FSBM measurement/reporting subbands (for group based beam reporting) configured/active for the last (or first) CSI resource subset/group—among the rest of the S'-1 CSI resource subsets/groups configured in the same CSI resource set; for this case, $N_{freq}=S'$. Alternatively, the UE 116 could be indicated/configured/provided by the network 130, e.g., via higher layer RRC signaling/parameter and/or MAC CE command and/or dynamic DCI based L1 signaling, the association/mapping between the rest of the $N_{freq}-1$ frequency subband indexes reported in the first group in the same CSI report/reporting instance and the rest of the S'-1 CSI resource subsets/groups configured in the same CSI resource set. Optionally, the UE 116 could autonomously determine/decide the association/mapping between the rest of the $N_{freq}-1$ frequency subband indexes reported in the first group in the same CSI report/reporting instance and rest of the S'-1 CSI resource subsets/groups configured in the same CSI resource set; for this case, the UE 116 could indicate to the network 130 the association/mapping relationship. The UE 116 could also report to the network 130, in the same CSI report/reporting instance, the subset/group index/ID of the v-th CSI resource subset/group in the CSI resource set with $v \in \{1, \ldots, S'\}$, where S' is the number of CSI resource subsets/groups configured in the resource set. Furthermore, the UE 116 shall use differential L1-RSRP based reporting, where the largest measured value of L1-RSRP—associated with the reported v-th CSI resource subset/group discussed herein—is quantized to a 7-bit value in the range [−140, −44] dBm with 1 dB step size, and the differential L1-RSRP—associated with CSI resource subset (s)/group(s) other than the reported v-th CSI resource subset/group described herein—is quantized to a 4-bit value. The differential L1-RSRP value is computed with a 2 dB step size with a reference to the largest measured L1-RSRP value which is part of the same L1-RSRP reporting instance. The UE 116 could also use differential L1-SINR based reporting in a similar/same manner to/as the differential L1-RSRP based reporting described herein. In the rest of the $N_{group}-1$ groups of frequency subband indexes (if reported), the ordering of the reported frequency subband indexes (and therefore, the ordering of their associated/corresponding CSI resource subsets/groups) could follow that in the first reported group of frequency subband indexes described herein. For $N_{freq}=2$ and/or S'=2, in a group of frequency subband indexes reported in a CSI report/reporting instance, the first reported frequency subband index could be selected/determined from the one or more FSBM measurement/reporting subbands (for group based beam reporting) configured/active for the 1-st (or 2-nd) CSI resource subset/group, and the second reported frequency subband index could be selected/determined from the one or more FSBM measurement/reporting subbands (from group based beam reporting) configured/active for the 2-nd (or 1-st) CSI resource subset/group. For this case, the UE 116 could report to the network 130, in the same CSI report/CSI reporting instance, the subset/group index/ID of the 1-st (or 2-nd) CSI resource subset/group in the CSI resource set, and the reported 1-st (or 2-nd) CSI resource subset/group is associated with the largest measured L1-RSRP (differential L1-RSRP reporting is enabled).

For another example, the $N_{freq}$ frequency subband indexes reported in a group of frequency subband indexes (or each group of frequency subband indexes) in the same CSI report/reporting instance could be one-to-one associated/mapped to the S' CSI resource subsets/groups configured in the same CSI resource set. For instance, in a group of $N_{freq}$ frequency subband indexes (or each group of $N_{freq}$ frequency subband indexes) reported in a CSI report/reporting instance, the first reported frequency subband index could be selected/determined from the one or more FSBM measurement/reporting subbands (for group based beam reporting) configured/active for the first (or last) CSI resource subset/group in the resource set, the second frequency subband index could be determined/selected from the one or more FSBM measurement/reporting subbands (for group based beam reporting) configured/active for the second (or second last) CSI resource subset/group in the same resource set, and so on, and the last frequency subband index could be determined/selected from the one or more FSBM measurement/reporting subbands (for group based beam reporting) configured/active for the last (or first) CSI resource subset/group in the same CSI resource set; for this case, $N_{freq}=S'$. Alternatively, the UE 116 could be indicated/configured/provided by the network 130, e.g., via higher layer RRC signaling/parameter and/or MAC CE command and/or dynamic DCI based L1 signaling, the association/mapping between the $N_{freq}$ frequency subband indexes reported in a group of frequency subband indexes (or each group of frequency subband indexes) in the same CSI report/reporting instance and the S' CSI resource subsets/groups configured in the same CSI resource set. Optionally, the UE 116 could autonomously determine/decide the association/mapping between the $N_{freq}$ frequency subband indexes reported in a group of frequency subband indexes (or each group of frequency subband indexes) in the same CSI report/reporting instance and the S' CSI resource subsets/groups configured in the same CSI resource set; for this case, the UE 116 could indicate to the network 130 the association/mapping relationship. Furthermore, the UE 116 shall use differential L1-RSRP based reporting, where the largest measured value of L1-RSRP is quantized to a 7-bit value in the range [−140, −44] dBm with 1 dB step size, and the differential L1-RSRP is quantized to a 4-bit value. The differential L1-RSRP value is computed with a 2 dB step size with a reference to the largest measured L1-RSRP value which is part of the same L1-RSRP reporting instance. The UE 116 could also report to the network 130, e.g., in the same CSI report/reporting instance, the position/location of the largest measured L1-RSRP in the CSI report/reporting instance and/or the CSI resource subset/group index/ID associated to the largest measured L1-RSRP. The UE 116 could also use differential L1-SINR based reporting in a similar/same manner to/as the differential L1-RSRP based reporting described herein. For $N_{freq}$=2 and/or S'=2, in a group of frequency subband indexes reported in a CSI report/reporting instance, the first reported frequency subband index could be selected/determined from the one or more FSBM measurement/reporting subbands (for group based beam reporting) configured/active for the 1-st (or 2-nd) CSI resource subset/group, and the second reported frequency subband index could be selected/determined from the one or more FSBM measurement/reporting subbands (for group based beam reporting) configured/active for the 2-nd (or 1-st) CSI resource subset/group.

In yet another example, the UE 116 could report, e.g., in a CSI report/CSI reporting instance, one or more (e.g., $N_{group}$≥1) groups of resource indicators (such as SSBRIs and/or CRIs) with each group comprising one or more (e.g., $N_{freq}$≥1) resource indicators (such as SSBRIs and/or CRIs). Each reported resource indicator in a reported group of resource indicators could be selected/determined from one or more of the CSI-RS resources configured in a CSI resource set in a resource setting—also referred to as CSI-RS resources for group based beam reporting for the CSI resource set in the resource setting (e.g., the CSI-RS resources for group based beam reporting for the s-th CSI resource set could correspond to one or more of the CSI-RS resources configured in the s-th CSI resource set with s∈{1, . . . , S}, where S is the number of CSI resource sets configured in the resource setting), where each CSI-RS resource (e.g., SSB resource or NZP CSI-RS resource) could be configured/associated with at least one FSBM measurement/reporting subband out of the FSBM measurement/reporting subbands configured/active for the corresponding CSI resource set (e.g., the $N_{meas}$/$M_{meas}$ or $N_{meas,s}$ $M_{meas,s}$ FSBM measurement/reporting subbands configured/active for the s-th CSI resource set with s∈{1, . . . , S}, where S is the number of CSI resource sets configured in the resource setting) or configured/active for the BWP/CC. For this design example, the configuration/indication of the CSI-RS resource(s) for group based beam reporting could follow those specified in the examples therein, e.g., one or more examples described herein, by replacing FSBM measurement/reporting subband(s) with CSI-RS resource(s) (or using CSI resource(s) instead of FSBM measurement/reporting subband(s) in these examples). Furthermore, different resource indicators reported in the same group of resource indicators could be selected/determined from the CSI-RS resources configured in different CSI resource sets in the same resource setting. In addition, the UE 116 could receive the CSI-RS resource(s) (e.g., SSB resource(s) and/or NZP CSI-RS resource(s)) corresponding to the resource indicators reported in the same group of resource indicators using either a single spatial domain receive filter, or multiple simultaneous spatial domain receive filters. Optionally, the UE 116 could also report, e.g., in a CSI report/CSI reporting instance, one or more (e.g., $N_{group}$≥1) groups of frequency subband index(es) with each group comprising one or more (e.g., $N_{freq}$≥1) frequency subband indexes. Each reported frequency subband index in a reported group of frequency subband indexes could be selected/determined from one or more of the (e.g., $N_{meas}$/$M_{meas}$ or $N_{meas,s}$/$M_{meas,s}$) FSBM measurement/reporting subbands configured/active for a CSI resource set in a resource setting or configured/active for the BWP/CC—also referred to as FSBM measurement/reporting subband(s) for group based beam reporting for the CSI resource set in the resource setting (e.g., the FSBM measurement/reporting subbands for group based beam reporting for the s-th CSI resource set could correspond to one or more of the $N_{meas}$/$M_{meas}$ or $N_{meas,s}$/$M_{meas,s}$ FSBM measurement/reporting subbands configured/active for the s-th CSI resource set with s∈{1, . . . , S}, where S is the number of CSI resource sets configured in the CSI resource setting). For this design example, the configuration/indication of the FSBM measurement/reporting subband(s) for group based beam reporting could follow those specified in the examples therein, e.g., one or more examples described herein, where each of the one or more FSBM measurement/reporting subbands (for group based beam reporting) could be configured/active for at least one CSI-RS resource in the corresponding CSI resource set. Different frequency subband indexes reported in the same group of frequency subband indexes could be selected/determined from the FSBM measurement/reporting subbands (for group based beam reporting) configured/active for different CSI resource sets in a resource setting. In addition, the UE 116 could receive the CSI-RS resource(s) (e.g., SSB resource(s) and/or NZP CSI-RS resource(s)) on the frequency subbands—whose indexes are reported in the same group of frequency subband indexes—using either a single spatial domain receive filter, or multiple simultaneous spatial domain receive filters. The UE 116 could also report, e.g., in the same CSI report/CSI reporting instance, one or more beam metrics such as L1-RSRPs/L1-SINRs each corresponding/associated to a reported resource indicator and/or frequency subband index as described herein. The exact CSI report format for this design example, e.g., the ordering of resource indicators (and therefore, the corresponding beam metrics) in a reported group in the CSI report/reporting instance, the ordering of frequency subband indexes (and therefore, the corresponding beam metrics) in a reported group in the CSI report/reporting instance, and etc., could follow those specified in the examples provided therein (e.g., one or more examples described herein).

In yet another example, the UE 116 could report, e.g., in a CSI report/CSI reporting instance, one or more (e.g., $N_{group}$≥1) groups of resource indicators (such as SSBRIs and/or CRIs) with each group comprising one or more (e.g., $N_{freq}$≥1) resource indicators (such as SSBRIs and/or CRIs). Each reported resource indicator in a reported group of resource indicators could be selected/determined from one or more of the CSI-RS resources configured in a CSI resource subset/group in a CSI resource set—also referred to as CSI-RS resources for group based beam reporting for the CSI resource subset/group in the CSI resource set (e.g., the CSI-RS resources for group based beam reporting could correspond to one or more of the CSI-RS resources configured in the s'-th CSI resource subset/group with s'∈{1, . . . , S'}, where S' is the number of CSI resource subsets/groups configured in the resource set), where each CSI-RS resource (e.g., SSB resource or NZP CSI-RS resource) could be configured/associated with at least one FSBM measurement/reporting subband out of the FSBM measurement/reporting subbands configured/active for the corresponding CSI resource subset/group (e.g., the $N_{meas}$/$M_{meas}$ or $N_{meas,s}$/$M_{meas,s'}$ FSBM measurement/reporting subbands configured/active for the s'-th CSI resource subset/group with s'∈{1, . . . , S'}, where S' is the number of CSI resource subsets/groups configured in the CSI resource set) or configured/active for the BWP/CC. For this design example, the configuration/indication of the CSI-RS resource(s) for group based beam reporting could follow those specified in the examples therein, e.g., one or more examples described herein, by replacing FSBM measurement/reporting subband(s) with CSI-RS resource(s) (or using CSI resource(s) instead of FSBM measurement/reporting subband(s) in these examples). Furthermore, different resource indicators reported in the same group of resource indicators could be selected/determined from the CSI-RS resources configured in different CSI resource subsets/groups in the same resource set. In addition, the UE 116 could receive the CSI-RS resource(s) (e.g., SSB resource(s) and/or NZP CSI-RS resource(s)) corresponding to the resource indicators reported in the same group of resource indicators using either a single spatial domain receive filter, or multiple simultaneous spatial domain receive filters. Optionally, the UE 116 could also report, e.g., in a CSI report/CSI reporting instance, one or more (e.g., $N_{group}$≥1) groups of frequency subband index(es) with each group comprising one or more (e.g., $N_{freq}$≥1) frequency subband indexes. Each reported frequency subband index in a reported group of frequency subband indexes could be selected/determined from one or more of the (e.g., $N_{meas}$/$M_{meas}$ or $N_{meas,s}$/$M_{meas,s'}$) FSBM measurement/reporting subbands configured/active for a CSI resource subset/group in a resource set or configured/active for the BWP/CC—also referred to as FSBM measurement/reporting subband(s) for group based beam reporting for the CSI resource subset/group in the resource set (e.g., the FSBM measurement/reporting subbands for group based beam reporting for the s'-th CSI resource subset/group could correspond to one or more of the $N_{meas}$/$M_{meas}$ or $N_{meas,s'}$/$M_{meas,s'}$ FSBM measurement/reporting subbands configured/active for the s'-th CSI resource subset/group with s'∈{1, . . . , S'}, where S' is the number of CSI resource subsets/groups configured in the CSI resource set). For this design example, the configuration/indication of the FSBM measurement/reporting subband(s) for group based beam reporting could follow those specified in the examples therein, e.g., one or more examples described herein, by replacing CSI resource set(s) in a resource setting with CSI resource subset(s)/group(s) in a resource set (or using CSI resource subset(s)/group(s) in a resource set instead of CSI resource set(s) in a resource setting in these examples), where each of the one or more FSBM measurement/reporting subbands (for group based beam reporting) could be configured/active for at least one CSI-RS resource in the corresponding CSI resource subset/group. Different frequency subband indexes reported in the same group of frequency subband indexes could be selected/determined from the FSBM measurement/reporting subbands (for group based beam reporting) configured/active for different CSI resource subsets/groups in a resource setting. In addition, the UE 116 could receive the CSI-RS resource(s) (e.g., SSB resource(s) and/or NZP CSI-RS resource(s)) on the frequency subbands—whose indexes are reported in the same group of frequency subband indexes— using either a single spatial domain receive filter, or multiple simultaneous spatial domain receive filters. The UE 116 could also report, e.g., in the same CSI report/CSI reporting instance, one or more beam metrics such as L1-RSRPs/L1-SINRs each corresponding/associated to a reported resource indicator and/or frequency subband index as described herein. The exact CSI report format for this design example, e.g., the ordering of resource indicators (and therefore, the corresponding beam metrics) in a reported group in the CSI report/reporting instance, the ordering of frequency subband indexes (and therefore, the corresponding beam metrics) in a reported group in the CSI report/reporting instance, etc., could follow those specified in the examples provided therein (e.g., one or more examples described herein).

The bitwidth of a (reported) frequency subband index for a CSI resource set or a CSI resource subset/group (each compromising one or more CSI-RS resources and associated with a TRP in a multi-TRP system as discussed herein) could be based on the number of FSBM measurement/reporting subbands (for group based beam reporting) configured/active for the corresponding CSI resource set or the CSI resource subset/group. Alternatively, the bitwidth of a (reported) frequency subband index for a CSI resource set or a CSI resource subset/group (each compromising one or more CSI-RS resources and associated with a TRP in a multi-TRP system as discussed herein) could be based on the number of FSBM measurement/reporting subbands (for group based beam reporting) configured/active for all the CSI resource sets in a resource setting or all the CSI resource subsets/groups in a CSI resource set.

The UE 116 could be indicated/configured/provided by the network 130, e.g., via higher layer RRC signaling/parameter and/or MAC CE command and/or dynamic DCI based L1 signaling, the number of group(s), e.g., $N_{group}$, of frequency subband indexes/resource indicators to be reported in a CSI report/reporting instance, and/or the number of frequency subband indexes/resource indicators, e.g., $N_{freq}$, to be reported in a group of frequency subband indexes/resource indicators in a CSI report/reporting instance. For instance, the UE 116 could receive from the network 130, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-Re-sourceConfig that configures a CSI resource setting or the higher layer parameter CSI-ReportConfig that configures a CSI reporting setting, the number of groups, e.g., $N_{group}$, of frequency subband indexes/resource indicators to be reported in a CSI report/reporting instance, and/or the number of frequency subband indexes/resource indicators, e.g., $N_{freq}$, to be reported in a group of frequency subband indexes/resource indicators in a CSI report/reporting instance.

The UE 116 could report/indicate to the network 130, e.g., in a CSI report, whether the frequency subbands corresponding to the frequency subband indexes or CSI-RS resources reported in the same group are the same (e.g., having the same bandwidth—in terms of number of PRBs—and/or the same frequencies).

For aperiodic CSI and periodic and semi-persistent CSI resource settings, when the FSBM or frequency selective/frequency subband specific/dependent beam management is enabled (according to one or more examples described herein) and/or when the group based beam reporting for the FSBM based multi-TRP operation is enabled, e.g., when the higher layer parameter groupBasedBeamReporting-FSBM in CSI-ReportConfig is enabled or turned on, each trigger state configured using the higher layer parameter CSI-AperiodicTriggerState is associated with one or multiple CSI-ReportConfig where each CSI-ReportConfig is linked to periodic or semi-persistent setting(s).

For instance, when S≥1, e.g., S=2, CSI resource sets could be configured in a resource setting, each comprising one or more CSI-RS resources for FSBM. In one example, each CSI-RS resource configured in a CSI resource set could be associated/configured with one or more FSBM measurement/reporting subbands according to the examples herein. In another example, each CSI-RS resource configured in a CSI resource set could be associated/configured with a FSBM measurement/reporting subband according to the design examples herein.

For another instance, when S'≥1, e.g., S'=2, CSI resource subsets/groups could be configured in a CSI resource set, each comprising one or more CSI-RS resources for FSBM. In one example, each CSI-RS resource configured in a CSI resource subset/group could be associated/configured with one or more FSBM measurement/reporting subbands according to the examples herein. In another example, each CSI-RS resource configured in a CSI resource subset/group could be associated/configured with a FSBM measurement/reporting subband according to the design examples herein.

For aperiodic CSI and aperiodic CSI resource settings, when the FSBM or frequency selective/frequency subband specific/dependent beam management is enabled (according to one or more examples described herein) and/or when the group based beam reporting for the FSBM based multi-TRP operation is enabled, e.g., when the higher layer parameter groupBasedBeamReporting-FSBM in CSI-ReportConfig is enabled or turned on, each trigger state configured using the higher layer parameter CSI-AperiodicTriggerState is associated with resourcesForChannelFSBM and resources-ForChannelFSBM2, which correspond to first and second resource sets for FSBM (or first and second resource subsets/groups for FSBM), respectively. The first or second resource set for FSBM (or the first or second resource subset/group for FSBM) could comprise one or more CSI-RS resources for FSBM. In one example, each CSI-RS resource configured in the first or second resource set for FSBM (or the first or second resource subset/group for FSBM) could be associated/configured with one or more FSBM measurement/reporting subbands according to the examples herein. In another example, each CSI-RS resource configured in the first or second resource set for FSBM (or the first or second resource subset/group for FSBM) could be associated/configured with a FSBM measurement/reporting subband according to the design examples herein.

FIG. 16 illustrates an example method 1600 performed by a UE in a wireless communication system according to embodiments of the present disclosure. The method 1600 of FIG. 16 can be performed by any of the UEs 111-116 of FIG. 1, such as the UE 116 of FIG. 3, and a corresponding method can be performed by any of the BSs 101-103 of FIG. 1, such as BS 102 of FIG. 2. The method 1600 is for illustration only and other embodiments can be used without departing from the scope of the present disclosure.

The method begins with the UE receiving first information for a first set of frequency subbands for FSBM (1610). For example, in 1610, the first information may include at least one of a subband size in a number of PRBs, a total number K≥1 of frequency subbands in the first set, a number M≥1 of frequency subbands in the first subset, and a number N≥1 of frequency subbands in the second subset.

The UE then receives second information related to a CSI resource setting (1620). For example, in 1620, the CSI resource setting includes a first CSI resource set and a second CSI resource set. The first and second CSI resource sets include one or more RS resources. In various embodiments, RS resource from the one or more RS resources corresponds to a SSB resource or a NZP CSI-RS resource. In various embodiments, the second information includes a bitmap with bit positions corresponding to frequency subbands in the first set. When a value of the bit position is set to '0', a corresponding frequency subband belongs to the first subset. When the value of the bit position is set to '1', a corresponding frequency subband belongs to the second subset.

In various embodiments, the second information includes: a first bitmap for the first CSI resource set with bit positions corresponding to frequency subbands in the first set, and a second bitmap for the second CSI resource set with bit positions corresponding to the frequency subbands in the first set. When a value of the bit position in the first bitmap is set to '1', a corresponding frequency subband belongs to the first subset. When a value of the bit position in the second bitmap is set to '1', a corresponding frequency subband belongs to the second subset.

The UE then identifies a first subset of frequency subbands from the first set of frequency subbands for the first CSI resource set and a second subset of frequency subbands from the first set of frequency subbands for the second CSI resource set (1630). For example, in 1630, the identification is based on the first and second information. In various embodiments, the first subset comprises first M frequency subbands in the first set, the second subset comprises remaining N frequency subbands in the first set, and the first set of frequency subbands, K=M+N.

The UE then determines one or more first RS resources from the first CSI resource set and one or more second RS resources from the second CSI resource set for FSBR (1640). For example, in 1640, the determination is based on the identification. In various embodiments, the one or more first RS resources correspond to one or more frequency subbands in the first subset, respectively, and the one or more second RS resources correspond to one or more frequency subbands in the second subset, respectively. These correspondences may be determined according to a fixed rule in system specifications or a network configuration or indication via RRC signaling or MAC-CE or DCI.

In various embodiments, the UE may also receive third information for a second set of frequency subbands for FSBM. The third information indicates at least one of a subband size in a number of PRBs and a total number of frequency subbands in the second set. The UE may further identify, based on the first and third information, that the first set of frequency subbands are associated with the first CSI resource set and the second set of frequency subbands are associated with the second CSI resource set. The UE may then determine, based on the identification, one or more third RS resources from the first CSI resource set and one or more fourth RS resources from the second CSI resource set for FSBR.

In various embodiments, the UE may also transmit, in a beam report, at least one of one or more first resource indicators corresponding to one or more first RS resources, respectively, from the first CSI resource set; one or more frequency subband indexes corresponding to the one or more first resource indicators, respectively; one or more second resource indicators corresponding to one or more second RS resources, respectively, from the second CSI resource set; and one or more frequency subband indexes corresponding to the one or more second resource indicators, respectively.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Any of the above variation embodiments can be utilized independently or in combination with at least one other variation embodiment.

Although the present disclosure has been described with exemplary embodiments, various changes and modifications may be suggested to one skilled in the art. It is intended that the present disclosure encompass such changes and modifications as fall within the scope of the appended claims. None of the descriptions in this application should be read as implying that any particular element, step, or function is an essential element that must be included in the claims scope. The scope of patented subject matter is defined by the claims.

What is claimed is:

1. A user equipment (UE), comprising:
a transceiver configured to:
    receive first information for a first set of frequency subbands for frequency selective beam management (FSBM);
    receive second information related to a channel state information (CSI) resource setting; and
    receive third information for the first set of frequency subbands, wherein:
        the third information indicates at least one of:
            a subband size in a number of physical resource blocks (PRBs); and
            a total number of frequency subbands in the first set,
        the CSI resource setting includes a first CSI resource set and a second CSI resource set, and
        the first and second CSI resource sets include one or more reference signal (RS) resources; and
a processor operably coupled to the transceiver, the processor configured to:
    identify, based on the first, second, and third information, a first subset of frequency subbands from the first set of frequency subbands for the first CSI resource set and a second subset of frequency subbands from the first set of frequency subbands for the second CSI resource set; and
    determine, based on the identification, one or more first RS resources from the first CSI resource set and one or more second RS resources from the second CSI resource set for frequency selective beam reporting (FSBR),
    wherein a RS resource from the one or more RS resources corresponds to a synchronization signal block (SSB) resource or a non-zero-power (NZP) CSI-RS resource.

2. The UE of claim 1, wherein the first information includes at least one of:
a subband size in a number of PRBs;
a total number K≥1 of frequency subbands in the first set;
a number M≥1 of frequency subbands in the first subset; and a number N≥1 of frequency subbands in the second subset.

3. The UE of claim 1, wherein:
the first subset comprises first M frequency subbands in the first set,
the second subset comprises remaining N frequency subbands in the first set, and
the first set of frequency subbands, K=M+N.

4. The UE of claim 1, wherein
the second information includes a bitmap with bit positions corresponding to frequency subbands in the first set;
when a value of the bit position is set to '0', a corresponding frequency subband belongs to the first subset; and
when the value of the bit position is set to '1', a corresponding frequency subband belongs to the second subset.

5. The UE of claim 1, wherein:
the second information includes: a first bitmap for the first CSI resource set with bit positions corresponding to frequency subbands in the first set, and a second bitmap for the second CSI resource set with bit positions corresponding to the frequency subbands in the first set;
when a value of the bit position in the first bitmap is set to '1', a corresponding frequency subband belongs to the first subset; and
when a value of the bit position in the second bitmap is set to '1', a corresponding frequency subband belongs to the second subset.

6. The UE of claim 1, wherein:
the one or more first RS resources correspond to one or more frequency subbands in the first subset, respectively, and the one or more second RS resources correspond to one or more frequency subbands in the second subset, respectively, according to:
    a fixed rule in system specifications; or
    a network configuration or indication via radio resource control (RRC) signaling or medium access control (MAC) control element (CE) or downlink control information (DCI).

7. The UE of claim 1, wherein:
the transceiver is further configured to receive fourth information for a second set of frequency subbands for FSBM,
the fourth information indicates at least one of:
    a subband size in a number of PRBs; and
    a total number of frequency subbands in the second set, and
the processor is further configured to:
    identify, based on the first and third-fourth information, that the first set of frequency subbands are associated with the first CSI resource set and the second set of frequency subbands are associated with the second CSI resource set; and
    determine, based on the identification, one or more third RS resources from the first CSI resource set and one or more fourth RS resources from the second CSI resource set for FSBR.

8. The UE of claim 1, wherein the transceiver is further configured to transmit, in a beam report, at least one of:
one or more first resource indicators corresponding to one or more first RS resources, respectively, from the first CSI resource set;
one or more frequency subband indexes corresponding to the one or more first resource indicators, respectively;

73 one or more second resource indicators corresponding to one or more second RS resources, respectively, from the second CSI resource set; and one or more frequency subband indexes corresponding to the one or more second resource indicators, respectively.

9. A base station (BS), comprising:
a transceiver configured to:
transmit first information for a first set of frequency subbands for frequency selective beam management (FSBM);
transmit second information related to a channel state information (CSI) resource setting, and
transmit third information for the first set of frequency subbands, wherein the third information indicates at least one of:
a subband size in a number of physical resource blocks (PRBs), and
a total number of frequency subbands in the first set,
wherein the CSI resource setting includes a first CSI resource set and a second CSI resource set,
wherein the first and second CSI resource sets include one or more reference signal (RS) resources,
wherein the first, second, and third information indicate a first subset of frequency subbands from the first set of frequency subbands for the first CSI resource set and a second subset of frequency subbands from the first set of frequency subbands for the second CSI resource set,
wherein the first and second information indicate one or more first RS resources from the first CSI resource set and one or more second RS resources from the second CSI resource set for frequency selective beam reporting (FSBR), and
wherein a RS resource from the one or more RS resources corresponds to a synchronization signal block (SSB) resource or a non-zero-power (NZP) CSI-RS resource.

10. The BS of claim 9, wherein the first information includes at least one of:
a subband size in a number of PRBs;
a total number K≥1 of frequency subbands in the first set;
a number M≥1 of frequency subbands in the first subset; and
a number N≥1 of frequency subbands in the second subset.

11. The BS of claim 9, wherein:
the first subset comprises first M frequency subbands in the first set,
the second subset comprises remaining N frequency subbands in the first set, and
the first set of frequency subbands, K=M+N.

12. The BS of claim 9, wherein
the second information includes a bitmap with bit positions corresponding to frequency subbands in the first set;
when a value of the bit position is set to '0', a corresponding frequency subband belongs to the first subset; and
when the value of the bit position is set to '1', a corresponding frequency subband belongs to the second subset.

13. The BS of claim 9, wherein:
the second information includes: a first bitmap for the first CSI resource set with bit positions corresponding to frequency subbands in the first set, and a second bitmap for the second CSI resource set with bit positions corresponding to the frequency subbands in the first set;

74 when a value of the bit position in the first bitmap is set to '1', a corresponding frequency subband belongs to the first subset; and
when a value of the bit position in the second bitmap is set to '1', a corresponding frequency subband belongs to the second subset.

14. The BS of claim 9, wherein:
the one or more first RS resources correspond to one or more frequency subbands in the first subset, respectively, and the one or more second RS resources correspond to one or more frequency subbands in the second subset, respectively, according to:
a fixed rule in system specifications; or
a network configuration or indication via radio resource control (RRC) signaling or medium access control (MAC) control element (CE) or downlink control information (DCI).

15. The BS of claim 9, wherein:
the transceiver is further configured to transmit fourth information for a second set of frequency subbands for FSBM,
the fourth information indicates at least one of:
a subband size in a number of PRBs; and
a total number of frequency subbands in the second set,
the first and fourth information indicate that the first set of frequency subbands are associated with the first CSI resource set and the second set of frequency subbands are associated with the second CSI resource set, and
the first and fourth information indicate one or more third RS resources from the first CSI resource set and one or more fourth RS resources from the second CSI resource set for FSBR.

16. The BS of claim 9, wherein the transceiver is further configured to receive, in a beam report, at least one of:
one or more first resource indicators corresponding to one or more first RS resources, respectively, from the first CSI resource set;
one or more frequency subband indexes corresponding to the one or more first resource indicators, respectively;
one or more second resource indicators corresponding to one or more second RS resources, respectively, from the second CSI resource set; and
one or more frequency subband indexes corresponding to the one or more second resource indicators, respectively.

17. A method for operating a user equipment (UE), the method comprising:
receiving first information for a first set of frequency subbands for frequency selective beam management (FSBM);
receiving second information related to a channel state information (CSI) resource setting;
receiving third information for the first set of frequency subbands, wherein:
the third information indicates at least one of:
a subband size in a number of physical resource blocks (PRBs), and
a total number of frequency subbands in the first set,
the CSI resource setting includes a first CSI resource set and a second CSI resource set, and
the first and second CSI resource sets include one or more reference signal (RS) resources;
identifying, based on the first, second, and third information, a first subset of frequency subbands from the first set of frequency subbands for the first CSI resource set and a second subset of frequency subbands from the first set of frequency subbands for the second CSI resource set; and determining, based on the identification, one or more first RS resources from the first CSI resource set and one or more second RS resources from the second CSI resource set for frequency selective beam reporting (FSBR), wherein a RS resource from the one or more RS resources corresponds to a synchronization signal block (SSB) resource or a non-zero-power (NZP) CSI-RS resource.

18. The method of claim 17, wherein the first information includes at least one of:

a subband size in a number of PRBs;

a total number $K \geq 1$ of frequency subbands in the first set;

a number $M \geq 1$ of frequency subbands in the first subset; and a number $N \geq 1$ of frequency subbands in the second subset.

19. The method of claim 17, wherein:

the first subset comprises first M frequency subbands in the first set, the second subset comprises remaining N frequency subbands in the first set, and the first set of frequency subbands, $K=M+N$.

20. The method of claim 17, wherein the second information includes a bitmap with bit positions corresponding to frequency subbands in the first set;

when a value of the bit position is set to '0', a corresponding frequency subband belongs to the first subset; and when the value of the bit position is set to '1', a corresponding frequency subband belongs to the second subset.

\* \* \* \* \*